(12) United States Patent
Kato et al.

(10) Patent No.: US 12,404,387 B2
(45) Date of Patent: *Sep. 2, 2025

(54) PRODUCTION METHOD FOR FLUOROPOLYMER, SURFACTANT FOR POLYMERIZATION, AND USE OF SURFACTANT

(71) Applicant: DAIKIN INDUSTRIES, LTD., Osaka (JP)

(72) Inventors: Taketo Kato, Osaka (JP); Satoru Yoneda, Osaka (JP); Manabu Fujisawa, Osaka (JP); Kazuya Asano, Osaka (JP); Takahiro Kitahara, Osaka (JP); Masahiro Higashi, Osaka (JP); Akiyoshi Yamauchi, Osaka (JP); Sumi Ishihara, Osaka (JP); Yosuke Kishikawa, Osaka (JP); Shinnosuke Nitta, Osaka (JP); Marina Nakano, Osaka (JP); Hirotoshi Yoshida, Osaka (JP); Yoshinori Nanba, Osaka (JP); Kengo Ito, Osaka (JP); Chiaki Okui, Osaka (JP); Hirokazu Aoyama, Osaka (JP); Masamichi Sukegawa, Osaka (JP); Taku Yamanaka, Osaka (JP); Hiroyuki Sato, Osaka (JP); Yuuji Tanaka, Osaka (JP); Kenji Ichikawa, Osaka (JP); Yohei Fujimoto, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 688 days.

This patent is subject to a terminal disclaimer.

(21) Appl. No.: 17/672,013

(22) Filed: Feb. 15, 2022

(65) Prior Publication Data
US 2022/0169830 A1    Jun. 2, 2022

Related U.S. Application Data

(62) Division of application No. 16/498,849, filed as application No. PCT/JP2018/013605 on Mar. 30, 2018, now Pat. No. 11,279,814.

(30) Foreign Application Priority Data

Mar. 31, 2017 (JP) .................. 2017-073083
Feb. 7, 2018 (JP) .................. 2018-020461

(51) Int. Cl.
C08K 5/41      (2006.01)
C08F 14/26     (2006.01)
C08K 5/098     (2006.01)

(52) U.S. Cl.
CPC ............... *C08K 5/41* (2013.01); *C08F 14/26* (2013.01); *C08K 5/098* (2013.01); *C08F 2800/10* (2013.01); *C08K 2201/014* (2013.01)

(58) Field of Classification Search
CPC .... C08K 5/41; C08K 5/098; C08K 2201/014; C08K 5/42; C08F 14/26; C08F 2800/10; C08F 214/26; C08F 14/18
See application file for complete search history.

(56) References Cited

U.S. PATENT DOCUMENTS

| 3,793,210 A | 2/1974 | Corey |
| 4,369,266 A | 1/1983 | Kuhls et al. |
| 4,469,846 A * | 9/1984 | Khan ............ C08F 259/08 525/276 |

(Continued)

FOREIGN PATENT DOCUMENTS

| CN | 102382323 A | 3/2012 |
| CN | 105367692 A | 3/2016 |

(Continued)

OTHER PUBLICATIONS

Schultz at al Micelles Formed From Photochemically Active Amphiphiles: Structural Characterization by Small-Angle Neutro Scattering, Journal of Molecular Structure, 383, pp. 191-196 (Year: 1996)(Year: 1996).*

Zarzar et al., "Dynamically reconfigurable complex emulsions via tunable interfacial tensions", Nature, 2015, vol. 518, No. 7540, pp. 520-524 (5 pages total).

Forbes et al., "Unusual Dynamics of Micellized Radical Pairs Generated from Photochemically Active Amphiphiles", J. Am. Chem. Soc., 1996, vol. 118, No. 43, pp. 10652-10653 (2 pages total).

Registry(STN)[online], 1984 ~ 2004, [Search date: Dec. 20, 2021] CAS Registry No. 78568-77-1, 763024-63-1, 790188-03-3 (3 pages total).

(Continued)

*Primary Examiner* — Katarzyna I Kolb
(74) *Attorney, Agent, or Firm* — Sughrue Mion, PLLC

(57) ABSTRACT

A surfactant for polymerization including at least one selected from a surfactant represented by $R^{1a}$—CO—$R^{2a}$—CO—$R^{3a}$—$OSO_3X^a$ and a surfactant represented by $R^{1b}$—CO—$(CR^{2b}_2)_n$—$(OR^{3b})_p$—$(CR^{4b}_2)_q$-L-$OSO_3X^b$, wherein $R^{1a}$, $R^{2a}$, $R^{3a}$, $X^a$, $R^{1b}$, $R^{2b}$, $R^{3b}$, $R^{4b}$, L and $X^b$ are as defined herein. Also disclosed is a composition containing a fluoropolymer and the at least one surfactant, a composition containing a fluoropolymer and a compound represented by (H—$(CF_2)_8$—$SO_3)_qM^2$, where $M^2$ is as defined herein, and a molded article made from the composition containing a fluoropolymer and the compound represented by (H—$(CF_2)_8$—$SO_3)_qM^2$.

11 Claims, No Drawings

(56) References Cited

U.S. PATENT DOCUMENTS

| | | | | |
|---|---|---|---|---|
| 5,955,556 A * | 9/1999 | McCarthy | ........... | C08F 214/186 |
| | | | | 526/86 |
| 6,642,415 B1 | 11/2003 | Fuhrer et al. | | |
| 6,825,250 B2 | 11/2004 | Epsch et al. | | |
| 7,696,268 B2 * | 4/2010 | Tsuda | ..................... | C08F 214/26 |
| | | | | 524/544 |
| 10,975,025 B2 * | 4/2021 | Qiu | ........................ | C07C 309/10 |
| 11,072,580 B2 * | 7/2021 | Yoneda | .................... | C09K 3/00 |
| 11,279,814 B2 * | 3/2022 | Kato | ....................... | C08K 5/098 |
| 11,512,155 B2 * | 11/2022 | Kato | ........................ | C08F 14/26 |
| 11,518,826 B2 * | 12/2022 | Mishima | ................... | C08F 2/26 |
| 11,708,324 B2 * | 7/2023 | Yoneda | ................ | C07D 307/46 |
| | | | | 558/32 |
| 11,999,681 B2 * | 6/2024 | Yoneda | .................. | C11D 1/146 |
| 2004/0053158 A1 | 3/2004 | Yamato et al. | | |
| 2007/0135558 A1 * | 6/2007 | Tsuda | ..................... | C08F 214/26 |
| | | | | 524/544 |
| 2007/0142513 A1 * | 6/2007 | Tsuda | ........................ | C08K 5/42 |
| | | | | 524/544 |
| 2008/0093582 A1 | 4/2008 | Nagai et al. | | |
| 2009/0181952 A1 | 7/2009 | Haydar et al. | | |
| 2012/0116003 A1 | 5/2012 | Brothers et al. | | |
| 2012/0283382 A1 | 11/2012 | Spada et al. | | |
| 2014/0357822 A1 * | 12/2014 | Qiu | ..................... | C08F 214/184 |
| | | | | 526/243 |
| 2016/0108225 A1 | 4/2016 | Toyoda et al. | | |
| 2020/0172476 A1 | 6/2020 | Yoneda et al. | | |
| 2020/0255551 A1 | 8/2020 | Taira et al. | | |
| 2020/0399211 A1 | 12/2020 | Yoneda et al. | | |
| 2021/0115224 A1 | 4/2021 | Kato et al. | | |

FOREIGN PATENT DOCUMENTS

| | | | | |
|---|---|---|---|---|
| CN | 109715603 A | 5/2019 | | |
| EP | 1 894 970 A1 | 3/2008 | | |
| EP | 2 703 557 A1 | 3/2014 | | |
| EP | 3 514 138 A1 | 7/2019 | | |
| EP | 3514142 A1 * | 7/2019 | .......... | B01F 17/0057 |
| GB | 2517481 A | 2/2015 | | |
| JP | 40-021438 B | 9/1965 | | |
| JP | 49-029294 A | 3/1974 | | |
| JP | 07-264461 A | 10/1995 | | |
| JP | 9-503295 A | 3/1997 | | |
| JP | 10338617 A | 12/1998 | | |
| JP | 11-029788 A | 2/1999 | | |
| JP | 11-507956 A | 7/1999 | | |
| JP | 2000-1467 A | 1/2000 | | |
| JP | 2004-526984 A | 9/2004 | | |
| JP | 2005-325327 A | 11/2005 | | |
| JP | 2006-8517 A | 1/2006 | | |
| JP | 2010-511096 A | 4/2010 | | |
| JP | 6888669 B2 | 6/2021 | | |
| WO | 95/08529 A1 | 3/1995 | | |
| WO | 97/39088 A1 | 10/1997 | | |
| WO | 2008/066839 A1 | 6/2008 | | |
| WO | 2012/116238 A1 | 8/2012 | | |
| WO | 2013016372 A1 | 1/2013 | | |
| WO | WO-2018181898 A1 * | 10/2018 | .............. | C08F 14/18 |
| WO | WO2019/031617 A1 | 2/2019 | | |
| WO | 2019/131633 A1 | 7/2019 | | |

OTHER PUBLICATIONS

Non-Final Office Action issued Oct. 6, 2022 from the U.S. Patent and Trademark Office in U.S. Appl. No. 16/498,576.
Final Office Action issued Apr. 27, 2022 from the U.S. Patent and Trademark Office in co-pending U.S. Appl. No. 16/498,576.
Office Action issued Sep. 11, 2023 by the United States Patent and Trademark Office in U.S. Appl. No. 16/498,576.
Office Action issued Apr. 27, 2023 in U.S. Appl. No. 16/498,576.
Hettiyadura et al. "Qualitative and quantitative analysis of atmospheric organosulfates in Centreville, Alabama", Atmos. Chem. Phys., 17, 1343-1359, 2017 (Year: 2017).
Chemical Abstract Registry No. 1823379-33-4, indexed in the Registry File on STN CAS Online Dec. 6, 2015.
Communication dated Dec. 14, 2020, issued by the European Patent Office in application No. 18776956.7.
Communication dated May 11, 2021, from the European patent Office in application No. 18776956.7.
Database CA [Online] Chemical Abstracts Service, Columbus, Ohio, US; Votapek, Vaclav et al., "Low-foam surfactants with high activity and resistance to hot alkalies", XP00280281, (1 page total), Jun. 29, 1979.
Database Caplus [Online] Chemical Abstracts Service, Columbus, Ohio, US; 1981, XP002801208, retrieved from STN Database accession No. 1981:499698 (2 pages total).
Database Caplus [Online] Chemical Abstracts Service, Columbus, Ohio, US; 1982, XP002801209, retrieved from STN Database accession No. 1982:36971 (1 page).
Deepak B. Salunke et al. "Design and Development of Stable, Water-Soluble, Human Toll-like Receptor 2 Specific Monoacyl Lipopeptides as Candidate Vaccine Adjuvants", Journal of Medicinal Chemistry, vol. 56, No. 14, 2013, pp. A-P (16 pages total).
Estillore et al., "Water Uptake and Hygroscopic Growth of Organosulfate Aerosol", Environmental Science & Technology, Mar. 26, 2016, vol. 50, No. 8, pp. 4259-4268 (10 pages total).
Extended European Search Report dated Jun. 22, 2021 from the European Patent Office in EP Application No. 21159543.4.
Extended European Search Report issued Dec. 16, 2020 in European Application No. 18777204.1.
Federal Register, vol. 72, No. 161, Aug. 21, 2007, p. 46722.
Final Office Action issued Jun. 24, 2021 in U.S. Appl. No. 16/498,576.
Grants Hackh's Chemical Dictionary (5th Ed. 1987) at p. 148.
Gregory R. Schulz, et al., "Micelles formed from photochemically active amphiphiles: structural characterization by small-angle neutron scattering", Journal of Molecular Structure, 1996, pp. 191-196, vol. 383.
Hermann Schlenk et al., "Syntheses of Derivatives of Dihydroxyacetone and of Glycerides" Journal of the American Society, vol. 74, No. 10, 1952, pp. 2550-2552 (3 pages total).
International Preliminary Report on Patentability and Translation of Written Opinion from the International Bureau in International Application No. PCT/JP2018/013605, dated Oct. 1, 2019.
International Preliminary Report on Patentability with a Translation of Written Opinion in International Application No. PCT/JP2018/013625, dated Oct. 1, 2019.
International Search Report for PCT/JP2018/013605, dated Jun. 26, 2018.
International Search Report for PCT/JP2018/013625 dated Jun. 12, 2018. [PCT/ISA/210].
Non Final Office Action issued Mar. 4, 2021 in U.S. Appl. No. 16/498,576.
Office Action issued Oct. 13, 2021 in related U.S. Appl. No. 16/498,576.
Rosen et al., "Effect of Hard River Water on the Surface Properties of Surfactants", J. Chem. Eng. Data, Sep. 12, 1996, vol. 41, No. 5, pp. 1160-1167 (8 pages total).
Someya et al., "Silver-catalyzed cross-coupling reactions of alkyl bromides with alkyl or aryl Grignard reagents", Tetrahedron Letters, Feb. 10, 2009, vol. 50, No. 26, pp. 3270-3272 & pp. S1-S52 (55 pages total).
W.E. Parish et al., "An Apparatus to Simulate Metabolism of Ingested Substances", Toxic in Vintro, 1990, pp. 532-536, vol. 4, Vo.4/5.
Xin Fan et al. "Oxygenated Hydrocarbon Ionic Surfactants Exhibit CO2 Solubility", Journal of the American Chemical Society, vol. 127, No. 33, 2005, pp. 11754-11762 (9 pages total).
Yasa Sathyam Reddy et al., "Synthesis and Evaluation of Surface and Biological Properties of Some Lactic Acid-Based Anionic Surfactants", J Surfact Deterg, 2016, vol. 19, pp. 343-351 (9 pages).

* cited by examiner

PRODUCTION METHOD FOR FLUOROPOLYMER, SURFACTANT FOR POLYMERIZATION, AND USE OF SURFACTANT

CROSS REFERENCE TO RELATED APPLICATIONS

This application is a Divisional of U.S. application Ser. No. 16/498,849 filed Sep. 27, 2019, which is a National Stage of International Application No. PCT/JP2018/013605 filed Mar. 30, 2018, claiming priority based on Japanese Patent Application Nos. 2017-073083 filed Mar. 31, 2017 and 2018-020461 filed Feb. 7, 2018, the disclosures of all of which are hereby incorporated by reference in their entireties.

TECHNICAL FIELD

The invention relates to methods for producing a fluoropolymer. The invention also relates to surfactants for polymerization. The invention also relates to use of a surfactant for production of a fluoropolymer.

BACKGROUND ART

Fluorinated anionic surfactants are used in production of fluoropolymers by emulsion polymerization. The use of hydrocarbon surfactants has also been recently proposed instead of the use of fluorinated anionic surfactants.

For example, Patent Literature 1 discloses a semi-batch emulsion polymerization process for the production of a fluoroelastomer, the fluoroelastomer having at least 58 weight percent fluorine, including: (A) charging a reactor with a quantity of an aqueous solution substantially free of surfactant; (B) charging the reactor with a quantity of a monomer mixture containing i) from 25 to 75 weight percent, based on total weight of the monomer mixture, of a first monomer, the first monomer selected from the group consisting of vinylidene fluoride and tetrafluoroethylene, and ii) between 75 and 25 weight percent, based on total weight of the monomer mixture, of one or more additional copolymerizable monomers, different from the first monomer, wherein the additional monomer is selected from the group consisting of fluorine-containing olefins, fluorine-containing vinyl ethers, hydrocarbon olefins and mixtures thereof; (C) initiating polymerization to form a fluoroelastomer dispersion while maintaining the reaction medium at a pH between 1 and 7, at a pressure between 0.5 and 10 MPa, and at a temperature between 25° C. and 130° C.; and (D) charging the reactor, after polymerization has begun, with a quantity of a hydrocarbon anionic surfactant of the formula R-L-M wherein R is an alkyl group having between 6 and 17 carbon atoms, L is selected from the group consisting of —ArSO$_3$—, —SO$_3$—, —SO$_4$—, —PO$_3$—, and —COO— and M is a univalent cation.

CITATION LIST

Patent Literature

Patent Literature 1: JP 2010-511096 T

SUMMARY OF INVENTION

Technical Problem

The invention aims to provide a novel method for producing a fluoropolymer.

Solution to Problem

The invention relates to a method for producing a fluoropolymer including polymerizing a fluoromonomer in an aqueous medium in the presence of a surfactant to provide a fluoropolymer, the surfactant including at least one selected from the group consisting of:

a surfactant (a) represented by the following formula (a):

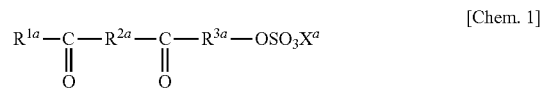

[Chem. 1]

wherein
$R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;

$R^{2a}$ and $R^{3a}$ are each individually a single bond or a divalent linking group;

$R^{1a}$, $R^{2a}$, and $R^{3a}$ contain six or more carbon atoms in total;

$X^a$ is H, a metal atom, $NR^{4a}_4$, imidazolium optionally containing a substituent, pyridinium optionally containing a substituent, or phosphonium optionally containing a substituent, where $R^{4a}$s are each H or an organic group and are the same as or different from each other; and any two of $R^{1a}$, $R^{2a}$, and $R^{3a}$ optionally bind to each other to form a ring; and a surfactant (b) represented by the following formula (b):

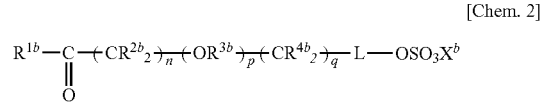

[Chem. 2]

wherein
$R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;

$R^{2b}$ and $R^{4b}$ are each individually H or a substituent;

$R^{3b}$ is a C1-C10 alkylene group optionally containing a substituent;

n is an integer of 1 or greater;

p and q are each individually an integer of 0 or greater;

$X^b$ is H, a metal atom, $NR^{5b}_4$, imidazolium optionally containing a substituent, pyridinium optionally containing a substituent, or phosphonium optionally containing a substituent, where $R^{5b}$s are each H or an organic group and are the same as or different from each other;

any two of $R^{1b}$, $R^{2b}$, $R^{3b}$, and $R^{4b}$ optionally bind to each other to form a ring; and L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^6$CO—B—, where B is a single bond or a C1-C10 alkylene group optionally containing a substituent, $R^{6b}$ is H or a C1-C4 alkyl group optionally containing a substituent, and * indicates the bond to —OSO$_3$X$^b$ in the formula.

In the formula (a), $R^{2a}$ and $R^{3a}$ are preferably each individually a single bond, a linear or branched alkylene group containing one or more carbon atoms, or a cyclic alkylene group containing three or more carbon atoms. In the alkylene group, a hydrogen atom that binds to a carbon atom is optionally replaced by a hydroxy group or a monovalent organic group that contains an ester bond.

In the formula (a), $R^{1a}$ is preferably a C1-C8 linear or branched alkyl group free from a carbonyl group, a C3-C8 cyclic alkyl group free from a carbonyl group, a C2-C45 linear or branched alkyl group containing 1 to 10 carbonyl groups, a C3-C45 cyclic alkyl group containing a carbonyl group, or a C3-C45 alkyl group containing a monovalent or divalent heterocycle.

In the formula (a), $R^{1a}$ is preferably a group represented by the following formula:

[Chem. 3]

$$R^{11a}\!-\!\!\left(\!\!\begin{array}{c}C\!-\!R^{12a}\\\|\\O\end{array}\!\!\right)_{\!\!n^{11a}}\!\!-$$

wherein $n^{11a}$ is an integer of 0 to 10; $R^{11a}$ is a C1-C5 linear or branched alkyl group or a C3-C5 cyclic alkyl group; $R^{12a}$ is a C0-C3 alkylene group; and when $n^{11a}$ is an integer of 2 to 10, $R^{12a}$s are the same as or different from each other.

In the formula (a), $R^{2a}$ and $R^{3a}$ are preferably each individually an alkylene group free from a carbonyl group and containing one or more carbon atoms.

In the formula (a), $R^{2a}$ and $R^{3a}$ are preferably each individually a C1-C3 alkylene group free from a carbonyl group.

In the formula (b), $X^b$ is preferably a metal atom or NR$^{5b}_4$, wherein $R^{5b}$ is defined as described above.

The surfactant preferably has a $^1$H-NMR spectrum in which all peak intensities observed in a chemical shift range of 2.0 to 5.0 ppm give an integral of 10% or higher.

The invention also relates to a surfactant for polymerization, including at least one selected from the group consisting of:

a surfactant (a) represented by the following formula (a):

[Chem. 4]

$$R^{1a}\!-\!\!\underset{\underset{O}{\|}}{C}\!-\!R^{2a}\!-\!\!\underset{\underset{O}{\|}}{C}\!-\!R^{3a}\!-\!OSO_3X^a$$

wherein $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;

$R^{2a}$ and $R^{3a}$ are each individually a single bond or a divalent linking group;

$R^{1a}$, $R^{2a}$, and $R^{3a}$ contain six or more carbon atoms in total;

$X^a$ is H, a metal atom, NR$^{4a}_4$, imidazolium optionally containing a substituent, pyridinium optionally containing a substituent, or phosphonium optionally containing a substituent, where R$^{4a}$s are each H or an organic group and are the same as or different from each other; and any two of $R^{1a}$, $R^{2a}$, and $R^{3a}$ optionally bind to each other to form a ring; and a surfactant (b) represented by the following formula (b):

[Chem. 5]

$$R^{1b}\!-\!\!\underset{\underset{O}{\|}}{C}\!-\!(CR^{2b}_2)_{\!n}\!-\!(OR^{3b})_{\!p}\!-\!(CR^{4b}_2)_{\!q}\!-\!L\!-\!OSO_3X^b$$

wherein $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;

$R^{2b}$ and $R^{4b}$ are each individually H or a substituent;

$R^{3b}$ is a C1-C10 alkylene group optionally containing a substituent;

n is an integer of 1 or greater;

p and q are each individually an integer of 0 or greater;

$X^b$ is H, a metal atom, NR$^{5b}_4$, imidazolium optionally containing a substituent, pyridinium optionally containing a substituent, or phosphonium optionally containing a substituent, where R$^{5b}$s are each H or an organic group and are the same as or different from each other;

any two of $R^{1b}$, $R^{2b}$, $R^{3b}$, and $R^{4b}$ optionally bind to each other to form a ring; and L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^6$CO—B—, where B is a single bond or a C1-C10 alkylene group optionally containing a substituent, $R^{6b}$ is H or a C1-C4 alkyl group optionally containing a substituent, and * indicates the bond to —OSO$_3$X$^b$ in the formula.

The invention also relates to use of a surfactant for production of a fluoropolymer by polymerizing a fluoromonomer in an aqueous medium, the surfactant including at least one selected from the group consisting of:

a surfactant (a) represented by the following formula (a):

[Chem. 6]

$$R^{1a}\!-\!\!\underset{\underset{O}{\|}}{C}\!-\!R^{2a}\!-\!\!\underset{\underset{O}{\|}}{C}\!-\!R^{3a}\!-\!OSO_3X^a$$

wherein
- $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
- $R^{2a}$ and $R^{3a}$ are each individually a single bond or a divalent linking group;
- $R^{1a}$, $R^{2a}$, and $R^{3a}$ contain six or more carbon atoms in total;
- $X^a$ is H, a metal atom, $NR^{4a}{}_4$, imidazolium optionally containing a substituent, pyridinium optionally containing a substituent, or phosphonium optionally containing a substituent, where $R^{4a}$s are each H or an organic group and are the same as or different from each other; and
- any two of $R^{1a}$, $R^{2a}$, and $R^{3a}$ optionally bind to each other to form a ring; and a surfactant (b) represented by the following formula (b):

[Chem. 7]

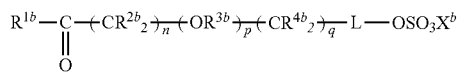

wherein
- $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;
- $R^{2b}$ and $R^{4b}$ are each individually H or a substituent;
- $R^{3b}$ is a C1-C10 alkylene group optionally containing a substituent;
- n is an integer of 1 or greater;
- p and q are each individually an integer of 0 or greater;
- $X^b$ is H, a metal atom, $NR^{5b}{}_4$, imidazolium optionally containing a substituent, pyridinium optionally containing a substituent, or phosphonium optionally containing a substituent, where $R^{5b}$s are each H or an organic group and are the same as or different from each other;
- any two of $R^{1b}$, $R^{2b}$, $R^{3b}$, and $R^{4b}$ optionally bind to each other to form a ring; and
- L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a C1-C10 alkylene group optionally containing a substituent, $R^{6b}$ is H or a C1-C4 alkyl group optionally containing a substituent, and * indicates the bond to —$OSO_3X^b$ in the formula.

The invention also relates to a composition containing a fluoropolymer and at least one surfactant selected from the group consisting of:

a surfactant (a) represented by the following formula (a):

[Chem. 8]

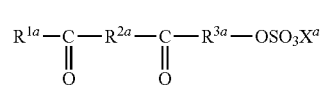

wherein
- $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
- $R^{2a}$ and $R^{3a}$ are each individually a single bond or a divalent linking group;
- $R^{1a}$, $R^{2a}$, and $R^{3a}$ contain six or more carbon atoms in total;
- $X^a$ is H, a metal atom, $NR^{4a}{}_4$, imidazolium optionally containing a substituent, pyridinium optionally containing a substituent, or phosphonium optionally containing a substituent, where $R^{4a}$s are each H or an organic group and are the same as or different from each other; and
- any two of $R^{1a}$, $R^{2a}$, and $R^{3a}$ optionally bind to each other to form a ring; and a surfactant (b) represented by the following formula (b):

[Chem. 9]

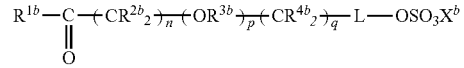

wherein
- $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;
- $R^{2b}$ and $R^{4b}$ are each individually H or a substituent;
- $R^{3b}$ is a C1-C10 alkylene group optionally containing a substituent;
- n is an integer of 1 or greater;
- p and q are each individually an integer of 0 or greater;
- $X^b$ is H, a metal atom, $NR^{5b}{}_4$, imidazolium optionally containing a substituent, pyridinium optionally containing a substituent, or phosphonium optionally containing a substituent, where $R^{5b}$s are each H or an organic group and are the same as or different from each other;
- any two of $R^{1b}$, $R^{2b}$, $R^{3b}$, and $R^{4b}$ optionally bind to each other to form a ring; and
- L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a C1-C10 alkylene group optionally containing a substituent, $R^{6b}$ is H or a C1-C4 alkyl group optionally containing a substituent, and * indicates the bond to —$OSO_3X^b$ in the formula.

The invention also relates to a composition containing a fluoropolymer and a compound represented by the following formula (3) in an amount of 500 ppb or more relative to the fluoropolymer, the formula (3) being $(H-(CF_2)_8-SO_3)_qM^2$, wherein $M^2$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and q is 1 or 2.

In the composition of the invention, the compound represented by the formula (3) may be present in an amount of more than 1000 ppb relative to the fluoropolymer.

In the composition of the invention, the compound represented by the formula (3) may be present in an amount of more than 1000 ppb and 20000 ppb or less relative to the fluoropolymer.

In the composition of the invention, the compound represented by the formula (3) may be present in an amount of 500 to 20000 ppb relative to the fluoropolymer.

In an embodiment, the composition of the invention further contains a compound represented by the following formula (4) in an amount of 500 to 20000 ppb or more relative to the fluoropolymer, the formula (4) being $(H-(CF_2)_7-COO)_pM^1$, wherein $M^1$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and p is 1 or 2.

The composition of the invention preferably has a tone L* of 50 or lower after firing and before a fluorine treatment.

The composition of the invention preferably exhibits a tone change ΔL* of 70% or higher before and after a fluorination treatment.

The invention also relates to a molded article containing the above composition.

The molded article of the invention is preferably a stretched article.

Advantageous Effects of Invention

The production method of the invention is a novel method for producing a fluoropolymer.

The production method of the invention includes polymerization in the presence of the above surfactant, and thus can produce a fluoropolymer having a high molecular weight and allows the surfactant to be less likely to remain in the resulting fluoropolymer.

DESCRIPTION OF EMBODIMENTS

Before the specific description of the invention, some terms used in the description are defined or described below.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means an ability of a polymer to be processed in a molten state using a conventional processing device such as an extruder or an injection molding machine. Thus, a melt-fabricable fluororesin usually has a melt flow rate of 0.01 to 500 g/10 min measured by a measurement method to be described later.

The fluoroelastomer as used herein means an amorphous fluoropolymer. The term "amorphous" means that a fluoropolymer has a melting peak (ΔH) of 4.5 J/g or lower determined by differential scanning calorimetry (DSC) (temperature-increasing rate: 10° C./min) or differential thermal analysis (DTA) (temperature-increasing rate: 10° C./min). The fluoroelastomer is to crosslink to exhibit elastomeric behavior. The elastomeric behavior means an ability of a polymer to be stretched and to maintain its original length when the force required to stretch the polymer is no longer applied.

The partially fluorinated elastomer as used herein means a fluoropolymer containing a fluoromonomer unit, containing a perfluoromonomer unit in an amount of less than 90 mol % of all polymerized units, having a glass transition temperature of 20° C. or lower, and having a melting peak (ΔH) of 4.5 J/g or lower.

The perfluoroelastomer as used herein means a fluoropolymer containing a perfluoromonomer unit in an amount of 90 mol % or more of all polymerized units, having a glass transition temperature of 20° C. or lower, having a melting peak (ΔH) of 4.5 J/g or lower, and having a fluorine atom concentration in the fluoropolymer of 71% by mass or more. The fluorine atom concentration in the fluoropolymer as used herein is the concentration (% by mass) of the fluorine atoms contained in the fluoropolymer calculated based on the types and amounts of the monomers constituting the fluoropolymer.

The perfluoromonomer as used herein means a monomer free from a carbon-hydrogen bond in the molecule. The perfluoromonomer may be a monomer which contains carbon atoms and fluorine atoms and in which some fluorine atoms binding to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer giving a crosslinking site.

The monomer giving a crosslinking site is a monomer (cure-site monomer) containing a crosslinkable group that can give a fluoropolymer a crosslinking site to form a crosslink with the use of a curing agent.

The polytetrafluoroethylene (PTFE) as used herein is preferably a fluoropolymer in which tetrafluoroethylene represents 99 mol % or more of all polymerized units.

The fluororesin other than polytetrafluoroethylene and the fluoroelastomer as used herein are each preferably a fluoropolymer in which tetrafluoroethylene represents less than 99 mol % of all polymerized units.

The amounts of the respective monomers constituting the fluoropolymer can be calculated by any appropriate combination of NMR, FT-IR, elemental analysis, and X-ray fluorescence analysis in accordance with the types of the monomers.

The term "organic group" as used herein means a group containing one or more carbon atoms or a group obtainable by removing one hydrogen atom from an organic compound.

Examples of the "organic group" include:
an alkyl group optionally containing one or more substituents,
an alkenyl group optionally containing one or more substituents,
an alkynyl group optionally containing one or more substituents,
a cycloalkyl group optionally containing one or more substituents,
a cycloalkenyl group optionally containing one or more substituents, a cycloalkadienyl group optionally containing one or more substituents, an aryl group optionally containing one or more substituents, an aralkyl group optionally containing one or more substituents, a non-aromatic heterocyclic group optionally containing one or more substituents, a heteroaryl group optionally containing one or more substituents, a cyano group, a formyl group, RaO—, RaCO—, RaSO$_2$—, RaCOO—, RaNRaCO—, RaCONRa-, RaOCO—, RaOSO$_2$—, and RaNRbSO$_2$—, wherein each Ra is independently an alkyl group optionally containing one or more substituents, an alkenyl group optionally containing one or more substituents, an alkynyl group optionally containing one or more substituents, a cycloalkyl group optionally containing one or more substituents, a cycloalkenyl group optionally containing one or more substituents, a cycloalkadienyl group optionally containing one or more substituents, an aryl group optionally containing one or more substituents, an aralkyl group optionally containing one or more substituents, a non-aromatic heterocyclic group optionally containing one or more substituents, or a heteroaryl group optionally containing one or more substituents, and each Rb is independently H or an alkyl group optionally containing one or more substituents.

The organic group is preferably an alkyl group optionally containing one or more substituents.

The term "substituent" as used herein means a group which can replace another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

In the description, the numerical ranges expressed by the endpoints each include all numbers within the range (for example, the range of 1 to 10 includes 1.4, 1.9, 2.33, 5.75, 9.98, and the like).

The phrase "at least one" as used herein includes all numbers equal to or greater than 1 (e.g., at least 2, at least 4, at least 6, at least 8, at least 10, at least 25, at least 50, at least 100, and the like).

The invention will be specifically described hereinbelow.

The production method of the invention is a method for producing a fluoropolymer including polymerizing a fluoromonomer in an aqueous medium in the presence of a surfactant to provide a fluoropolymer, the surfactant used therein including at least one surfactant (hereinafter, also referred to as a surfactant (1)) selected from the group consisting of:

a surfactant (a) represented by the following formula (a):

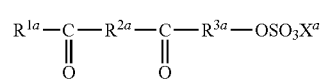

[Chem. 10]

(wherein $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;

$R^{2a}$ and $R^{3a}$ are each individually a single bond or a divalent linking group;

$R^{1a}$, $R^{2a}$, and $R^{3a}$ contain six or more carbon atoms in total;

$X^a$ is H, a metal atom, $NR^{4a}_4$, imidazolium optionally containing a substituent, pyridinium optionally containing a substituent, or phosphonium optionally containing a substituent, where $R^{4a}$s are each H or an organic group and are the same as or different from each other; and any two of $R^{1a}$, $R^{2a}$, and $R^{3a}$ optionally bind to each other to form a ring); and a surfactant (b) represented by the following formula (b):

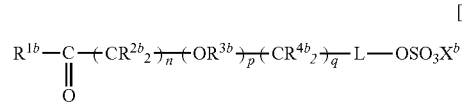

[Chem. 11]

(wherein $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;

$R^{2b}$ and $R^{4b}$ are each individually H or a substituent;
$R^{3b}$ is a C1-C10 alkylene group optionally containing a substituent;
n is an integer of 1 or greater;
p and q are each individually an integer of 0 or greater;
$X^b$ is H, a metal atom, $NR^{5b}_4$, imidazolium optionally containing a substituent, pyridinium optionally containing a substituent, or phosphonium optionally containing a substituent, where $R^{5b}$s are each H or an organic group and are the same as or different from each other;
any two of $R^{1b}$, $R^{2b}$, $R^{3b}$, and $R^{4b}$ optionally bind to each other to form a ring; and
L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a C1-C10 alkylene group optionally containing a substituent, $R^{6b}$ is H or a C1-C4 alkyl group optionally containing a substituent, and * indicates the bond to —$OSO_3X^b$ in the formula).

The surfactant (a) is described below.

In the formula (a), $R^{1a}$ is a linear or branched alkyl group containing one or more carbon atoms or a cyclic alkyl group containing three or more carbon atoms.

When containing three or more carbon atoms, the alkyl group may optionally contain a carbonyl group (—C(=O)—) between two carbon atoms. When containing two or more carbon atoms, the alkyl group may optionally contain a carbonyl group at an end of the alkyl group. In other words, acyl groups such as an acetyl group represented by $CH_3$—C(=O)— are also included in the alkyl group.

When containing three or more carbon atoms, the alkyl group may optionally contain a monovalent or divalent heterocycle, or may optionally form a cycle. The heterocycle is preferably an unsaturated heterocycle, more preferably an oxygen-containing unsaturated heterocycle, and may be a furan ring, for example. In $R^{1a}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group herein includes the number of carbon atoms constituting the carbonyl groups and the number of carbon atoms constituting the heterocycles. For example, the number of carbon atoms in the group represented by $CH_3$—C(=O)—$CH_2$— is 3, the number of carbon atoms in the group represented by $CH_3$—C(=O)—$C_2H_4$—C(=O)—$C_2H_4$— is 7, and the number of carbon atoms in the group represented by $CH_3$—C(=O)— is 2.

In the alkyl group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{101a}$, wherein $R^{101a}$ is an alkyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

In the formula, $R^{2a}$ and $R^{3a}$ are each individually a single bond or a divalent linking group.

Preferably, $R^{2a}$ and $R^{3a}$ are each individually a single bond, a linear or branched alkylene group containing one or more carbon atoms, or a cyclic alkylene group containing three or more carbon atoms.

The alkylene group constituting $R^{2a}$ and $R^{3a}$ is preferably free from a carbonyl group.

In the alkylene group, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{102a}$, wherein $R^{102a}$ is an alkyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group containing no halogen atoms such as fluorine atoms and chlorine atoms.

$R^{1a}$, $R^{2a}$, and $R^{3a}$ contain 6 or more carbon atoms in total. The total number of carbon atoms is preferably 8 or greater, more preferably 9 or greater, still more preferably 10 or greater, while preferably 20 or smaller, more preferably 18 or smaller, still more preferably 15 or smaller.

Any two of $R^{1a}$, $R^{2a}$, and $R^{3a}$ may optionally bind to each other to form a ring.

In the formula (a), $X^a$ is H, a metal atom, $NR^{4a}_4$, imidazolium optionally containing a substituent, pyridinium optionally containing a substituent, or phosphonium optionally containing a substituent, wherein $R^{4a}$ is H or an organic group, and the four $R^{4a}$s are the same as or different from each other. $R^{4a}$ is preferably H or a C1-C10 organic group, more preferably H or a C1-C4 organic group. Examples of the metal atom include alkali metals (Group 1) and alkaline earth metals (Group 2), and preferred is Na, K, or Li.

$X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When $X^a$ is $NH_4$, the surfactant can have excellent solubility in an aqueous medium and the metal component is less likely to remain in the fluoropolymer or the final product.

$R^{1a}$ is preferably a C1-C8 linear or branched alkyl group free from a carbonyl group, a C3-C8 cyclic alkyl group free from a carbonyl group, a C2-C45 linear or branched alkyl group containing 1 to 10 carbonyl groups, a C3-C45 cyclic alkyl group containing a carbonyl group, or a C3-C45 alkyl group containing a monovalent or divalent heterocycle.

$R^{1a}$ is more preferably a group represented by the following formula:

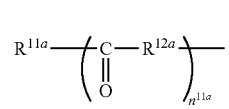

[Chem. 12]

wherein $n^{11a}$ is an integer of 0 to 10; $R^{11a}$ is a C1-C5 linear or branched alkyl group or a C3-C5 cyclic alkyl group; $R^{12a}$ is a C0-C3 alkylene group; and when $n^{11a}$ is an integer of 2 to 10, $R^{12a}$s are the same as or different from each other.

In the formula, $n^{11a}$ is preferably an integer of 0 to 5, more preferably an integer of 0 to 3, still more preferably an integer of 1 to 3.

The alkyl group for $R^{11a}$ is preferably free from a carbonyl group.

In the alkyl group for $R^{11a}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103a}$, wherein $R^{103a}$ is an alkyl group.

In the alkyl group for $R^{11a}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

$R^{12a}$ is a C0-C3 alkylene group. The number of carbon atoms is preferably 1 to 3.

The alkylene group for $R^{12a}$ may be either linear or branched.

The alkylene group for $R^{12a}$ is preferably free from a carbonyl group. $R^{12a}$ is more preferably an ethylene group (—C$_2$H$_4$—) or a propylene group (—C$_3$H$_6$—).

In the alkylene group for $R^{12a}$, a hydrogen atom that binds to a carbon atom may optionally be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104a}$, wherein $R^{104a}$ is an alkyl group.

In the alkylene group for $R^{12a}$, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkylene group containing no halogen atoms such as fluorine atoms and chlorine atoms.

$R^{2a}$ and $R^{3a}$ are preferably each individually an alkylene group free from a carbonyl group and containing one or more carbon atoms, more preferably a C1-C3 alkylene group free from a carbonyl group, still more preferably an ethylene group (—C$_2$H$_4$—) or a propylene group (—C$_3$H$_6$—).

Next, the surfactant (b) is described below.

In the formula (b), $R^{1b}$ is a linear or branched alkyl group containing one or more carbon atoms and optionally containing a substituent or a cyclic alkyl group containing three or more carbon atoms and optionally containing a substituent.

When containing three or more carbon atoms, the alkyl group may optionally contain a monovalent or divalent heterocycle, or may optionally form a cycle. The heterocycle is preferably an unsaturated heterocycle, more preferably an oxygen-containing unsaturated heterocycle, and may be a furan ring, for example. In $R^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group herein includes the number of carbon atoms constituting the heterocycles.

The substituent which may be contained in the alkyl group for $R^{1b}$ is preferably a halogen atom, a C1-C10 linear or branched alkyl group, a C3-C10 cyclic alkyl group, or a hydroxy group, particularly preferably a methyl group or an ethyl group.

The alkyl group for $R^{1b}$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

The alkyl group preferably contains no substituent.

$R^{1b}$ is preferably a C1-C10 linear or branched alkyl group optionally containing a substituent or a C3-C10 cyclic alkyl group optionally containing a substituent, more preferably a C1-C10 linear or branched alkyl group free from a carbonyl group or a C3-C10 cyclic alkyl group free from a carbonyl group, still more preferably a C1-C10 linear or branched alkyl group free from a substituent, further more preferably a C1-C3 linear or branched alkyl group free from a substituent, particularly preferably a methyl group (—CH$_3$) or an ethyl group (—C$_2$H$_5$), most preferably a methyl group (—CH$_3$).

In the formula (b), $R^{2b}$ and $R^{4b}$ are each individually H or a substituent; multiple $R^{2b}$s may be the same as or different from each other and multiple $R^{4b}$s may be the same as or different from each other.

The substituent for each of $R^{2b}$ and $R^{4b}$ is preferably a halogen atom, a C1-C10 linear or branched alkyl group, a C3-C10 cyclic alkyl group, or a hydroxy group, particularly preferably a methyl group or an ethyl group.

The alkyl group for each of $R^{2b}$ and $R^{4b}$ is preferably free from a carbonyl group.

In the alkyl group, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

The alkyl group preferably contains no substituent.

The alkyl group for each of $R^{2b}$ and $R^{4b}$ is preferably a C1-C10 linear or branched alkyl group free from a carbonyl group or a C3-C10 cyclic alkyl group free from a carbonyl group, more preferably a C1-C10 linear or branched alkyl group free from a carbonyl group, still more preferably a C1-C3 linear or branched alkyl group free from a substituent, particularly preferably a methyl group (—CH$_3$) or an ethyl group (—C$_2$H$_5$).

$R^{2b}$ and $R^{4b}$ are preferably each individually H or a C1-C10 linear or branched alkyl group free from a carbonyl group, more preferably H or a C1-C3 linear or branched alkyl group free from a substituent, still more preferably H, a methyl group (—CH$_3$), or an ethyl group (—C$_2$H$_5$), particularly preferably H.

In the formula (b), $R^{3b}$ is a C1-C10 alkylene group optionally containing a substituent; when multiple $R^{3b}$s are present, they may be the same as or different from each other.

The alkylene group is preferably free from a carbonyl group.

In the alkylene group, 75% or less of the hydrogen atoms binding to any of the carbon atoms may be replaced by halogen atoms, 50% or less thereof may be replaced by halogen atoms, or 25% or less thereof may be replaced by halogen atoms. The alkylene group is preferably a non-halogenated alkyl group containing no halogen atoms such as fluorine atoms and chlorine atoms.

The alkylene group preferably contains no substituent.

The alkylene group is preferably a C1-C10 linear or branched alkylene group optionally containing a substituent or a C3-C10 cyclic alkylene group optionally containing a substituent, preferably a C1-C10 linear or branched alkylene group free from a carbonyl group or a C3-C10 cyclic alkylene group free from a carbonyl group, more preferably a C1-C10 linear or branched alkylene group free from a substituent, still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R^{3b}$, and $R^{4b}$ may bind to each other to form a ring, but they preferably do not form a ring.

In the formula (b), n is an integer of 1 or greater; n is preferably an integer of 1 to 40, more preferably an integer of 1 to 30, still more preferably an integer of 5 to 25, particularly preferably an integer of 5 to 9 and 11 to 25.

In the formula (b), p and q are each individually an integer of 0 or greater; p is preferably an integer of 0 to 10, more preferably 0 or 1, while q is preferably an integer of 0 to 10, more preferably an integer of 0 to 5.

The sum of n, p, and q is preferably an integer of 5 or greater. The sum of n, p, and q is more preferably an integer of 8 or greater. The sum of n, p, and q is also preferably an integer of 60 or smaller, more preferably an integer of 50 or smaller, still more preferably an integer of 40 or smaller.

In the formula (b), $X^b$ is H, a metal atom, $NR^{5b}_4$, imidazolium optionally containing a substituent, pyridinium optionally containing a substituent, or phosphonium optionally containing a substituent, wherein $R^{5b}$ is H or an organic group, and the four $R^{5b}$s are the same as or different from each other. $R^{5b}$ is preferably H or a C1-C10 organic group, more preferably H or a C1-C4 organic group. Examples of the metal atom include alkali metals (Group 1) and alkaline earth metals (Group 2), and preferred is Na, K, or Li. $X^b$ may be a metal atom or $NR^{5b}_4$ (wherein $R^{5b}$ is defined as described above).

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, most preferably $NH_4$ because it can be easily removed. When $X^b$ is $NH_4$, the surfactant can have excellent solubility in an aqueous medium and the metal component is less likely to remain in the fluoropolymer or the final product.

In the formula (b), L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a C1-C10 alkylene group optionally containing a substituent, $R^{6b}$ is H or a C1-C4 alkyl group optionally containing a substituent. The alkylene group more preferably contains 1 to 5 carbon atoms. $R^6$ is more preferably H or a methyl group. The symbol * indicates the bond to —$OSO_3X^b$ in the formula.

L is preferably a single bond.

The surfactant (b) is preferably a compound represented by the following formula:

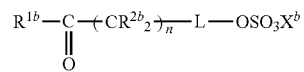

[Chem. 13]

wherein $R^{1b}$, $R^{2b}$, L, n, and $X^b$ are defined as described above.

The surfactant preferably has a $^1$H-NMR spectrum in which all peak intensities observed in a chemical shift range of 2.0 to 5.0 ppm give an integral of 10% or higher.

The surfactant preferably has a $^1$H-NMR spectrum in which all peak intensities observed in a chemical shift range of 2.0 to 5.0 ppm give an integral within the above range. In this case, the surfactant preferably has a ketone structure in the molecule.

The integral of the surfactant is more preferably 15 or greater, while preferably 95 or smaller, more preferably 80 or smaller, still more preferably 70 or smaller.

The integral is determined using a heavy water solvent at room temperature. The heavy water content is adjusted to 4.79 ppm.

Examples of the surfactant (a) include the following surfactants. In each formula, $X^a$ is defined as described above.

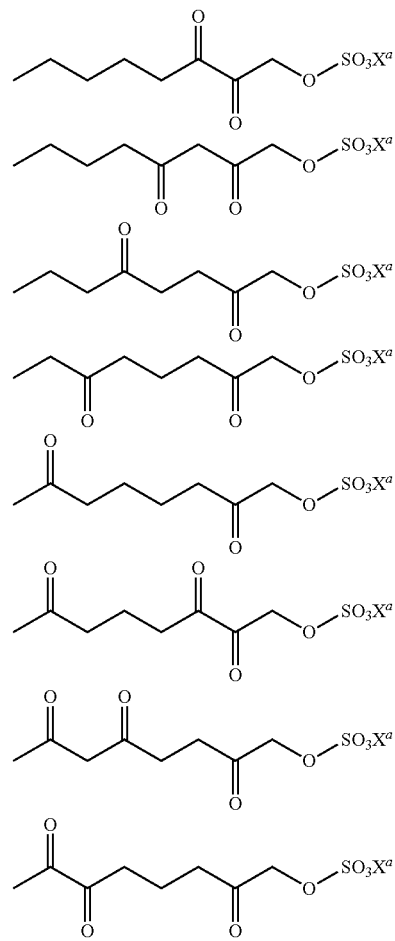

[Chem. 14]

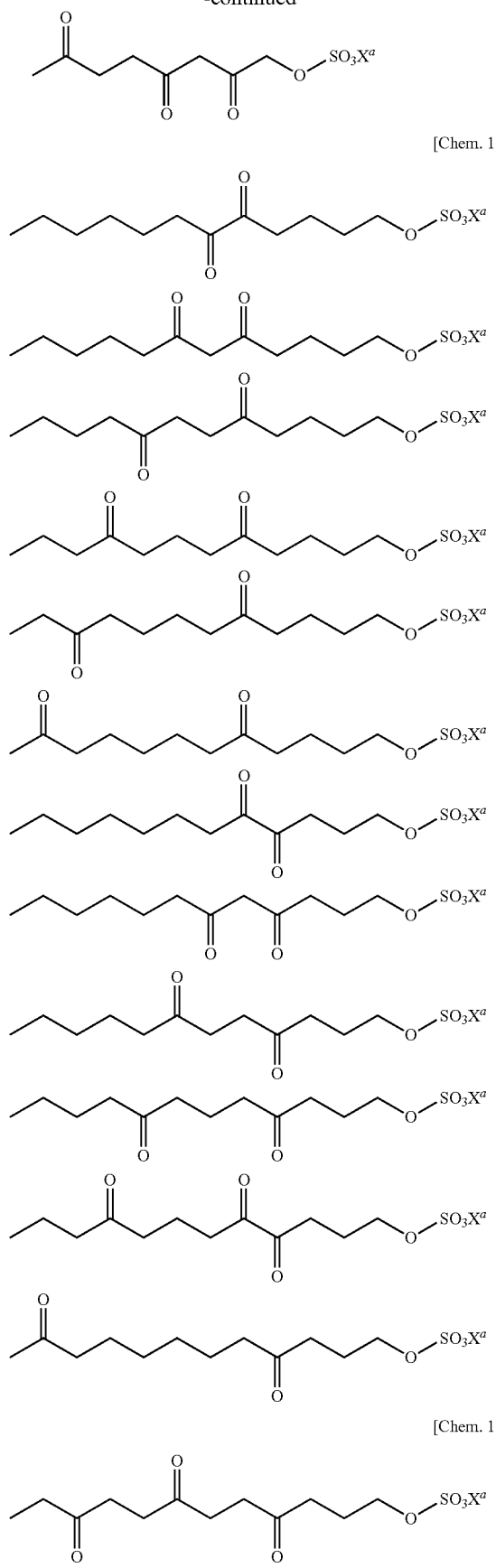
[Chem. 15]
[Chem. 16]
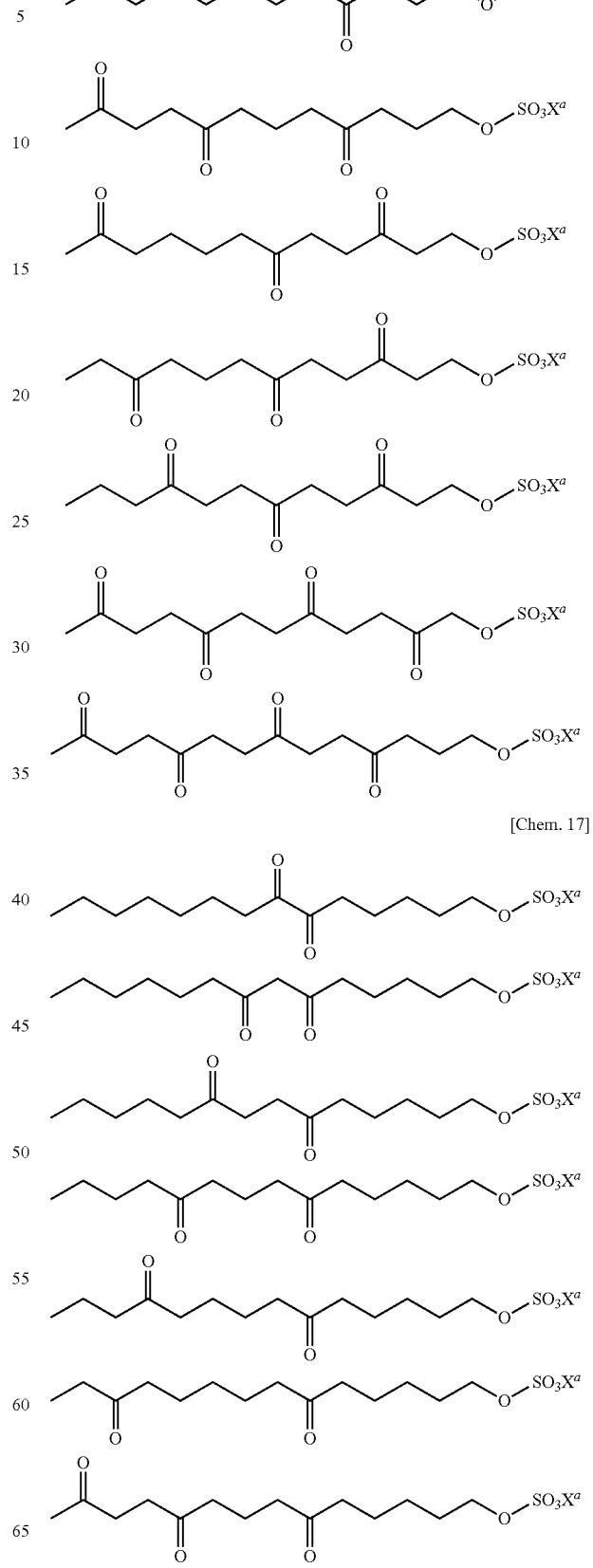
[Chem. 17]

-continued
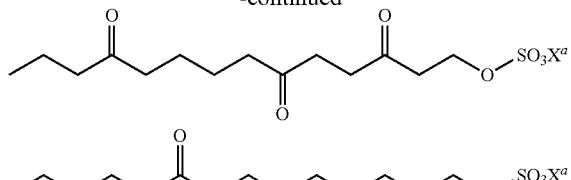
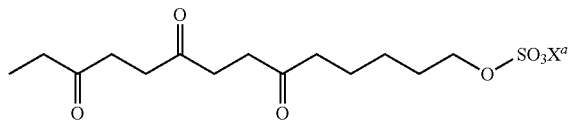
[Chem. 18]
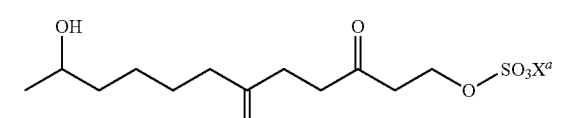
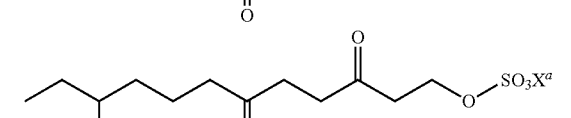
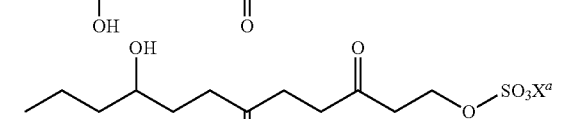
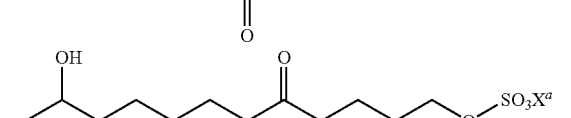
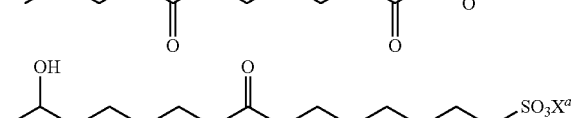
[Chem. 19]
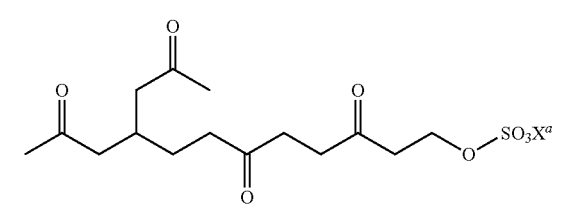
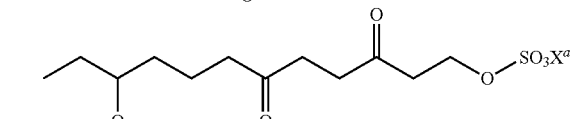
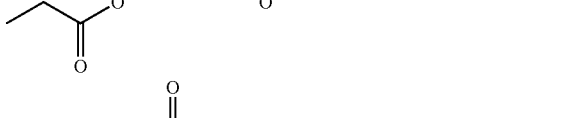
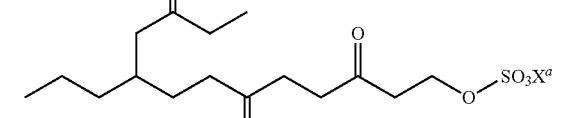
-continued
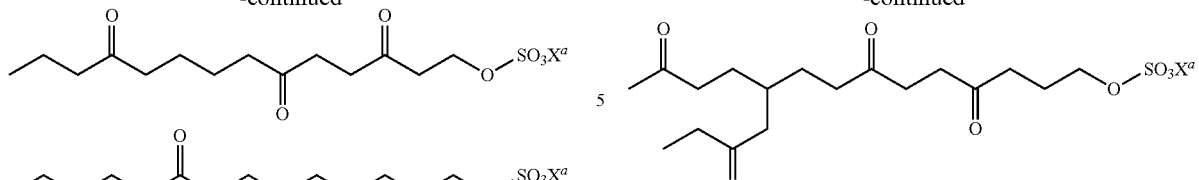
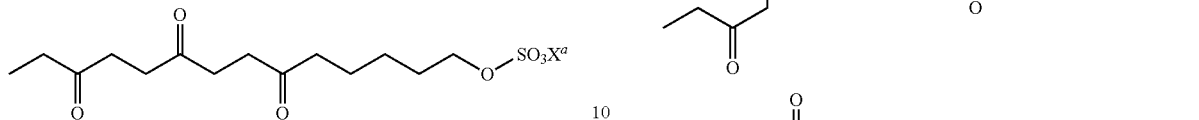
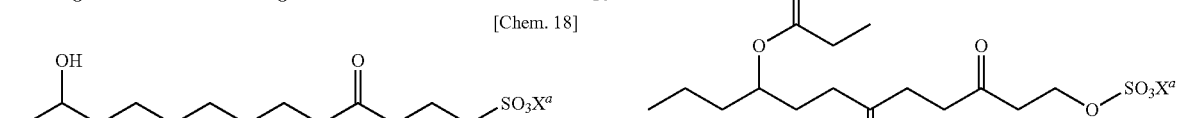
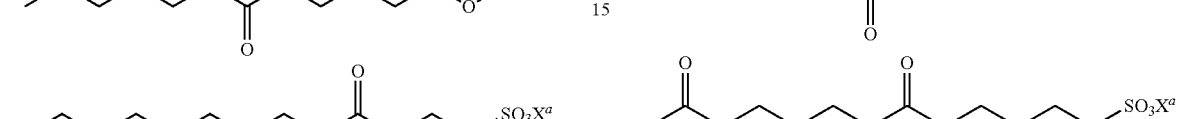
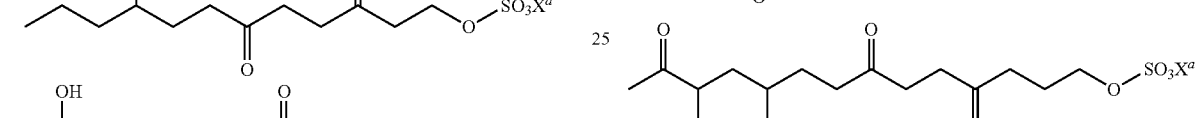
[Chem. 20]
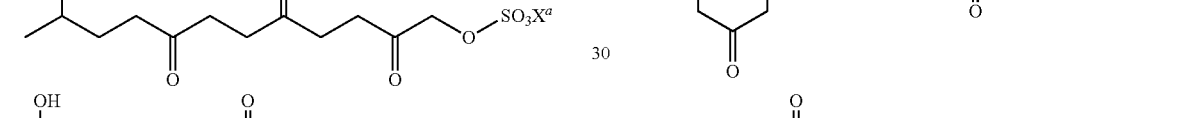
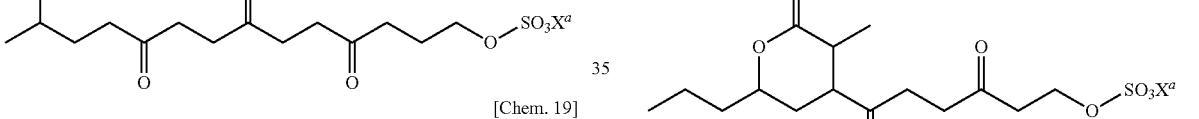

The surfactant (a) is a novel compound, and can be produced by any of the following production methods, for example.

The surfactant (a) may be produced by a production method including:
a step (11a) of reacting a compound (10a) represented by the following formula:

[Chem. 22]

(wherein $R^{3a}$ is defined as described above; and $E^a$ is a leaving group), lithium, and a chlorosilane compound represented by the formula: $R^{201a}{}_3Si—Cl$ (wherein $R^{201a}$s are each individually an alkyl group or an aryl group) to provide a compound (11a) represented by the following formula:

[Chem. 23]

$$R^{201a}{}_3—Si—C(=O)—R^{3a}—OE^a$$

(wherein $R^{3a}$, $R^{201a}$, and $E^a$ are defined as described above);
a step (12a) of reacting the compound (11a) and an olefin represented by the following formula:

[Chem. 24]

$$R^{1a}—C(=O)—R^{21a}—CH=CH_2$$

(wherein $R^{1a}$ is defined as described above; and $R^{21a}$ is a single bond or a divalent linking group) to provide a compound (12a) represented by the following formula:

[Chem. 25]

$$R^{1a}—C(=O)—R^{21a}—\cdots—C(=O)—R^{3a}—OE^a$$

(wherein $R^{1a}$, $R^{21a}$, $R^{3a}$, and $E^a$ are defined as described above);
a step (13a) of eliminating the leaving group in the compound (12a) to provide a compound (13a) represented by the following formula:

[Chem. 26]

$$R^{1a}—C(=O)—R^{21a}—\cdots—C(=O)—R^{3a}—OH$$

(wherein $R^{1a}$, $R^{21a}$, and $R^{3a}$ are defined as described above); and a step (14a) of reacting the compound (13a) and a chlorosulfonic acid represented by the following formula:

[Chem. 27]

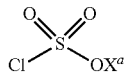

(wherein $X^a$ is defined as described above) to provide a compound (14a) represented by the following formula:

[Chem. 26]

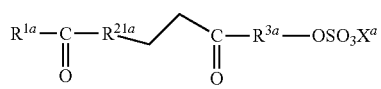

(wherein $R^{1a}$, $R^{21a}$, $R^{3a}$, and $X^a$ are defined as described above).

When $R^{1a}$ contains a furan ring, the furan ring may be cleaved with an acid and converted into a dicarbonyl derivative, for example. Examples of the acid include acetic acid, hydrochloric acid, and p-toluenesulfonic acid. Acetic acid is preferred.

In the step (11a), the compound (11a) is preferably obtained by reacting lithium and the chlorosilane compound in advance to provide a siloxylithium compound, and then reacting this siloxylithium compound and the compound (10a).

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{21a}$ is preferably a single bond or a linear or branched alkylene group containing one or more carbon atoms.

Examples of the chlorosilane compound include the following.

[Chem. 29]

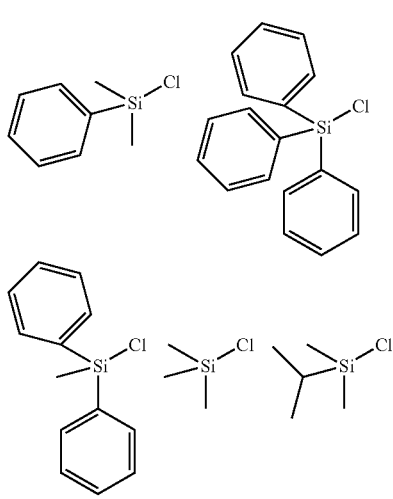

-continued

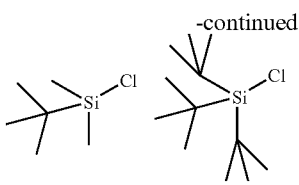

Any of the reactions in the step (11a) may be performed in a solvent. The solvent is preferably an organic solvent, more preferably an aprotic polar solvent, still more preferably an ether. Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ethers (e.g., 15-crown-5, 18-crown-6). Tetrahydrofuran and diethyl ether are preferred.

The temperature of the reaction between lithium and the chlorosilane compound in the step (11a) is preferably 10° C. to 40° C., more preferably 20° C. to 30° C.

The temperature of the reaction between the siloxylithium compound and the compound (10a) in the step (11a) is preferably −100° C. to 0° C., more preferably −80° C. to −50° C.

The pressure of the reaction between lithium and the chlorosilane compound in the step (11a) is preferably 0.1 to 5 MPa, more preferably 0.1 to 1 MPa.

The pressure of the reaction between the siloxylithium compound and the compound (10a) in the step (11a) is preferably 0.1 to 5 MPa, more preferably 0.1 to 1 MPa.

The duration of the reaction between lithium and the chlorosilane compound in the step (11a) is preferably 0.1 to 72 hours, more preferably 6 to 10 hours.

The duration of the reaction between the siloxylithium compound and the compound (10a) in the step (11a) is preferably 0.1 to 72 hours, more preferably 1 to 2 hours.

For the reaction ratio between the compound (11a) and the olefin in the step (12a), the amount of the olefin is preferably 1 to 2 mol, more preferably 1 to 1.1 mol, relative to 1 mol of the compound (11a), so as to improve the yield and to reduce the waste.

The reaction in the step (12a) may be performed in a solvent in the presence of a thiazolium salt or a base.

Examples of the thiazolium salt include 3-ethyl-5-(2-hydroxyethyl)-4-methylthiazolium bromide and 3-benzyl-5-(2-hydroxyethyl)-4-methylthiazolium chloride.

Examples of the base include 1,8-diazabicyclo[5.4.0]-7-undecene and triethylamine.

The solvent is preferably an organic solvent, more preferably an aprotic polar solvent, still more preferably an alcohol or an ether.

Examples of the alcohol include methanol, ethanol, 1-propanol, and isopropanol.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Tetrahydrofuran and diethyl ether are preferred.

The reaction temperature in the step (12a) is preferably 40° C. to 60° C., more preferably 50° C. to 55° C.

The reaction pressure in the step (12a) is preferably 0.1 to 5 MPa, more preferably 0.1 to 1 MPa.

The reaction duration in the step (12a) is preferably 0.1 to 72 hours, more preferably 6 to 10 hours.

The elimination reaction for the leaving group in the step (13a) may be performed using a fluoride ion or an acid. Examples of methods of eliminating the leaving group include a method using hydrofluoric acid; a method using an amine complex of hydrogen fluoride such as pyridine-nHF or triethylamine-nHF; a method using an inorganic salt such as cesium fluoride, potassium fluoride, lithium tetrafluoroborate ($LiBF_4$), or ammonium fluoride; and a method using an organic salt such as tetrabutylammonium fluoride (TBAF).

The elimination reaction for the leaving group in the step (13a) may be performed in a solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ethers (e.g., 15-crown-5, 18-crown-6). Tetrahydrofuran and diethyl ether are preferred.

The reaction temperature in the step (13a) is preferably 0° C. to 40° C., more preferably 0° C. to 20° C.

The reaction pressure in the step (13a) is preferably 0.1 to 5 MPa, more preferably 0.1 to 1 MPa.

The reaction duration in the step (13a) is preferably 0.1 to 72 hours, more preferably 3 to 8 hours.

For the reaction ratio between the compound (13a) and the chlorosulfonic acid in the step (14a), the amount of the chlorosulfonic acid is preferably 1 to 2 mol, more preferably 1 to 1.1 mol, relative to 1 mol of the compound (13a), so as to improve the yield and to reduce the waste.

The reaction in the step (14a) is preferably performed in the presence of a base. Examples of the base include alkali metal hydroxides, alkaline earth metal hydroxides, and amines. Amines are preferred.

Examples of the amines in the step (14a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Triethylamine and pyridine are preferred.

The amount of the base used in the step (14a) is preferably 1 to 2 mol, more preferably 1 to 1.1 mol, relative to 1 mol of the compound (13a), so as to improve the yield and to reduce the waste.

The reaction in the step (14a) may be performed in a polar solvent. The solvent is preferably an organic solvent, more preferably an aprotic polar solvent, still more preferably an ether.

Examples of the ether include ethyl methyl ether, diethyl ether, monoglyme (ethylene glycol dimethyl ether), diglyme (diethylene glycol dimethyl ether), triglyme (triethylene glycol dimethyl ether), tetrahydrofuran, tetraglyme (tetraethylene glycol dimethyl ether), and crown ethers (e.g., 15-crown-5, 18-crown-6). Diethyl ether is preferred.

The reaction temperature in the step (14a) is preferably 0° C. to 40° C., more preferably 0° C. to 20° C.

The reaction pressure in the step (14a) is preferably 0.1 to 5 MPa, more preferably 0.1 to 1 MPa.

The reaction duration in the step (14a) is preferably 0.1 to 72 hours, more preferably 3 to 12 hours.

The reaction in the step (14a) performed in a solvent can provide a solution containing the compound (14a) after completion of the reaction. Optionally, the compound (14a) at high purity may be collected therefrom by adding water to the solution, leaving the mixture to stand and thereby separating the mixture into two phases, collecting the aqueous phase, and evaporating the solvent. When the compound (14a) contains a group represented by —$OSO_3H$ (i.e., when X is H), an alkaline aqueous solution such as a sodium hydrogen carbonate aqueous solution or ammonia water may be used instead of water to convert the —$OSO_3H$ group into a sulfuric acid salt group.

The resulting compounds may be subjected to any of evaporation of a solvent or operations such as distillation and purification after the respective steps, whereby the purity of each compound may be increased.

The surfactant (a) may also be produced by a production method including:

a step (21a) of reacting a ketone represented by the following formula:

[Chem. 30]

(wherein $R^{3a}$ is defined as described above; $R^{22a}$ is a monovalent organic group; and $E^a$ is a leaving group) and a carboxylate represented by the following formula:

[Chem. 31]

(wherein $R^{1a}$ is defined as described above; and $R^{23a}$ is a monovalent organic group) to provide a compound (21a) represented by the following formula:

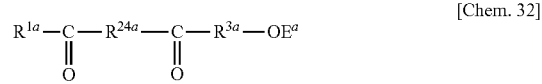
[Chem. 32]

(wherein $R^{1a}$, $R^{3a}$, and $E^a$ are defined as described above; and $R^{24a}$ is a single bond or a divalent linking group);

a step (22a) of eliminating the leaving group in the compound (21a) to provide a compound (22a) represented by the following formula:

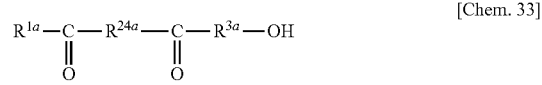
[Chem. 33]

(wherein $R^{1a}$, $R^{24a}$, and $R^{3a}$ are defined as described above); and a step (23a) of reacting the compound (22a) and a chlorosulfonic acid represented by the following formula:

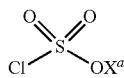

(wherein $X^a$ is defined as described above) to provide a compound (23a) represented by the following formula:

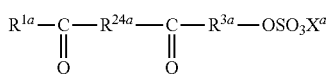

(wherein $R^{1a}$, $R^{24a}$, $R^{3a}$, and $X^a$ are defined as described above).

When $R^{1a}$ contains a furan ring, the furan ring may be cleaved with an acid and converted into a dicarbonyl derivative, for example. Examples of the acid include acetic acid, hydrochloric acid, and p-toluenesulfonic acid. Acetic acid is preferred.

$E^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

$R^{22a}$ is preferably a linear or branched alkyl group containing one or more carbon atoms, more preferably a methyl group.

$R^{23a}$ is preferably a linear or branched alkyl group containing one or more carbon atoms, more preferably a methyl group.

$R^{24a}$ is preferably a linear or branched alkylene group containing one or more carbon atoms, more preferably a methylene group ($-CH_2-$).

The reaction in the step (21a) may be performed in a solvent in the presence of a base.

Examples of the base include sodium amide, sodium hydride, sodium methoxide, and sodium ethoxide.

The solvent is preferably an organic solvent, more preferably an aprotic polar solvent, still more preferably an alcohol or an ether.

Examples of the alcohol include methanol, ethanol, 1-propanol, and isopropanol.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme(tetraethylene glycol dimethyl ether), and crown ethers (e.g., 15-crown-5, 18-crown-6). Tetrahydrofuran and diethyl ether are preferred.

The reaction temperature in the step (21a) is preferably 0° C. to 40° C., more preferably 0° C. to 20° C.

The reaction pressure in the step (21a) is preferably 0.1 to 5 MPa, more preferably 0.1 to 1 MPa.

The reaction duration in the step (21a) is preferably 0.1 to 72 hours, more preferably 3 to 8 hours.

The elimination reaction for the leaving group in the step (22a) may be performed using a fluoride ion or an acid. Examples of methods of eliminating the leaving group include a method of using hydrofluoric acid; a method of using an amine complex of hydrogen fluoride such as pyridine-nHF or triethylamine-nHF; a method of using an inorganic salt such as cesium fluoride, potassium fluoride, lithium tetrafluoroborate ($LiBF_4$), or ammonium fluoride; and a method of using an organic salt such as tetrabutylammonium fluoride (TBAF).

The elimination reaction for the leaving group in the step (22a) may be performed in a solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Tetrahydrofuran and diethyl ether are preferred.

The reaction temperature in the step (22a) is preferably 0° C. to 40° C., more preferably 0° C. to 20° C.

The reaction pressure in the step (22a) is preferably 0.1 to 5 MPa, more preferably 0.1 to 1 MPa.

The reaction duration in the step (22a) is preferably 0.1 to 72 hours, more preferably 3 to 8 hours.

For the reaction ratio between the compound (22a) and the chlorosulfonic acid in the step (23a), the amount of the chlorosulfonic acid is preferably 1 to 2 mol, more preferably 1 to 1.1 mol, relative to 1 mol of the compound (22a), so as to improve the yield and to reduce the waste.

The reaction in the step (23a) is preferably performed in the presence of a base. Examples of the base include alkali metal hydroxides, alkaline earth metal hydroxides, and amines. Amines are preferred.

Examples of the amines in the step (23a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Triethylamine and pyridine are preferred.

The amount of the base used in the step (23a) is preferably 1 to 2 mol, more preferably 1 to 1.1 mol, relative to 1 mol of the compound (22a), so as to improve the yield and to reduce the waste.

The reaction in the step (23a) may be performed in a polar solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Diethyl ether is preferred.

The reaction temperature in the step (23a) is preferably 0° C. to 40° C., more preferably 0° C. to 20° C.

The reaction pressure in the step (23a) is preferably 0.1 to 5 MPa, more preferably 0.1 to 1 MPa.

The reaction duration in the step (23a) is preferably 0.1 to 72 hours, more preferably 3 to 12 hours.

The reaction in the step (23a) performed in a solvent can provide a solution containing the compound (23a) after completion of the reaction. Optionally, the compound (23a) at high purity may be collected therefrom by adding water to the solution, leaving the mixture to stand and thereby separating the mixture into two phases, collecting the aqueous phase, and evaporating the solvent. When the compound (23a) contains a group represented by $-OSO_3H$ (i.e., when X is H), an alkaline aqueous solution such as a sodium hydrogen carbonate aqueous solution or ammonia water may be used instead of water to convert the —OSO$_3$H group into a sulfuric acid salt group.

The resulting compounds may be subjected to any of evaporation of a solvent or operations such as distillation and purification after the respective steps, whereby the purity of each compound may be increased.

The surfactant (a) may also be produced by a method including:

a step (31a) of reacting an alkyl halide represented by the following formula:

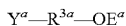

(wherein R$^{3a}$ is defined as described above; Y$^a$ is a halogen atom; and E$^a$ is a leaving group) and lithium acetylide represented by the following formula:

[Chem. 36]

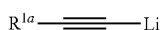

(wherein R$^{1a}$ is defined as described above) to provide a compound (31a) represented by the following formula:

[Chem. 37]

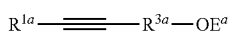

(wherein R$^{1a}$, R$^{3a}$, and E$^a$ are defined as described above);

a step (32a) of oxidizing the compound (31a) to provide a compound (32a) represented by the following formula:

[Chem. 38]

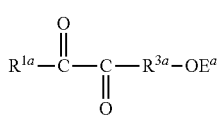

(wherein R$^{1a}$, R$^{3a}$, and E$^a$ are defined as described above);

a step (33a) of eliminating the leaving group in the compound (32a) to provide a compound (33a) represented by the following formula:

[Chem. 39]

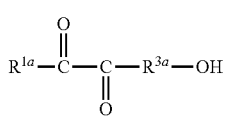

(wherein R$^{1a}$ and R$^{3a}$ are defined as described above); and a step (34a) of reacting the compound (33a) and a chlorosulfonic acid represented by the following formula:

[Chem. 40]

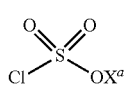

(wherein X$^a$ is defined as described above) to provide a compound (34a) represented by the following formula:

[Chem. 41]

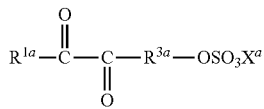

(wherein R$^{1a}$, R$^{3a}$, and X$^a$ are defined as described above).

When R$^{1a}$ contains a furan ring, the furan ring may be cleaved with an acid and converted into a dicarbonyl derivative, for example. Examples of the acid include acetic acid, hydrochloric acid, and p-toluenesulfonic acid. Acetic acid is preferred.

E$^a$ represents a leaving group. Examples of the leaving group include a tert-butyldimethylsilyl (TBS) group, a triethylsilyl (TES) group, a triisopropylsilyl (TIPS) group, a tert-butyldiphenylsilyl (TBDPS) group, and a benzyl (Bn) group.

For the reaction ratio between the alkyl halide and the lithium acetylide in the step (31a), the amount of the lithium acetylide is preferably 1 to 2 mol, more preferably 1 to 1.2 mol, relative to 1 mol of the alkyl halide, so as to improve the yield and to reduce the waste.

The reaction in the step (31a) may be performed in a solvent. The solvent is preferably hexane.

The reaction temperature in the step (31a) is preferably −100° C. to −40° C., more preferably −80° C. to −50° C.

The reaction pressure in the step (31a) is preferably 0.1 to 5 MPa, more preferably 0.1 to 1 MPa.

The reaction duration in the step (31a) is preferably 0.1 to 72 hours, more preferably 6 to 10 hours.

The oxidation in the step (32a) may be performed in a nitrile solvent using a complex generated by treating [(Cn*)Ru$^{III}$(CF$_3$CO$_2$)$_3$]·H$_2$O(wherein Cn* is 1,4,7-trimethyl-1,4,7-triazabicyclononane) with (NH$_4$)$_2$Ce(NO$_3$)$_6$ and trifluoroacetic acid and then adding sodium perchlorate thereto.

After the oxidation is completed, the product may be neutralized with an alkali, and then an organic solvent such as an ether may be used to extract the compound (32a).

The reaction temperature in the step (32a) is preferably 30° C. to 100° C., more preferably 40° C. to 90° C.

The reaction pressure in the step (32a) is preferably 0.1 to 5 MPa, more preferably 0.1 to 1 MPa.

The reaction duration in the step (32a) is preferably 0.1 to 72 hours, more preferably 3 to 8 hours.

The elimination reaction for the leaving group in the step (33a) may be performed using a fluoride ion or an acid. Examples of methods of eliminating the leaving group include a method of using hydrofluoric acid; a method of using an amine complex of hydrogen fluoride such as pyridine-nHF or triethylamine-nHF; a method of using an inorganic salt such as cesium fluoride, potassium fluoride, lithium tetrafluoroborate (LiBF$_4$), or ammonium fluoride; and a method of using an organic salt such as tetrabutylammonium fluoride (TBAF).

The elimination reaction for the leaving group in the step (33a) may be performed in a solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Tetrahydrofuran and diethyl ether are preferred.

The reaction temperature in the step (33a) is preferably 0° C. to 40° C., more preferably 0° C. to 20° C.

The reaction pressure in the step (33a) is preferably 0.1 to 5 MPa, more preferably 0.1 to 1 MPa.

The reaction duration in the step (33a) is preferably 0.1 to 72 hours, more preferably 3 to 8 hours.

For the reaction ratio between the compound (33a) and the chlorosulfonic acid in the step (34a), the amount of the chlorosulfonic acid is preferably 1 to 2 mol, more preferably 1 to 1.1 mol, relative to 1 mol of the compound (33a), so as to improve the yield and to reduce the waste.

The reaction in the step (34a) is preferably performed in the presence of a base. Examples of the base include alkali metal hydroxides, alkaline earth metal hydroxides, and amines. Amines are preferred.

Examples of the amines in the step (34a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Triethylamine and pyridine are preferred.

The amount of the base used in the step (34a) is preferably 1 to 2 mol, more preferably 1 to 1.1 mol, relative to 1 mol of the compound (33a), so as to improve the yield and to reduce the waste.

The reaction in the step (34a) may be performed in a polar solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Diethyl ether is preferred.

The reaction temperature in the step (34a) is preferably 0° C. to 40° C., more preferably 0° C. to 20° C.

The reaction pressure in the step (34a) is preferably 0.1 to 5 MPa, more preferably 0.1 to 1 MPa.

The reaction duration in the step (34a) is preferably 0.1 to 72 hours, more preferably 3 to 12 hours.

The reaction in the step (34a) performed in a solvent can provide a solution containing the compound (34a) after completion of the reaction. Optionally, the compound (34a) at high purity may be collected therefrom by adding water to the solution, leaving the mixture to stand and thereby separating the mixture into two phases, collecting the aqueous phase, and evaporating the solvent. When the compound (34a) contains a group represented by —OSO$_3$H (i.e., when X is H), an alkaline aqueous solution such as a sodium hydrogen carbonate aqueous solution or ammonia water may be used instead of water to convert the —OSO$_3$H group into a sulfuric acid salt group.

The resulting compounds may be subjected to any of evaporation of a solvent or operations such as distillation and purification after the respective steps, whereby the purity of each compound may be increased.

The surfactant (a) may also be produced by a production method including:

a step (41a) of reacting an alkene represented by the following formula:

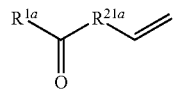

[Chem. 42]

(wherein $R^{1a}$ is defined as described above; and $R^{21a}$ is a single bond or a divalent linking group) and an alkyne represented by the following formula:

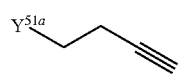

[Chem. 43]

(wherein $Y^{51a}$ is an alkoxy group) to provide a compound (41a) represented by the following formula:

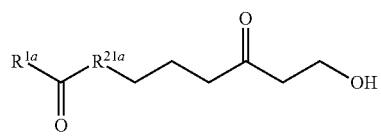

[Chem. 44]

(wherein $R^{1a}$ and $R^{21a}$ are defined as described above); and a step (42a) of reacting the compound (41a) and a chlorosulfonic acid represented by the following formula:

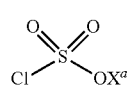

[Chem. 45]

(wherein $X^a$ is defined as described above) to provide a compound (42a) represented by the following formula:

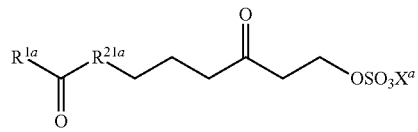

[Chem. 46]

(wherein $R^{1a}$, $R^{21a}$, and $X^a$ are defined as described above).

When $R^{1a}$ contains a furan ring, the furan ring may be cleaved with an acid and converted into a dicarbonyl derivative, for example. Examples of the acid include acetic acid, hydrochloric acid, and p-toluenesulfonic acid. Acetic acid is preferred.

$R^{21a}$ is preferably a single bond or a linear or branched alkylene group containing one or more carbon atoms.

For the reaction ratio between the alkene and the alkyne in the step (41a), the amount of the alkene is preferably 0.5 to 2 mol, more preferably 0.6 to 1.2 mol, relative to 1 mol of the alkyne, so as to improve the yield and to reduce the waste.

The reaction in the step (41a) is preferably performed in the presence of a metal catalyst. An example of the metal is ruthenium.

The amount of the metal catalyst used in the step (41a) is preferably 0.01 to 0.4 mol, more preferably 0.05 to 0.1 mol, relative to 1 mol of the alkene, so as to improve the yield and to reduce the waste.

The reaction in the step (41a) may be performed in a polar solvent. The solvent is preferably water, acetonitrile, dimethylacetamide, or dimethylformamide.

The reaction temperature in the step (41a) is preferably 20° C. to 160° C., more preferably 40° C. to 140° C.

The reaction pressure in the step (41a) is preferably 0.1 to 5 MPa, more preferably 0.1 to 1 MPa.

The reaction duration in the step (41a) is preferably 0.1 to 72 hours, more preferably 4 to 8 hours.

For the reaction ratio between the compound (41a) and the chlorosulfonic acid in the step (42a), the amount of the chlorosulfonic acid is preferably 1 to 2 mol, more preferably 1 to 1.1 mol, relative to 1 mol of the compound (41a), so as to improve the yield and to reduce the waste.

The reaction in the step (42a) is preferably performed in the presence of a base. Examples of the base include alkali metal hydroxides, alkaline earth metal hydroxides, and amines. Amines are preferred.

Examples of the amines in the step (42a) include tertiary amines such as trimethylamine, triethylamine, tributylamine, N,N-dimethylaniline, dimethylbenzylamine, and N,N,N',N'-tetramethyl-1,8-naphthalenediamine, heteroaromatic amines such as pyridine, pyrrole, uracil, collidine, and lutidine, and cyclic amines such as 1,8-diaza-bicyclo[5.4.0]-7-undecene and 1,5-diaza-bicyclo[4.3.0]-5-nonene. Triethylamine and pyridine are preferred.

The amount of the base used in the step (42a) is preferably 1 to 2 mol, more preferably 1 to 1.1 mol, relative to 1 mol of the compound (41a), so as to improve the yield and to reduce the waste.

The reaction in the step (42a) may be performed in a polar solvent. The solvent is preferably an organic solvent, more preferably an aprotic polar solvent, still more preferably an ether.

Examples of the ether include ethyl methyl ether, diethyl ether, monoglyme(ethylene glycol dimethyl ether), diglyme (diethylene glycol dimethyl ether), triglyme(triethylene glycol dimethyl ether), tetrahydrofuran, tetraglyme (tetraethylene glycol dimethyl ether), and crown ethers (e.g., 15-crown-5, 18-crown-6). Diethyl ether is preferred.

The reaction temperature in the step (42a) is preferably 0° C. to 40° C., more preferably 0° C. to 20° C.

The reaction pressure in the step (42a) is preferably 0.1 to 5 MPa, more preferably 0.1 to 1 MPa.

The reaction duration in the step (42a) is preferably 0.1 to 72 hours, more preferably 3 to 12 hours.

The reaction in the step (42a) performed in a solvent can provide a solution containing the compound (42a) after completion of the reaction. Optionally, the compound (42a) at high purity may be collected therefrom by adding water to the solution, leaving the mixture to stand and thereby separating the mixture into two phases, collecting the aqueous phase, and evaporating the solvent. When the compound (42a) contains a group represented by —OSO₃H (i.e., when X is H), an alkaline aqueous solution such as a sodium hydrogen carbonate aqueous solution or ammonia water may be used instead of water to convert the —OSO₃H group into a sulfuric acid salt group.

The resulting compounds may be subjected to any of evaporation of a solvent or operations such as distillation and purification after the respective steps, whereby the purity of each compound may be increased.

Examples of the surfactant (b) include $CH_3C(O)$
$CH_2CH_2CH_2CH_2CH_2CH_2CH_2CH_2CH_2OSO_3Na$,
$CH_3C(O)CH_2CH_2CH_2CH_2CH_2CH_2CH_2CH_2OSO_3Na$,
$CH_3C(O)CH_2CH_2CH_2CH_2CH_2CH_2CH_2OSO_3Na$,
$CH_3C(O)CH_2CH_2CH_2CH_2CH_2CH_2OSO_3Na$,
$CH_3C(O)CH_2CH_2CH_2CH_2CH_2OSO_3Na$,
$CH_3C(O)CH_2CH_2CH_2CH_2OSO_3Na$,
$(CH_3)_3CC(O)$
$CH_2CH_2CH_2CH_2CH_2CH_2CH_2CH_2CH_2OSO_3Na$,
$(CH_3)_2CHC(O)$
$CH_2CH_2CH_2CH_2CH_2CH_2CH_2CH_2CH_2OSO_3Na$,
$(CH_2)_5CHC(O)$
$CH_2CH_2CH_2CH_2CH_2CH_2CH_2CH_2CH_2OSO_3Na$,
$CH_3CH_2C(O)$
$CH_2CH_2CH_2CH_2CH_2CH_2CH_2CH_2OSO_3Na$,
$CH_3CH_2CH_2C(O)$
$CH_2CH_2CH_2CH_2CH_2CH_2CH_2OSO_3Na$,
$CH_3CH_2CH_2CH_2C(O)$
$CH_2CH_2CH_2CH_2CH_2CH_2OSO_3Na$,
$CH_3CH_2CH_2CH_2CH_2C(O)$
$CH_2CH_2CH_2CH_2CH_2OSO_3Na$,
$CH_3CH_2CH_2CH_2CH_2CH_2C(O)$
$CH_2CH_2CH_2CH_2OSO_3Na$,
$CH_3CH_2CH_2CH_2CH_2CH_2CH_2C(O)$
$CH_2CH_2CH_2OSO_3Na$,
$CH_3CH_2CH_2CH_2CH_2CH_2CH_2CH_2C(O)$
$CH_2CH_2OSO_3Na$,
$CH_3CH_2CH_2CH_2CH_2CH_2CH_2CH_2CH_2C(O)$
$CH_2OSO_3Na$,
$CH_3C(O)$
$CH_2CH_2CH_2CH_2CH_2CH_2CH_2CH_2CH_2OCH_2CH_2$
$OSO_3Na$,
$CH_3C(O)CH_2CH_2CH_2CH_2CH_2CH_2CH_2CH_2CH_2C(O)$
$NHCH_2OSO_3Na$,
$CH_3C(O)CH_2CH_2CH_2CH_2CH_2CH_2CH_2CH_2CH_2NHC$
$(O)CH_2OSO_3Na$,
$CH_3C(O)CH_2CH_2CH_2CH_2CH_2CH_2CH_2CH_2CH_2C(O)$
$OSO_3Na$,
$CH_3C(O)CH_2CH_2CH_2CH_2CH_2CH_2CH_2CH_2CH_2C(O)$
$OCH_2OSO_3Na$,
$CH_3C(O)CH_2CH_2CH_2CH_2CH_2CH_2CH_2CH_2CH_2OC(O)$
$CH_2OSO_3Na$,
$CH_3C(O)$
$CH_2CH_2CH_2CH_2CH_2CH_2CH_2CH_2CH_2OSO_3H$,
$CH_3C(O)$
$CH_2CH_2CH_2CH_2CH_2CH_2CH_2CH_2CH_2OSO_3Li$,
$CH_3C(O)$
$CH_2CH_2CH_2CH_2CH_2CH_2CH_2CH_2CH_2OSO_3K$,
$CH_3C(O)$
$CH_2CH_2CH_2CH_2CH_2CH_2CH_2CH_2CH_2OSO_3NH_4$,
$CH_3C(O)CH_2CH_2CH_2CH_2CH_2CH_2CH_2CH_2CH(CH_3)$
$_2OSO_3Na$,
$CH_3C(O)$
$CH_2CH_2CH_2CH_2CH_2CH_2CH_2CH_2CH_2CH_2$
$CH_2CH_2CH_2CH_2CH_2CH_2OS\ O_3Na$,
$CH_3C(O)$
$CH_2CH_2CH_2CH_2CH_2CH_2CH_2CH_2CH_2CH_2$
$CH_2CH_2CH_2CH_2CH_2OSO_3Na$,
$CH_3C(O)$
$CH_2CH_2CH_2CH_2CH_2CH_2CH_2CH_2CH_2CH_2$
$CH_2CH_2CH_2CH_2OSO_3Na$,
$CH_3C(O)CH_2CH_2CH_2CH_2CH_2CH_2CH_2CH_2CH_2$
$CH_2CH_2CH_2CH_2OSO_3Na$,
$CH_3C(O)CH_2CH_2CH_2CH_2CH_2CH_2CH_2CH_2CH_2$
$CH_2CH_2CH_2OSO_3Na$,
$CH_3C(O)CH_2CH_2CH_2CH_2CH_2CH_2CH_2CH_2CH_2$
$CH_2CH_2CH_2OSO_3Na$, CH₃C(O)CH₂CH₂CH₂CH₂CH₂CH₂CH₂
  CH₂CH₂CH₂OSO₃Na,
CH₃C(O)
  CH₂CH₂CH₂CH₂CH₂CH₂CH₂CH₂CH₂OSO₃Na,
(CH₃)₃CC(O)CH₂CH₂CH₂CH₂CH₂CH₂CH₂CH₂
  CH₂CH₂CH₂CH₂CH₂CH₂CH₂CH₂C H₂OSO₃Na,
(CH₃)₂CHC(O)CH₂CH₂CH₂CH₂CH₂CH₂CH₂CH₂CH₂
  CH₂CH₂CH₂CH₂CH₂CH₂CH₂OSO₃Na,
(CH₂)₅CHC(O)
  CH₂CH₂CH₂CH₂CH₂CH₂CH₂CH₂CH₂CH₂
  CH₂CH₂CH₂CH₂CH₂CH₂CH₂OSO₃Na,
CH₃CH₂C(O)
  CH₂CH₂CH₂CH₂CH₂CH₂CH₂CH₂CH₂CH₂
  CH₂CH₂CH₂CH₂CH₂CH₂OS O₃Na,
CH₃CH₂CH₂CH₂CH₂C(O)
  CH₂CH₂CH₂CH₂CH₂CH₂CH₂CH₂CH₂CH₂
  CH₂CH₂CH₂OS O₃Na,
CH₃CH₂CH₂CH₂CH₂CH₂CH₂CH₂C(O)
  CH₂CH₂CH₂CH₂CH₂CH₂CH₂CH₂CH₂CH₂OS O₃Na,
CH₃CH₂CH₂CH₂CH₂CH₂CH₂CH₂CH₂CH₂CH₂C(O)
  CH₂CH₂CH₂CH₂CH₂CH₂CH₂OS O₃Na,
CH₃CH₂CH₂CH₂CH₂CH₂CH₂CH₂CH₂CH₂CH₂
  CH₂CH₂CH₂C(O)CH₂CH₂CH₂CH₂OS O₃Na,
CH₃CH₂C(O)
  CH₂CH₂CH₂CH₂CH₂CH₂CH₂CH₂CH₂
  CH₂CH₂CH₂CH₂CH₂CH₂OC H₂CH₂OSO₃Na,
CH₃CH₂C(O)
  CH₂CH₂CH₂CH₂CH₂CH₂CH₂CH₂CH₂CH₂
  CH₂CH₂CH₂CH₂CH₂CH₂C(O)NHCH₂CH₂OSO₃Na,
CH₃CH₂C(O)
  CH₂CH₂CH₂CH₂CH₂CH₂CH₂CH₂CH₂CH₂
CH₂CH₂CH₂CH₂CH₂CH₂NH C(O)CH₂CH₂OSO₃Na,
CH₃CH₂C(O)
  CH₂CH₂CH₂CH₂CH₂CH₂CH₂CH₂CH₂CH₂CH₂
  CH₂CH₂CH₂CH₂CH₂C(O)OCH₂CH₂OSO₃Na,
CH₃CH₂C(O)
  CH₂CH₂CH₂CH₂CH₂CH₂CH₂CH₂CH₂CH₂
  CH₂CH₂CH₂CH₂CH₂CH₂OC(O)CH₂CH₂OSO₃Na,
CH₃CH₂C(O)CH₂CH₂CH₂CH₂CH₂CH₂CH₂CH₂CH₂
  CH₂CH₂CH₂CH₂CH₂CH₂CH₂C(O)OSO₃Na,
CH₃CH₂C(O)
  CH₂CH₂CH₂CH₂CH₂CH₂CH₂CH₂CH₂
  CH₂CH₂CH₂CH₂CH₂CH₂OS O₃H,
CH₃CH₂C(O)
  CH₂CH₂CH₂CH₂CH₂CH₂CH₂CH₂CH₂CH₂
  CH₂CH₂CH₂CH₂CH₂CH₂OS O₃Li,
CH₃CH₂C(O)
  CH₂CH₂CH₂CH₂CH₂CH₂CH₂CH₂CH₂CH₂
  CH₂CH₂CH₂CH₂CH₂CH₂OS O₃K,
CH₃CH₂C(O)
  CH₂CH₂CH₂CH₂CH₂CH₂CH₂CH₂CH₂CH₂
  CH₂CH₂CH₂CH₂CH₂CH₂OS O₃NH₄, and
CH₃C(O)CH₂CH₂CH₂CH₂CH₂CH₂CH₂CH₂CH₂CH₂
  CH₂CH₂CH₂CH₂CH₂CH₂CH₂CH
  CH₂CH₂CH₂OSO₃Na.

The surfactant (b) is a novel compound, and can be produced by any of the following production methods, for example.

The surfactant (b) may be produced by a production method including:
  a step (11b) of hydroxylating a compound (10b) represented by the following formula:

$$R^{11b}-CH=CH-(CR^{2b}_2)_n-(OR^{3b})_p-(CR^{4b}_2)_q-L-OH$$

(wherein $R^{2b}$ to $R^{4b}$, n, p, and q are defined as described above; $R^{11b}$ is H, a linear or branched alkyl group containing one or more carbon atoms and optionally containing a substituent, or a cyclic alkyl group containing three or more carbon atoms and optionally containing a substituent, and optionally contains a monovalent or divalent heterocycle or optionally forms a ring when containing three or more carbon atoms; L is a single bond, —CO₂—B—*, —OCO—B—*, —CONR$^{6b}$—B—*, —NR$^{6b}$CO—B—*, or —CO— other than the carbonyl groups in —CO₂—B—, —OCO—B—, —CONR$^{6b}$—B—, and —NR$^{6b}$CO—B—, where B is a single bond or a C1-C10 alkylene group optionally containing a substituent, $R^{6b}$ is H or a C1-C4 alkyl group optionally containing a substituent, and * indicates the bond to —OH in the formula) to provide a compound (11b) represented by the following formula:

[Chem. 47]
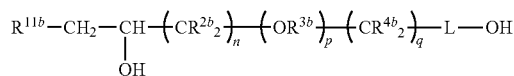

(wherein L, $R^{2b}$ to $R^{4b}$, $R^{11b}$, n, p, and q are defined as described above);
  a step (12b) of oxidizing the compound (11b) to provide a compound (12b) represented by the following formula:

[Chem. 48]
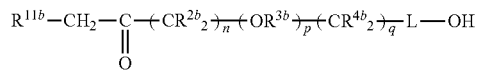

(wherein L, $R^{2b}$ to $R^{4b}$, $R^{11b}$, n, p, and q are defined as described above); and
  a step (13b) of sulfuric-esterifying the compound (12b) to provide a compound (13b) represented by the following formula:

[Chem. 49]
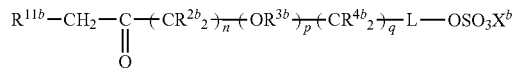

(wherein L, $R^{2b}$ to $R^{4b}$, $R^{11b}$, n, p, q, and $X^b$ are defined as described above).

The alkyl group for $R^{11b}$ is preferably free from a carbonyl group.

In the alkyl group for $R^{11b}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

The alkyl group preferably contains no substituent.

$R^{11b}$ is preferably H, a C1-C9 linear or branched alkyl group optionally containing a substituent, or a C3-C9 cyclic alkyl group optionally containing a substituent, more preferably H, a C1-C9 linear or branched alkyl group free from a carbonyl group, or a C3-C9 cyclic alkyl group free from a carbonyl group, still more preferably H or a C1-C9 linear or branched alkyl group free from a substituent, further more preferably H, a methyl group (—CH$_3$), or an ethyl group (—C$_2$H$_5$), particularly preferably H or a methyl group (—CH$_3$), most preferably H.

The hydroxylation in the step (11b) may be performed by a method (1) in which iron(II) phthalocyanine (Fe(Pc)) and sodium borohydride are allowed to act on the compound (10b) in an oxygen atmosphere or a method (2) in which isopinocampheylborane (IpcBH$_2$) is allowed to act on the compound (10b) and then the resulting intermediate (dialkyl borane) is oxidized.

In the method (1), iron(II) phthalocyanine may be used in a catalytic amount, and may be used in an amount of 0.001 to 1.2 mol relative to 1 mol of the compound (10b).

In the method (1), sodium borohydride may be used in an amount of 0.5 to 20 mol relative to 1 mol of the compound (10b).

The reaction in the method (1) may be performed in a solvent. The solvent is preferably an organic solvent, such as an ether, a halogenated hydrocarbon, an aromatic hydrocarbon, a nitrile, or a nitrogen-containing polar organic compound.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

Examples of the nitrile include acetonitrile, propionitrile, butyronitrile, isobutyronitrile, and benzonitrile. Acetonitrile is preferred.

Examples of the nitrogen-containing polar organic compound include N,N-dimethylformamide, N,N-dimethylacetamide, N-methyl-2-pyrrolidone, 2-pyrrolidone, and 1,3-dimethyl-2-imidazolidinone. N,N-dimethylformamide, N,N-dimethylacetamide, and N-methyl-2-pyrrolidone are preferred.

The reaction temperature in the method (1) is preferably −78° C. to 200° C., more preferably 0° C. to 150° C.

The reaction pressure in the method (1) is preferably 0 to 5.0 MPa, more preferably 0.1 to 1.0 MPa.

The reaction duration in the method (1) is preferably 0.1 to 72 hours, more preferably 0.1 to 48 hours.

In the method (2), isopinocampheylborane may be used in an amount of 1.0 to 10.0 mol relative to 1 mol of the compound (10b).

The reaction of the compound (10b) and isopinocampheylborane may be performed in a solvent. The solvent is preferably an organic solvent, such as an ether, a halogenated hydrocarbon, or an aromatic hydrocarbon.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

The temperature of the reaction of the compound (10b) and isopinocampheylborane is preferably −78° C. to 200° C., more preferably 0° C. to 150° C.

The pressure of the reaction of the compound (10b) and isopinocampheylborane is preferably 0 to 5.0 MPa, more preferably 0.1 to 1.0 MPa.

The duration of the reaction of the compound (10b) and isopinocampheylborane is preferably 0.1 to 72 hours, more preferably 0.1 to 48 hours.

The oxidation in the method (2) may be performed by allowing an oxidizing agent to act on the intermediate. An example of the oxidizing agent is hydrogen peroxide. The oxidizing agent may be used in an amount of 0.7 to 10 mol relative to 1 mol of the intermediate.

The oxidation in the method (2) may be performed in a solvent. Examples of the solvent include water, methanol, and ethanol. Water is preferred.

The oxidation temperature in the method (2) is preferably 0° C. to 100° C., more preferably 0° C. to 80° C.

The oxidation pressure in the method (2) is preferably 0 to 5.0 MPa, more preferably 0.1 to 1.0 MPa.

The oxidation duration in the method (2) is preferably 0.1 to 72 hours, more preferably 0.1 to 48 hours.

The oxidation of the compound (11b) in the step (12b) may be performed by, for example, (a) a method using the Jones reagent (CrO$_3$/H$_2$SO$_4$) (Jones oxidation), (b) a method using Dess-Martin periodinane (DMP) (Dess-Martin oxidation), (c) a method using pyridinium chlorochromate (PCC), (d) a method of allowing a bleaching agent (about 5% to 6% aqueous solution of NaOCl) to act in the presence of a nickel compound such as NiCl$_2$, or (e) a method of allowing a hydrogen acceptor such as an aldehyde or a ketone to act in the presence of an aluminum catalyst such as Al(CH$_3$)$_3$ or Al[OCH(CH$_3$)$_2$]$_3$ (Oppenauer oxidation).

The oxidation in the step (12b) may be performed in a solvent. The solvent is preferably any of water and organic solvents, such as water, ketones, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Acetone is preferred.

Examples of the ethers include diethyl ether, tetrahydrofuran, dioxane, and diethylene glycol diethyl ether. Diethyl ether and tetrahydrofuran are preferred.

Examples of the halogenated hydrocarbons include dichloromethane, dichloroethane, chloroform, chlorobenzene, and o-dichlorobenzene. Dichloromethane and chloroform are preferred.

Examples of the aromatic hydrocarbons include benzene, toluene, and xylene. Benzene and toluene are preferred.

Examples of the nitriles include acetonitrile, propionitrile, butyronitrile, isobutyronitrile, and benzonitrile. Acetonitrile is preferred.

The oxidation temperature in the step (12b) is preferably −78° C. to 200° C., and may appropriately be selected in accordance with the method used.

The oxidation pressure in the step (12b) is preferably 0 to 5.0 MPa, and may appropriately be selected in accordance with the method used.

The oxidation duration in the step (12b) is preferably 0.1 to 72 hours, and may appropriately be selected in accordance with the method used.

The sulfuric-esterification in the step (13b) may be performed by reacting the compound (12b) and a sulfating reagent. Examples of the sulfating reagent include sulfur trioxide amine complexes such as a sulfur trioxide pyridine complex, a sulfur trioxide trimethylamine complex, and a sulfur trioxide triethylamine complex, sulfur trioxide amide complexes such as a sulfur trioxide dimethylformamide complex, sulfuric acid-dicyclohexylcarbodiimide, chlorosulfuric acid, concentrated sulfuric acid, and sulfamic acid. The amount of the sulfating reagent used is preferably 0.5 to 10 mol, more preferably 0.5 to 5 mol, still more preferably 0.7 to 4 mol, relative to 1 mol of the compound (12b)

The sulfuric-esterification in the step (13b) may be performed in a solvent. The solvent is preferably an organic solvent, such as an ether, a halogenated hydrocarbon, an aromatic hydrocarbon, pyridine, dimethyl sulfoxide, sulfolane, or a nitrile.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

Examples of the nitrile include acetonitrile, propionitrile, butyronitrile, isobutyronitrile, and benzonitrile. Acetonitrile is preferred.

The sulfuric-esterification temperature in the step (13b) is preferably −78° C. to 200° C., more preferably −20° C. to 150° C.

The sulfuric-esterification pressure in the step (13b) is preferably 0 to 10 MPa, more preferably 0.1 to 5 MPa.

The sulfuric-esterification duration in the step (13b) is preferably 0.1 to 72 hours, more preferably 0.1 to 48 hours.

The surfactant (b) may also be produced by a production method including:

a step (21b) of ozonolyzing a compound (20b) represented by the following formula:

[Chem. 50]
$$R^{1b}-\underset{\underset{CR^{101b}_2}{\|}}{C}-(CR^{2b}_2)_n-(OR^{3b})_p-(CR^{4b}_2)_q-L-OH$$

(wherein L, $R^{1b}$ to $R^{4b}$, n, p, and q are defined as described above; and $R^{101b}$ is an organic group) to provide a compound (21b) represented by the following formula:

[Chem. 51]
$$R^{1b}-\underset{\underset{O}{\|}}{C}-(CR^{2b}_2)_n-(OR^{3b})_p-(CR^{4b}_2)_q-L-OH$$

(wherein L, $R^{1b}$ to $R^{4b}$, n, p, and q are defined as described above); and a step (22b) of sulfuric-esterifying the compound (21b) to provide a compound (22b) represented by the following formula:

[Chem. 52]
$$R^{1b}-\underset{\underset{O}{\|}}{C}-(CR^{2b}_2)_n-(OR^{3b})_p-(CR^{4b}_2)_q-L-OSO_3X^b$$

(wherein L, $R^{1b}$ to $R^{4b}$, n, p, q, and $X^b$ are defined as described above)

$R^{101b}$s are each preferably a C1-C20 alkyl group. The two $R^{101b}$s are the same as or different from each other.

The ozonolysis in the step (21b) may be performed by allowing ozone to act on the compound (20b), followed by post-treatment with a reducing agent.

The ozone may be generated by dielectric barrier discharge in oxygen gas.

Examples of the reducing agent used in the post-treatment include zinc, dimethyl sulfide, thiourea, and phosphines. Phosphines are preferred.

The ozonolysis in the step (21b) may be performed in a solvent. The solvent is preferably any of water and organic solvents, such as water, alcohols, carboxylic acids, ethers, halogenated hydrocarbons, and aromatic hydrocarbons.

Examples of the alcohols include methanol, ethanol, 1-propanol, and isopropanol. Methanol and ethanol are preferred.

Examples of the carboxylic acids include acetic acid and propionic acid. Acetic acid is preferred.

Examples of the ethers include diethyl ether, tetrahydrofuran, dioxane, and diethylene glycol diethyl ether. Diethyl ether and tetrahydrofuran are preferred.

Examples of the halogenated hydrocarbons include dichloromethane, dichloroethane, chloroform, chlorobenzene, and o-dichlorobenzene. Dichloromethane and chloroform are preferred.

Examples of the aromatic hydrocarbons include benzene, toluene, and xylene. Benzene and toluene are preferred.

The ozonolysis temperature in the step (21b) is preferably −78° C. to 200° C., more preferably 0° C. to 150° C.

The ozonolysis pressure in the step (21b) is preferably 0 to 5.0 MPa, more preferably 0.1 to 1.0 MPa.

The ozonolysis duration in the step (21b) is preferably 0.1 to 72 hours, more preferably 0.1 to 48 hours.

The sulfuric-esterification in the step (22b) may be performed by reacting the compound (21b) and a sulfating reagent under the same conditions as in the sulfuric-esterification in the step (13b).

The surfactant (b) may also be produced by a production method including:

a step (31b) of epoxidizing a compound (30b) represented by the following formula:

$$R^{21b}-CH=CH-(CR^{2b}_2)_n-(OR^{3b})_p-(CR^{4b}_2)_q-L-OH$$

(wherein L, $R^{b2}$ to $R^{4b}$, n, p, and q are defined as described above; $R^{21b}$ is H, a linear or branched alkyl group containing one or more carbon atoms and optionally containing a substituent, or a cyclic alkyl group containing three or more carbon atoms and optionally containing a substituent, and optionally contains a monovalent or divalent heterocycle or optionally forms a ring when containing three or more carbon atoms) to provide a compound (31b) represented by the following formula:

[Chem. 53]
$$R^{21b}-\overset{O}{\overset{/\ \backslash}{CH-CH}}-(CR^{2b}_2)_n-(OR^{3b})_p-(CR^{4b}_2)_q-L-OH$$

(wherein L, $R^{2b}$ to $R^{4b}$, $R^{21b}$, n, p, and q are defined as described above);

a step (32b) of reacting the compound (31b) with a dialkylcopper lithium represented by $R^{22b}_2$CuLi (wherein $R^{22b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms) to provide a compound (32b) represented by the following formula:

[Chem. 54]

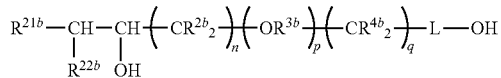

(wherein L, $R^{2b}$ to $R^{4b}$, $R^{21b}$, $R^{22b}$, n, p, and q are defined as described above);
a step (33b) of oxidizing the compound (32b) to provide a compound (33b) represented by the following formula:

[Chem. 55]

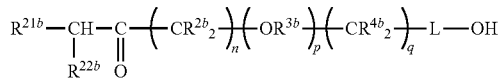

(wherein L, $R^{2b}$ to $R^{4b}$, $R^{21b}$, $R^{22b}$, n, p, and q are defined as described above); and
a step (34b) of sulfuric-esterifying the compound (33b) to provide a compound (34b) represented by the following formula:

[Chem. 56]

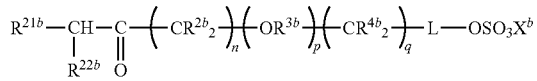

(wherein L, $R^{2b}$ to $R^{4b}$, $R^{21b}$, $R^{22b}$, n, p, q, and $X^b$ are defined as described above).

The alkyl group for $R^{21b}$ is preferably free from a carbonyl group.

In the alkyl group for $R^{21b}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

The alkyl group preferably contains no substituent.

$R^{21b}$ is preferably H, a C1-C8 linear or branched alkyl group optionally containing a substituent, or a C3-C8 cyclic alkyl group optionally containing a substituent, more preferably H, a C1-C8 linear or branched alkyl group free from a carbonyl group, or a C3-C8 cyclic alkyl group free from a carbonyl group, still more preferably H or a C1-C8 linear or branched alkyl group free from a substituent, particularly preferably H or a methyl group (—$CH_3$), most preferably H.

The alkyl group for $R^{22b}$ is preferably free from a carbonyl group.

In the alkyl group for $R^{22b}$, 75% or less of the hydrogen atoms binding to any of the carbon atoms may be replaced by halogen atoms, 50% or less thereof may be replaced by halogen atoms, or 25% or less thereof may be replaced by halogen atoms. The alkyl group is preferably a non-halogenated alkyl group containing no halogen atoms such as fluorine atoms and chlorine atoms.

The alkyl group preferably contains no substituent.

$R^{22b}$ is preferably a C1-C9 linear or branched alkyl group optionally containing a substituent or a C3-C9 cyclic alkyl group optionally containing a substituent, more preferably a C1-C9 linear or branched alkyl group free from a carbonyl group or a C3-C9 cyclic alkyl group free from a carbonyl group, still more preferably a C1-C9 linear or branched alkyl group free from a substituent, particularly preferably a methyl group (—$CH_3$) or an ethyl group (—$C_2H_5$), most preferably a methyl group (—$CH_3$).

Two $R^{22b}$s are the same as or different from each other.

$R^{21b}$ and $R^{22b}$ preferably contain 1 to 7 carbon atoms, more preferably 1 or 2 carbon atoms, most preferably 1 carbon atom, in total.

The epoxidation in the step (31b) may be performed by allowing an epoxidizing agent to act on the compound (30b).

Examples of the epoxidizing agent include peroxy acids such as meta-chloroperbenzoic acid (m-CPBA), perbenzoic acid, hydrogen peroxide, and tert-butyl hydroperoxide, dimethyl dioxolane, and methyl trifluoromethyl dioxolane. Peroxy acids are preferred, and meta-chloroperbenzoic acid is more preferred.

The epoxidizing agent may be used in an amount of 0.5 to 10.0 mol relative to 1 mol of the compound (30b).

The epoxidation in the step (31b) may be performed in a solvent. The solvent is preferably an organic solvent, such as a ketone, an ether, a halogenated hydrocarbon, an aromatic hydrocarbon, a nitrile, pyridine, a nitrogen-containing polar organic compound, or dimethyl sulfoxide. Dichloromethane is preferred.

Examples of the ketone include acetone, methyl ethyl ketone, methyl isobutyl ketone, cyclohexanone, and diacetone alcohol. Acetone is preferred.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

Examples of the nitrile include acetonitrile, propionitrile, butyronitrile, isobutyronitrile, and benzonitrile. Acetonitrile is preferred.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. N,N-dimethylformamide, N,N-dimethylacetamide, and N-methyl-2-pyrrolidone are preferred.

The epoxidation temperature in the step (31b) is preferably −78° C. to 200° C., more preferably −40° C. to 150° C.

The epoxidation pressure in the step (31b) is preferably 0 to 5.0 MPa, more preferably 0.1 to 1.0 MPa.

The epoxidation duration in the step (31b) is preferably 0.1 to 72 hours, more preferably 0.1 to 48 hours.

In the step (32b), the dialkylcopper lithium may be used in an amount of 0.5 to 10.0 mol relative to 1 mol of the compound (31b).

The reaction in the step (32b) may be performed in a solvent. The solvent is preferably an organic solvent, such as an ether, a halogenated hydrocarbon, or an aromatic hydrocarbon.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

The reaction temperature in the step (32b) is preferably −78° C. to 200° C., more preferably −40° C. to 150° C.

The reaction pressure in the step (32b) is preferably 0 to 5.0 MPa, more preferably 0.1 to 1.0 MPa.

The reaction duration in the step (32b) is preferably 0.1 to 72 hours, more preferably 0.1 to 48 hours.

The oxidation of the compound (32b) in the step (33b) may be performed by, for example, (a) a method of using the Jones reagent ($CrO_3/H_2SO_4$) (Jones oxidation), (b) a method of using Dess-Martin periodinane (DMP) (Dess-Martin oxidation), (c) a method of using pyridinium chlorochromate (PCC), (d) a method of allowing a bleaching agent (about 5% to 6% aqueous solution of NaOCl) to act in the presence of a nickel compound such as $NiCl_2$, or (e) a method of allowing a hydrogen acceptor such as an aldehyde or a ketone to act in the presence of an aluminum catalyst such as $Al(CH_3)_3$ or $Al[OCH(CH_3)_2]_3$ (Oppenauer oxidation).

The oxidation in the step (33b) may be performed in a solvent. The solvent is preferably any of water and organic solvents, such as water, ketones, alcohols, ethers, halogenated hydrocarbons, aromatic hydrocarbons, and nitriles.

Examples of the ketones include acetone, methyl ethyl ketone, methyl isobutyl ketone, cyclohexanone, and diacetone alcohol. Acetone is preferred.

Examples of the alcohols include methanol, ethanol, 1-propanol, and isopropanol. Methanol and ethanol are preferred.

Examples of the ethers include diethyl ether, tetrahydrofuran, dioxane, and diethylene glycol diethyl ether. Diethyl ether and tetrahydrofuran are preferred.

Examples of the halogenated hydrocarbons include dichloromethane, dichloroethane, chloroform, chlorobenzene, and o-dichlorobenzene. Dichloromethane and chloroform are preferred.

Examples of the aromatic hydrocarbons include benzene, toluene, and xylene. Benzene and toluene are preferred.

Examples of the nitriles include acetonitrile, propionitrile, butyronitrile, isobutyronitrile, and benzonitrile. Acetonitrile is preferred.

The oxidation temperature in the step (33b) is preferably −78° C. to 200° C., and may appropriately be selected in accordance with the method used.

The oxidation pressure in the step (33b) is preferably 0 to 5.0 MPa, and may appropriately be selected in accordance with the method used.

The oxidation duration in the step (33b) is preferably 0.1 to 72 hours, and may appropriately be selected in accordance with the method used.

The sulfuric-esterification in the step (34b) may be performed by reacting the compound (33b) and a sulfating reagent under the same conditions as in the sulfuric-esterification in the step (13b).

The surfactant (b) may also be produced by a production method including:

a step (41b) of oxidizing a compound (10b) represented by the following formula:

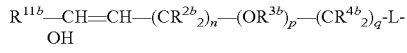

(wherein L, $R^{2b}$ to $R^{4b}$, $R^{11b}$, n, p, and q are defined as described above) to provide a compound (41b) represented by the following formula:

[Chem. 57]

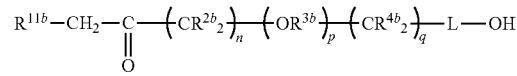

(wherein L, $R^{2b}$ to $R^{4b}$, $R^{11b}$, n, p, and q are defined as described above); and a step (42b) of sulfuric-esterifying the compound (41b) to provide a compound (42b) represented by the following formula:

[Chem. 58]

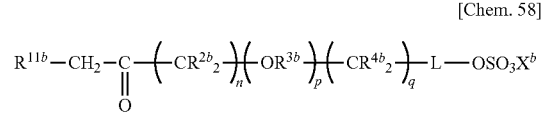

(wherein L, $R^{2b}$ to $R^{4b}$, $R^{11b}$, n, p, q, and $X^b$ are defined as described above).

The oxidation in the step (41b) may be performed by allowing an oxidizing agent to act on the compound (10b) in the presence of water and a palladium compound.

Examples of the oxidizing agent include monovalent or divalent copper salts such as copper chloride, copper acetate, copper cyanide, and copper trifluoromethanethiolate, iron salts such as iron chloride, iron acetate, iron cyanide, iron trifluoromethanethiolate, and hexacyanoferrates, benzoquinones such as 1,4-benzoquinone, 2,3-dichloro-5,6-dicyano-1,4-benzoquinone, tetrachloro-1,2-benzoquinone, and tetrachloro-1,4-benzoquinone, $H_2O_2$, $MnO_2$, $KMnO_4$, $RuO_4$, m-chloroperbenzoic acid, and oxygen. Copper salts, iron salts, and benzoquinones are preferred, and copper chloride, iron chloride, and 1,4-benzoquinone are more preferred.

The oxidizing agent may be used in an amount of 0.001 to 10 mol relative to 1 mol of the compound (10b).

The water may be used in an amount of 0.5 to 1000 mol relative to 1 mol of the compound (10b).

An example of the palladium compound is palladium dichloride. The palladium compound may be used in a catalytic amount, and may be used in an amount of 0.0001 to 1.0 mol relative to 1 mol of the compound (10b).

The oxidation in the step (41b) may be performed in a solvent. Examples of the solvent include water, esters, aliphatic hydrocarbons, aromatic hydrocarbons, alcohols, carboxylic acids, ethers, halogenated hydrocarbons, nitrogen-containing polar organic compounds, nitriles, dimethyl sulfoxide, and sulfolane.

Examples of the esters include ethyl acetate, butyl acetate, ethylene glycol monomethyl ether acetate, and propylene glycol monomethyl ether acetate (PGMEA, also known as 1-methoxy-2-acetoxypropane). Ethyl acetate is preferred.

Examples of the aliphatic hydrocarbons include hexane, cyclohexane, heptane, octane, nonane, decane, undecane, dodecane, and mineral spirits. Cyclohexane and heptane are preferred.

Examples of the aromatic hydrocarbons include benzene, toluene, and xylene. Benzene and toluene are preferred.

Examples of the alcohols include methanol, ethanol, 1-propanol, and isopropanol.

Examples of the carboxylic acids include acetic acid and propionic acid. Acetic acid is preferred.

Examples of the ethers include diethyl ether, tetrahydrofuran, dioxane, and diethylene glycol diethyl ether. Diethyl ether and tetrahydrofuran are preferred.

Examples of the halogenated hydrocarbons include dichloromethane, dichloroethane, chloroform, chlorobenzene, and o-dichlorobenzene. Dichloromethane and chloroform are preferred.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. N,N-dimethylformamide, N,N-dimethylacetamide, and N-methyl-2-pyrrolidone are preferred.

Examples of the nitriles include acetonitrile, propionitrile, butyronitrile, isobutyronitrile, and benzonitrile. Acetonitrile is preferred.

The oxidation temperature in the step (41b) is preferably −78° C. to 200° C., more preferably −20° C. to 150° C.

The oxidation pressure in the step (41b) is preferably 0 to 10 MPa, more preferably 0.1 to 5.0 MPa.

The oxidation duration in the step (41b) is preferably 0.1 to 72 hours, more preferably 0.1 to 48 hours.

The sulfuric-esterification in the step (42b) may be performed by reacting the compound (41b) and a sulfating reagent under the same conditions as in the sulfuric-esterification in the step (13b).

The surfactant (b) may also be produced by a production method including:

a step (51) of reacting a compound (50) represented by the following formula:

$$R^{11b}-CH=CH-(CR^{2b}{}_2)_n-OH$$

(wherein $R^{2b}$, $R^{11b}$, and n are defined as described above) with a halogenating agent to provide a compound (51) represented by the following formula:

$$R^{11b}-CH=CH-(CR^{2b}{}_2)_n-Z^{51b}$$

(wherein $R^{2b}$, $R^{11b}$, and n are defined as described above; and $Z^{51b}$ is a halogen atom);

a step (52) of reacting the compound (51) with an alkylene glycol represented by HO—$R^{3b}$-L-OH (where L and $R^{3b}$ are defined as described above) to provide a compound (52) represented by the following formula:

$$R^{11b}-CH=CH-(CR^{2b}{}_2)_n-O-R^{3b}\text{-L-OH}$$

(wherein L, $R^{2b}$, $R^{3b}$, $R^{11b}$, and n are defined as described above);

a step (53) of oxidizing the compound (52) to provide a compound (53) represented by the following formula:

[Chem. 59]

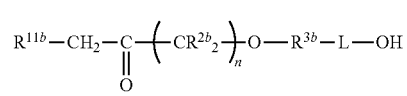

(wherein L, $R^{2b}$, $R^{3b}$, $R^{11b}$, and n are defined as described above); and a step (54) of sulfuric-esterifying the compound (53) to provide a compound (54) represented by the following formula:

[Chem. 60]

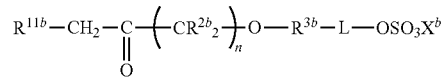

(wherein L, $R^{2b}$, $R^{3b}$, $R^{11b}$, n, and $X^b$ are defined as described above).

$Z^{51b}$ is preferably F, Cl, Br, or I, more preferably Br.

Examples of the halogenating agent used in the step (51) include N-bromosuccinimide and N-chlorosuccinimide.

The halogenating agent may be used in an amount of 0.5 to 10.0 mol per 1 mol of the compound (50).

The reaction in the step (51) may be performed in the presence of a phosphine such as triphenyl phosphine.

The phosphine may be used in an amount of 0.5 to 10.0 mol per 1 mol of the compound (50).

The reaction in the step (51) may be performed in a solvent. The solvent is preferably an organic solvent, such as an ether, a halogenated hydrocarbon, or an aromatic hydrocarbon.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

The reaction temperature in the step (51) is preferably −78° C. to 200° C., more preferably −40° C. to 150° C.

The reaction pressure in the step (51) is preferably 0 to 5.0 MPa, more preferably 0.1 to 1.0 MPa.

The reaction duration in the step (51) is preferably 0.1 to 72 hours, more preferably 0.1 to 48 hours.

In the step (52), the alkylene glycol may be used in an amount of 0.5 to 10.0 mol per 1 mol of the compound (51).

The reaction in the step (52) may be performed in the presence of a base. Examples of the base include sodium hydride, sodium hydroxide, and potassium hydroxide.

The base may be used in an amount of 0.5 to 10.0 mol per 1 mol of the compound (51).

The reaction in the step (52) may be performed in a solvent. The solvent is preferably an organic solvent, such as a nitrogen-containing polar organic compound, an ether, a halogenated hydrocarbon, or an aromatic hydrocarbon.

Examples of the nitrogen-containing polar organic compounds include N,N-dimethylformamide, N,N-dimethylacetamide, N-methyl-2-pyrrolidone, 2-pyrrolidone, and 1,3-dimethyl-2-imidazolidinone. N,N-dimethylformamide, N,N-dimethylacetamide, and N-methyl-2-pyrrolidone are preferred.

Examples of the ether include diethyl ether, tetrahydrofuran, dioxane, and diethylene glycol diethyl ether. Diethyl ether and tetrahydrofuran are preferred.

Examples of the halogenated hydrocarbon include dichloromethane, dichloroethane, chloroform, chlorobenzene, and o-dichlorobenzene. Dichloromethane and chloroform are preferred.

Examples of the aromatic hydrocarbon include benzene, toluene, and xylene. Benzene and toluene are preferred.

The reaction temperature in the step (52) is preferably −78° C. to 200° C., more preferably −40° C. to 150° C.

The reaction pressure in the step (52) is preferably 0 to 5.0 MPa, more preferably 0.1 to 1.0 MPa.

The reaction duration in the step (52) is preferably 0.1 to 72 hours, more preferably 0.1 to 48 hours.

The oxidation in the step (53) may be performed by allowing an oxidizing agent to act on the compound (52) in the presence of water and a palladium compound under the same conditions as in the oxidation in the step (41).

The sulfuric-esterification in the step (54) may be performed by reacting the compound (53) and a sulfating reagent under the same conditions as in the sulfuric-esterification in the step (13).

In any of the production methods described above, the resulting compounds may be subjected to any of evaporation of a solvent or operations such as distillation and purification after the respective steps, whereby the purity of each compound may be increased. When the resulting compound contains a group represented by —OSO$_3$H (i.e., when $X^b$ is H), the compound may be brought into contact with an alkali such as sodium carbonate or ammonia so that —OSO$_3$H may be converted into a sulfuric acid salt group.

Preferred among the methods for producing the surfactant (b) is a production method including the steps (41b) and (42b).

The surfactant may be in the form of an aqueous solution containing at least one surfactant (1) selected from the group consisting of:

a surfactant (a) represented by the following formula (a):

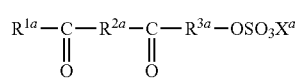
[Chem. 61]

(wherein
$R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
$R^{2a}$ and $R^{3a}$ are each individually a single bond or a divalent linking group;
$R^{1a}$, $R^{2a}$, and $R^{3a}$ contain six or more carbon atoms in total;
$X^a$ is H, a metal atom, $NR^{4a}_4$, imidazolium optionally containing a substituent, pyridinium optionally containing a substituent, or phosphonium optionally containing a substituent, where $R^{4a}$s are each H or an organic group and are the same as or different from each other; and
any two of $R^{1a}$, $R^{2a}$, and $R^{3a}$ optionally bind to each other to form a ring); and
a surfactant (b) represented by the following formula (b):

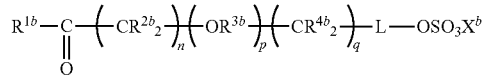
[Chem. 62]

(wherein
$R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;
$R^{2b}$ and $R^{4b}$ are each individually H or a substituent;
$R^{3b}$ is a C1-C10 alkylene group optionally containing a substituent;
n is an integer of 1 or greater;
p and q are each individually an integer of 0 or greater;
$X^b$ is H, a metal atom, $NR^{5b}_4$, imidazolium optionally containing a substituent, pyridinium optionally containing a substituent, or phosphonium optionally containing a substituent, where $R^{5b}$s are each H or an organic group and are the same as or different from each other;
any two of $R^{1b}$, $R^{2b}$, $R^{3b}$, and $R^{4b}$ optionally bind to each other to form a ring; and
L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^6$CO—B—, where B is a single bond or a C1-C10 alkylene group optionally containing a substituent, $R^{6b}$ is H or a C1-C4 alkyl group optionally containing a substituent, and * indicates the bond to —OSO$_3$X$^b$ in the formula), and water.

For the surfactant (1) in the aqueous solution, the upper limit of the concentration thereof is preferably 50% by mass, more preferably 30% by mass, still more preferably 20% by mass, further more preferably 100000 ppm, still further more preferably 50000 ppm, particularly preferably 10000 ppm, most preferably 5000 ppm. The lower limit thereof is preferably 1 ppm, more preferably 10 ppm, still more preferably 50 ppm.

The surfactant is preferably a surfactant for polymerization used for production of a fluoropolymer or an aqueous solution of a surfactant for polymerization used for production of a fluoropolymer.

The method for producing a fluoropolymer of the invention includes polymerizing a fluoromonomer in an aqueous medium to provide a fluoropolymer. The polymerization may be emulsion polymerization.

The fluoromonomer is preferably one containing at least one double bond.

The fluoromonomer preferably includes at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkyl vinyl ether, fluoroalkyl ethylene, trifluoropropylene, pentafluoropropylene, trifluorobutene, tetrafluoroisobutene, hexafluoroisobutene, a fluoromonomer represented by the formula (100): CH$_2$=CFRf$^{101}$ (wherein Rf$^{101}$ is a C1-C12 linear or branched fluoroalkyl group), a fluorinated vinyl heterocycle, and a monomer giving a crosslinking site.

The fluoroalkyl vinyl ether preferably includes at least one selected from the group consisting of:
a fluoromonomer represented by the formula (110):

wherein Rf$^{111}$ is a perfluoroorganic group;

a fluoromonomer represented by the formula (120):

$$CF_2=CF-OCH_2-Rf^{121}$$

wherein $Rf^{121}$ is a C1-C5 perfluoroalkyl group;
a fluoromonomer represented by the formula (130):

$$CF_2=CFOCF_2ORf^{131}$$

wherein $Rf^{131}$ is a C1-C6 linear or branched perfluoroalkyl group, a C5-C6 cyclic perfluoroalkyl group, or a C2-C6 linear or branched perfluorooxyalkyl group containing 1 to 3 oxygen atoms;
a fluoromonomer represented by the formula (140):

$$CF_2=CFO(CF_2CF(Y^{141})O)_m(CF_2)_nF$$

wherein $Y^{141}$ is a fluorine atom or a trifluoromethyl group; m is an integer of 1 to 4; and n is an integer of 1 to 4; and
a fluoromonomer represented by the formula (150):

$$CF_2=CF-O-(CF_2CFY^{151}-O)_n-(CFY^{152})_m-A^{151}$$

wherein $Y^{151}$ is a fluorine atom, a chlorine atom, a $-SO_2F$ group, or a perfluoroalkyl group, the perfluoroalkyl group optionally containing ether oxygen and a $-SO_2F$ group; n is an integer of 0 to 3; n $Y^{151}$s are the same as or different from each other; $Y^{152}$ is a fluorine atom, a chlorine atom, or a $-SO_2F$ group; m is an integer of 1 to 5; m $Y^{152}$s are the same as or different from each other; $A^{151}$ is $-SO_2X^{151}$, $-COZ^{151}$, or $-POZ^{152}Z^{153}$; $X^{151}$ is F, Cl, Br, I, $-OR^{151}$, or $-NR^{152}R^{153}$; $Z^{151}$, $Z^{152}$, and $Z^{153}$ are the same as or different from each other, and are each $-NR^{154}R^{155}$ or $-OR^{156}$; $R^{151}$, $R^{152}$, $R^{153}$, $R^{154}$, $R^{155}$, and $R^{156}$ are the same as or different from each other, and are each H, ammonium, an alkali metal, or an alkyl group, aryl group, or sulfonyl-containing group optionally containing a fluorine atom.

The "perfluoroorganic group" as used herein means an organic group in which all hydrogen atoms binding to any of the carbon atoms are replaced by fluorine atoms. The perfluoroorganic group optionally contains ether oxygen.

An example of the fluoromonomer represented by the formula (110) is a fluoromonomer in which $Rf^{111}$ is a C1-C10 perfluoroalkyl group. The perfluoroalkyl group preferably contains 1 to 5 carbon atoms.

Examples of the perfluoroorganic group in the formula (110) include a perfluoromethyl group, a perfluoroethyl group, a perfluoropropyl group, a perfluorobutyl group, a perfluoropentyl group, and a perfluorohexyl group.

The examples of the fluoromonomer represented by the formula (110) also include those represented by the formula (110) in which $Rf^{111}$ is a C4-C9 perfluoro(alkoxyalkyl) group; those in which $Rf^{111}$ is a group represented by the following formula:

[Chem. 63]

wherein m is 0 or an integer of 1 to 4; and those in which $Rf^{111}$ is a group represented by the following formula:

[Chem. 64]

wherein n is an integer of 1 to 4.

The fluoroalkyl vinyl ether preferably include at least one selected from the group consisting of fluoromonomers represented by any of the formulae (110), (130), and (140).

The fluoromonomer represented by the formula (110) preferably includes at least one selected from the group consisting of perfluoro(methyl vinyl ether), perfluoro(ethyl vinyl ether), and perfluoro(propyl vinyl ether), more preferably at least one selected from the group consisting of perfluoro(methyl vinyl ether) and perfluoro(propyl vinyl ether).

The fluoromonomer represented by the formula (130) preferably includes at least one selected from the group consisting of $CF_2=CFOCF_2OCF_3$, $CF_2=CFOCF_2OCF_2CF_3$, and $CF_2=CFOCF_2OCF_2CF_2OCF_3$.

The fluoromonomer represented by the formula (140) preferably includes at least one selected from the group consisting of $CF_2=CFOCF_2CF(CF_3)O(CF_2)_3F$, $CF_2=CFO(CF_2CF(CF_3)O)_2(CF_2)_3F$, and $CF_2=CFO(CF_2CF(CF_3)O)_2(CF_2)_2F$.

The fluoromonomer represented by the formula (150) preferably includes at least one selected from the group consisting of $CF_2=CFOCF_2CF_2SO_2F$, $CF_2=CFOCF_2CF(CF_3)OCF_2CF_2SO_2F$, $CF_2=CFOCF_2CF(CF_2CF_2SO_2F)OCF_2CF_2SO_2F$, and $CF_2=CFOCF_2CF(SO_2F)_2$.

The fluoromonomer represented by the formula (100) is preferably a fluoromonomer in which $Rf^{101}$ is a linear fluoroalkyl group, more preferably a fluoromonomer in which $Rf^{101}$ is a linear perfluoroalkyl group. $Rf^{101}$ preferably contains 1 to 6 carbon atoms. Examples of the fluoromonomer represented by the formula (100) include $CH_2=CFCF_3$, $CH_2=CFCF_2CF_3$, $CH_2=CFCF_2CF_2CF_3$, $CH_2=CFCF_2CF_2CF_2H$, and $CH_2=CFCF_2CF_2CF_2CF_3$. Preferred among these is 2,3,3,3-tetrafluoropropylene represented by $CH_2=CFCF_3$.

The fluoroalkyl ethylene is preferably a fluoroalkyl ethylene represented by the following formula (170):

$$CH_2=CH-(CF_2)_n-X^{171}$$

(wherein $X^{171}$ is H or F; and n is an integer of 3 to 10), more preferably includes at least one selected from the group consisting of $CH_2=CH-C_4F_9$ and $CH_2=CH-C_6F_{13}$.

The monomer giving a crosslinking site preferably includes at least one selected from the group consisting of:
a fluoromonomer represented by the following formula (180):

$$CX^{181}_2=CX^{182}-R_f^{181}CHR^{181}X^{183}$$

wherein $X^{181}$ and $X^{182}$ are each individually a hydrogen atom, a fluorine atom, or $CH_3$; $R_f^{181}$ is a fluoroalkylene group, a perfluoroalkylene group, a fluoro(poly)oxyalkylene group, or a perfluoro(poly)oxyalkylene group; $R^{181}$ is a hydrogen atom or $CH_3$; $X^{183}$ is an iodine atom or a bromine atom;
a fluoromonomer represented by the following formula (190):

$$CX^{191}_2=CX^{192}-R_f^{191}X^{193}$$

wherein $X^{191}$ and $X^{192}$ are each individually a hydrogen atom, a fluorine atom, or $CH_3$; $R_f^{191}$ is a fluoroalkylene group, a perfluoroalkylene group, a fluoropolyoxyalkylene group, or a perfluoropolyoxyalkylene group; $X^{193}$ is an iodine atom or a bromine atom;
a fluoromonomer represented by the following formula (200):

$$CF_2=CFO(CF_2CF(CF_3)O)_m(CF_2)_n-X^{201}$$

wherein m is an integer of 0 to 5; n is an integer of 1 to 3; $X^{201}$ is a cyano group, a carboxyl group, an alkoxycarbonyl group, an iodine atom, a bromine atom, or —$CH_2I$;

a fluoromonomer represented by the following formula (210):

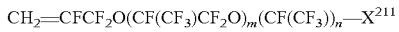

$$CH_2{=}CFCF_2O(CF(CF_3)CF_2O)_m(CF(CF_3))_n{-}X^{211}$$

wherein m is an integer of 0 to 5; n is an integer of 1 to 3; $X^{211}$ is a cyano group, a carboxyl group, an alkoxycarbonyl group, an iodine atom, a bromine atom, or —$CH_2OH$; and a monomer represented by the following formula (220):

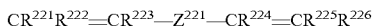

$$CR^{221}R^{222}{=}CR^{223}{-}Z^{221}{-}CR^{224}{=}CR^{225}R^{226}$$

wherein $R^{221}$, $R^{222}$, $R^{223}$, $R^{224}$, $R^{225}$, and $R^{226}$ are the same as or different from each other, and are each a hydrogen atom or a C1-C5 alkyl group; $Z^{221}$ is a C1-C18 linear or branched alkylene group optionally containing an oxygen atom, a C3-C18 cycloalkylene group, an at least partially fluorinated C1-C10 alkylene or oxyalkylene group, or a (per)fluoropolyoxyalkylene group which is represented by the following formula:

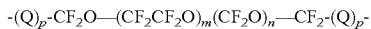

$$-(Q)_p{-}CF_2O{-}(CF_2CF_2O)_m(CF_2O)_n{-}CF_2{-}(Q)_p{-}$$

(wherein Q is an alkylene group or an oxyalkylene group; p is 0 or 1; and m/n is 0.2 to 5) and which has a molecular weight of 500 to 10000.

$X^{183}$ and $X^{193}$ are each preferably an iodine atom. $R_f^{181}$ and $R_f^{191}$ are each preferably a C1-C5 perfluoroalkylene group. $R^{181}$ is preferably a hydrogen atom. $X^{201}$ is preferably a cyano group, an alkoxycarbonyl group, an iodine atom, a bromine atom, or —$CH_2I$. $X^{211}$ is preferably a cyano group, an alkoxycarbonyl group, an iodine atom, a bromine atom, or —$CH_2OH$.

An example of the fluorinated vinyl heterocycle is a fluorinated vinyl heterocycle represented by the following formula (230):

[Chem. 65]

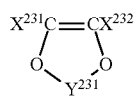

wherein $X^{231}$ and $X^{232}$ are each individually F, Cl, a methoxy group, or a fluorinated methoxy group; and $Y^{231}$ is represented by the following formula $Y^{232}$ or $Y^{233}$:

[Chem. 66]

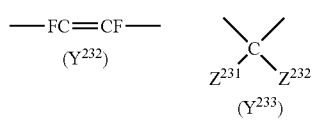

wherein $Z^{231}$ and $Z^{232}$ are each individually F or a C1-C3 fluorinated alkyl group.

The monomer giving a crosslinking site preferably includes at least one selected from the group consisting of $CF_2{=}CFOCF_2CF(CF_3)OCF_2CF_2CN$, $CF_2{=}CFOCF_2CF(CF_3)OCF_2CF_2COOH$, $CF_2{=}CFOCF_2CF(CF_3)OCF_2CF_2COOCH_3$, $CF_2{=}CFOCF_2CF(CF_3)OCF_2CF_2CH_2I$, $CF_2{=}CFOCF_2CF(CF_3)OCF_2CF_2CH_2I$, $CH_2{=}CFCF_2OCF(CF_3)CF_2OCF(CF_3)$ CN, $CH_2{=}CFCF_2OCF(CF_3)CF_2OCF(CF_3)$ COOH, $CH_2{=}CFCF_2OCF(CF_3)CF_2OCF(CF_3)COOCH_3$, $CH_2{=}CFCF_2OCF(CF_3)CF_2OCF(CF_3)CH_2OH$, $CH_2{=}CHCF_2CF_2I$, $CH_2{=}CH(CF_2)CH{=}CH_2$, $CH_2{=}CH(CF_2)_6CH{=}CH_2$, and $CF_2{=}CFO(CF_2)_5CN$, more preferably at least one selected from the group consisting of $CF_2{=}CFOCF_2CF(CF_3)OCF_2CF_2CN$ and $CF_2{=}CFOCF_2CF_2CH_2I$.

In the above step, the fluoromonomer may be polymerized with a fluorine-free monomer. An example of the fluorine-free monomer is a hydrocarbon monomer reactive with the fluoromonomer. Examples of the hydrocarbon monomer include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, monochlorovinyl acetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer. Examples of the functional group-containing hydrocarbon monomer include hydroxy alkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; carboxyl group-containing fluorine-free monomers such as itaconic acid, fumaric acid, fumaric anhydride, crotonic acid, maleic acid, and maleic anhydride; glycidyl group-containing fluorine-free monomers such as glycidyl vinyl ether and glycidyl allyl ether; amino group-containing fluorine-free monomers such as aminoalkyl vinyl ether and aminoalkyl allyl ether; and amide group-containing fluorine-free monomers such as (meth)acrylamide and methylol acrylamide.

In the above step, polymerization of one or two or more of the above fluoromonomers can provide particles of a desired fluoropolymer.

In the production method of the invention, the presence of at least one of the above surfactants can efficiently provide a fluoropolymer. In the production method of the invention, two or more of the surfactants may be used as the surfactants, and a compound having a surfactant function other than the above surfactants may be used together as long as the compound is volatile or is allowed to remain in an article such as a molded article formed from the fluoropolymer.

In the production method of the invention, the polymerization is also preferably performed in the presence of a nonionic surfactant. The nonionic surfactant preferably includes at least one selected from the group consisting of:

a compound represented by the following formula (240):

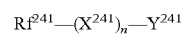

$$Rf^{241}{-}(X^{241})_n{-}Y^{241}$$

wherein $Rf^{241}$ is a partially fluorinated alkyl group or perfluorinated alkyl group containing 1 to 12 carbon atoms; n is 0 or 1; $X^{241}$ is —O—, —COO—, or —OCO—; $Y^{241}$ is —$(CH_2)_pH$, —$(CH_2)_pOH$, or —$(OR^{241})_q(OR^{242})_rOH$; p is an integer of 1 to 12; q is an integer of 1 to 12; r is an integer of 0 to 12; $R^{241}$ and $R^{242}$ are each an alkylene group containing 2 to 4 carbon atoms, with $R^{241}$ and $R^{242}$ being different from each other;

a block polymer represented by the following formula (250):

$$H(OR^{251})_u(OR^{252})_v OH$$

wherein $R^{251}$ and $R^{252}$ are each an alkylene group containing 1 to 4 carbon atoms; u and v are each an integer of 1 to 5, with $R^{251}$ and $R^{252}$ being different from each other;

a nonionic surfactant containing a hydrophobic group composed of a C8-C20 hydrocarbon group and a hydrophilic group composed of a polyalkylene oxide in the molecule; and a silicon compound represented by the following formula (260):

$$R^{261}{}_m\text{—Si—}(OR^{262})_{4-m}$$

wherein $R^{261}$ is an alkyl group containing 1 to 12 carbon atoms; $R^{262}$ is an alkyl group containing 1 to 4 carbon atoms; and m is an integer of 1 to 3.

Specific examples of the block polymer represented by the formula (250) include block polymers containing at least two segments selected from the group consisting of polyoxyethylene, polyoxypropylene, and polyoxybutylene. Examples thereof include polyoxyethylene-polyoxypropylene block polymers and polyoxyethylene-polyoxybutylene block polymers. Not only A-B block polymers but also A-B-A block polymers are preferred. More preferably, use of a polyoxyethylene-polyoxypropylene block polymer or a polyoxypropylene-polyoxyethylene-polyoxypropylene block polymer can lead to a stable fluoropolymer dispersion having a high concentration. In order to reduce generation of agglomerates due to re-agglomeration, the polyoxyethylene segment preferably represents 10 to 50%. In order to provide a fluoropolymer dispersion having low viscosity, the polyoxyethylene segment preferably represents 20 to 40%. The polyoxyethylene segment may have a molecular weight of, but not limited to, 1000 to 7000 g/mol. In particular, the polyoxyethylene segment having a molecular weight of 2500 to 6500 g/mol can lead to a dispersion having low viscosity and excellent dispersibility.

In the production method of the invention, a nucleating agent may be used. The nucleating agent is preferably used in an amount appropriately selected in accordance with the type of the nucleating agent. For example, the amount thereof is 1000 ppm or less, more preferably 500 ppm or less, still more preferably 100 ppm or less, particularly preferably 50 ppm or less, more particularly preferably 10 ppm or less, relative to the aqueous medium.

The presence of the nucleating agent can lead to a fluoropolymer having a smaller primary particle size than in the case of polymerization in the absence of the nucleating agent.

Examples of the nucleating agent include perfluoropolyether (PFPE) acid and salts thereof, and hydrocarbon-containing surfactants other than the surfactants (a) and (b). The nucleating agent is preferably free from an aromatic ring, and is preferably an aliphatic compound.

The nucleating agent is preferably added before addition of a polymerization initiator or simultaneously with addition of a polymerization initiator. Still, it may be added during the polymerization to control the particle size distribution.

The perfluoropolyether (PFPE) acid or a salt thereof may have any chain structure in which the oxygen atoms in the main chain of the molecule are separated by C1-C3 saturated carbon fluoride groups. Two or more carbon fluoride groups may be present in the molecule. Typical structures thereof contain any of the repeating units represented by the following formulae:

$$(\text{—CFCF}_3\text{—CF}_2\text{—O—})_n \tag{VII}$$

$$(\text{—CF}_2\text{—CF}_2\text{—CF}_2\text{—O—})_n \tag{VIII}$$

$$(\text{—CF}_2\text{—CF}_2\text{—})_n\text{—}(\text{—CF}_2\text{—O—})_m \tag{IX}$$

$$(\text{—CF}_2\text{—CFCF}_3\text{—O—})_n\text{-}(\text{—CF}_2\text{—O—})_m \tag{X}$$

These structures are described in Kasai, J. Appl. Polymer Sci., 57,797(1995). As disclosed in this document, the PFPE acid or a salt thereof may contain a carboxylic acid group or a salt thereof at one or each end. The PFPE acid or a salt thereof may also contain a sulfonic acid, a phosphonic acid group, or a salt thereof at one or each end. The PFPE acid or a salt thereof may contain different groups at the respective ends. For a monofunctional PFPE, the other end of the molecule is usually perfluorinated, but may contain a hydrogen or chlorine atom. The PFPE acid or a salt thereof contains at least two ether oxygen atoms, preferably at least four ether oxygen atoms, still more preferably at least six ether oxygen atoms. Preferably at least one carbon fluoride group separating ether oxygen atoms, more preferably at least two such carbon fluoride groups, each contain two or three carbon atoms. Still more preferably, at least 50% of the carbon fluoride groups separating ether oxygen atoms contain two or three carbon atoms. Also preferably, the PFPE acid or a salt thereof contains at least 15 carbon atoms in total. For example, the minimum value of n or n+m in the repeating unit structure is preferably at least 5. Two or more of the PFPE acids and salts thereof containing an acid group at one or each end may be used in the production method of the invention. The PFPE acid or a salt thereof preferably has a number average molecular weight of less than 6000 g/mol.

The hydrocarbon-containing surfactant is preferably added in an amount of 40 ppm or less, more preferably 30 ppm or less, still more preferably 20 ppm or less, relative to the aqueous medium. The lower limit thereof is preferably 0.01 ppm, more preferably 0.1 ppm, still more preferably 1.0 ppm.

The hydrocarbon-containing surfactant includes nonionic surfactants and cationic surfactants, including siloxane surfactants such as those disclosed in U.S. Pat. No. 7,897,682 B (Brothers et al.) and U.S. Pat. No. 7,977,438 B (Brothers et al.).

The hydrocarbon-containing surfactant is preferably a nonionic hydrocarbon surfactant. In other words, the nucleating surfactant is preferably a nonionic hydrocarbon surfactant. The nonionic hydrocarbon surfactant is preferably free from an aromatic moiety.

Examples of the nonionic hydrocarbon surfactant include polyoxyethylene alkyl ethers, polyoxyethylene alkyl phenyl ethers, polyoxyethylene alkyl esters, sorbitan alkyl esters, polyoxyethylene sorbitan alkyl esters, glycerol esters, and derivatives thereof. Specifically, examples of the polyoxyethylene alkyl ethers include polyoxyethylene lauryl ether, polyoxyethylene cetyl ether, polyoxyethylene stearyl ether, polyoxyethylene oleyl ether, and polyoxyethylene behenyl ether; examples of the polyoxyethylene alkyl phenyl ethers include polyoxyethylene nonyl phenyl ether and polyoxyethylene octyl phenyl ether; examples of the polyoxyethylene alkyl esters include polyethylene glycol monolaurylate, polyethylene glycol monooleate, and polyethylene glycol monostearate; examples of the sorbitan alkyl esters include polyoxyethylene sorbitan monolaurylate, polyoxyethylene sorbitan monopalmitate, polyoxyethylene sorbitan monostearate, and polyoxyethylene sorbitan monooleate; examples of the polyoxyethylene sorbitan alkyl esters include polyoxyethylene sorbitan monolaurylate, polyoxyethylene sorbitan monopalmitate, and polyoxyethylene sorbitan monostearate; examples of the glycerol esters include glycerol monomyristate, glycerol monostearate, and glycerol monooleate. Examples of the derivatives thereof include polyoxyethylene alkylamines, polyoxyethylene alkyl phenyl-formaldehyde condensates, and polyoxyethylene alkyl ether phosphates. Particularly preferred are polyoxyethylene alkyl ethers and polyoxyethylene alkyl esters. Examples of such ethers and esters include those having an HLB value of 10 to 18. Specific examples thereof include polyoxyethylene lauryl ether (EO: 5 to 20, EO means an ethylene oxide unit), polyethylene glycol monostearate (EO: 10 to 55), and polyethylene glycol monooleate (EO: 6 to 10).

Preferred examples of the nonionic hydrocarbon surfactant include octyl phenol ethoxylates such as the following Triton® X series available from Dow Chemical Co.

[Chem. 67]

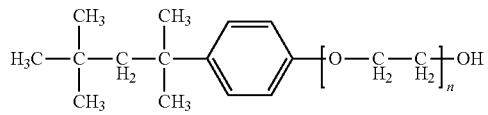

Triton®
X15: n=1.5 (avg)
X45: n=4.5 (avg)

Preferred examples of the nonionic hydrocarbon surfactant also include branched alcohol ethoxylates such as the following Tergitol® 15-S series available from Dow Chemical Co. and branched secondary alcohol ethoxylates such as the following Tergitol® TMN series also available from Dow Chemical Co.

[Chem. 68]

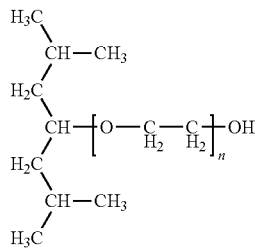

Tergitol®
TMN-6: n=8 (avg)
TMN-10: n=11 (avg)
TMN-100: n=10 (avg)

Ethylene oxide/propylene oxide copolymers such as Tergitol® L series surfactants available from Dow Chemical Company are also useful as the above nonionic hydrocarbon surfactants.

Examples of preferred nonionic hydrocarbon surfactants in the group of useful ones include the following bifunctional block copolymers such as Pluronic® R series available from BASF.

[Chem. 69]

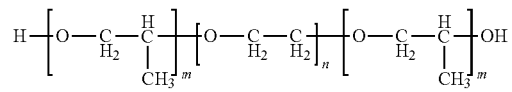

Pluronic®
31R1: m=26 (avg), n=8 (avg)
17R2: m=14 (avg), n=9 (avg)
10R5: m=8 (avg), n=22 (avg)
25R4: m=22 (avg), n=23 (avg)

Preferred nonionic hydrocarbon surfactants in another group include tridecyl alcohol alkoxylates such as Iconol® TDA series available from BASF Corp.

[Chem. 70]

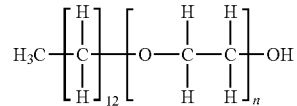

Iconol®
TDA-6: n=6 (avg)
TDA-9: n=9 (avg)
TDA-10: n=19 (avg)

The cationic surfactants are also useful as nucleating surfactants. Typical cationic surfactants contain a positively charged hydrophilic portion such as an alkyl ammonium halide, including alkyl ammonium bromide, and a hydrophobic portion such as a long-chain fatty acid.

Nucleating surfactants in another group to be used include hydrocarbon-containing siloxane surfactants, preferably hydrocarbon surfactants. When the hydrocarbyl groups are to be replaced by a halogen such as fluorine, they are completely replaced by hydrogen atoms, and thus these siloxane surfactants can also be regarded as hydrocarbon surfactants. In other words, a monovalent substituent of the hydrocarbyl group is hydrogen. The nucleating surfactant is preferably a hydrocarbon siloxane containing a nonionic moiety, i.e., a nonionic hydrocarbon (siloxane) surfactant.

In the case of using TFE as a fluoromonomer to produce polytetrafluoroethylene (PTFE) as a fluoropolymer, (polyfluoroalkyl)ethylene (a) and/or a comonomer (b) having a monomer reactivity ratio rTFE in copolymerization with TFE of 0.1 to 8 are mixed in the emulsion polymerization system in an amount of 0.001 to 0.01% by mass relative to the final PTFE yield at the start of emulsion polymerization of TFE. Thereby, a PTFE aqueous emulsion can be produced which has high stability enough to maintain properties such as processability and moldability in the following steps and which is capable of providing a molded article having high heat resistance.

The reactivity ratio can be determined as follows. Comonomers in a variety of proportions are copolymerized with TFE and the composition of the resulting polymer immediately after the start is determined. Then, based on the composition, the reactivity ratio is calculated by the Fineman-Ross equation.

The copolymerization is performed using 3600 g of deionized deaerated water, 1000 ppm of perfluorooctanoic acid relative to the water, and 100 g of paraffin wax contained in a 6.0-L-capacity stainless steel autoclave at a pressure of 0.78 MPa and a temperature of 70° C. A comonomer in an amount of 0.05 g, 0.1 g, 0.2 g, 0.5 g, or 1.0 g is put into the reactor, and then 0.072 g of ammonium persulfate (20 ppm relative to the water) is added thereto. To maintain the polymerization pressure at 0.78 MPa, TFE is continually fed thereinto. When the amount of TFE fed reached 1000 g, stirring is stopped and the pressure is released until the pressure in the reactor decreases to the atmospheric pressure. The system is cooled down and then the paraffin wax is removed. Thereby, an aqueous dispersion containing the resulting polymer is obtained. The aqueous dispersion is stirred so that the resulting polymer precipitates, and the polymer is dried at 150° C. The composition in the resulting polymer is calculated by appropriate combination of NMR, FT-IR, elemental analysis, and X-ray fluorescence analysis in accordance with the types of the monomers.

In the production method of the invention, a reactive surfactant may be used together with the surfactant. The reactive surfactant is a compound containing at least one vinyl group and having a surfactant function. Examples thereof include:

a surfactant represented by the following formula (270a):

wherein n271a is an integer of 1 to 10; $Y^{271}$ is $-SO_3M^{271}$ or $-COOM^{271}$; $M^{271}$ is H, $NH_4$, or an alkali metal;

a surfactant represented by the following formula (270b):

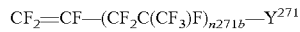

wherein n271b is an integer of 1 to 5; and $Y^{271}$ is defined as described above;

a surfactant represented by the following formula (270c):

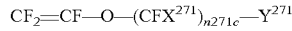

wherein $X^{271}$ is F or $CF_3$; n271c is an integer of 1 to 10; and $Y^{271}$ is defined as described above;

a surfactant represented by the following formula (270d):

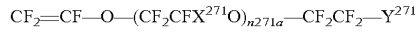

wherein n271d is an integer of 1 to 10; and $Y^{271}$ and $X^{271}$ are defined as described above; and a surfactant represented by the following formula (270e):

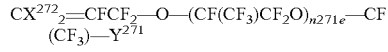

wherein $X^{272}$s are the same as each other, and are each F or H; n271e is 0 or an integer of 1 to 10; and $Y^{271}$ is defined as described above.

In addition to the surfactant and a compound having a surfactant function used as appropriate, an additive may also be used to stabilize the compounds in the production method of the invention. Examples of the additive include a buffer, a pH adjuster, a stabilizing aid, and a dispersion stabilizer.

The stabilizing aid is preferably paraffin wax, fluorine-based oil, a fluorine-based solvent, silicone oil, or the like. One stabilizing aid may be used alone, or two or more stabilizing aids may be used in combination. The stabilizing aid is more preferably paraffin wax. The paraffin wax may be in the form of liquid, semi-solid, or solid at room temperature, and is preferably a saturated hydrocarbon containing 12 or more carbon atoms. The paraffin wax usually preferably has a melting point of 40° C. to 65° C., more preferably 50° C. to 65° C.

The stabilizing aid is preferably used in an amount of 0.1 to 12% by mass, more preferably 0.1 to 8% by mass, relative to the mass of the aqueous medium used. Preferably, the stabilizing aid is sufficiently hydrophobic, to be completely separated from the PTFE aqueous emulsion after emulsion polymerization of TFE, and does not serve as a contaminating component.

In the production method of the invention, the polymerization is performed by charging a polymerization reactor with an aqueous medium, the surfactant, monomers, and optionally other additives, stirring the contents of the reactor, maintaining the reactor at a predetermined polymerization temperature, adding a predetermined amount of a polymerization initiator, and thereby initiating the polymerization reaction. After the polymerization reaction is initiated, the components such as the monomers, the polymerization initiator, a chain transfer agent, and the surfactant may additionally be added in accordance with the purposes thereof. The surfactant may be added after the polymerization reaction is initiated.

The polymerization is usually performed at a polymerization temperature of 5° C. to 120° C. and a polymerization pressure of 0.05 to 10 MPaG. The polymerization temperature and the polymerization pressure are decided as appropriate in accordance with the types of the monomers used, the molecular weight of the target fluoropolymer, and the reaction rate.

The surfactant is preferably added in a total amount of 0.0001 to 10% by mass relative to 100% by mass of the aqueous medium. The lower limit thereof is more preferably 0.001% by mass, while the upper limit thereof is more preferably 1% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the compound is appropriately decided in accordance with factors such as the types of the monomers used and the molecular weight of the target fluoropolymer.

The polymerization initiator may be any one capable of generating radicals within the above polymerization temperature range, and a known oil-soluble and/or water-soluble polymerization initiator may be used. The polymerization initiator may be combined with a reducing agent, for example, to serve as a redox and initiate the polymerization. The concentration of the polymerization initiator is decided as appropriate in accordance with the types of the monomers, the molecular weight of the target fluoropolymer, and the reaction rate.

The polymerization initiator may be an oil-soluble radical polymerization initiator or a water-soluble radical polymerization initiator.

The oil-soluble radical polymerization initiator may be a known oil-soluble peroxide. Typical examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluoroheptanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl) peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chlorodecafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid, and percarbonic acid, t-butyl permaleate, and t-butyl hydroperoxide. A reducing agent such as a sulfite or a sulfurous acid salt may be contained together, and the amount thereof may be 0.1 to 20 times the amount of the peroxide.

For example, in the case of polymerization at a low temperature of 30° C. or lower, the polymerization initiator used is preferably a redox initiator that is a combination of an oxidizing agent and a reducing agent. Examples of the oxidizing agent include persulfates, organic peroxides, potassium permanganate, manganese triacetate, ammonium cerium nitrate, and bromic acid salts. Examples of the reducing agent include sulfites, bisulfites, bromic acid salts, diimines, and oxalic acid. Examples of the persulfates include ammonium persulfate and potassium persulfate. Examples of the sulfites include sodium sulfite and ammonium sulfite. In order to increase the decomposition rate of the initiator, the combination of a redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron(II) sulfate, ammonium persulfate/sulfite, ammonium persulfate/iron(II) sulfate, manganese triacetate/oxalic acid, ammonium cerium nitrate/oxalic acid, bromic acid salt/sulfite, and bromic acid salt/bisulfite. Preferred are potassium permanganate/oxalic acid and ammonium persulfate/sulfite/iron(II) sulfate. In the case of using a redox initiator, either an oxidizing agent or a reducing agent is put into a polymerization tank in advance and the other is continually or intermittently added thereto to initiate the polymerization. For example, in the case of potassium permanganate/oxalic acid, preferably, oxalic acid is put into a polymerization tank and potassium permanganate is continually added thereto.

The polymerization initiator may be added in any amount, and the initiator in an amount that does not significantly decrease the polymerization rate (e.g., several parts per million in water) or more may be added at once in the early stage of polymerization, or may be added successively or continually. The upper limit thereof falls within a range where the reaction temperature is allowed to increase while the polymerization reaction heat is removed through the device surfaces. The upper limit thereof is preferably within a range where the polymerization reaction heat can be removed through the device surfaces.

The aqueous medium is a reaction medium in which the polymerization progresses, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

In the polymerization, any of known chain transfer agents, radical scavengers, and decomposers may be added in accordance with the purposes to control the polymerization rate and the molecular weight.

Examples of the chain-transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, mercaptans, halogenated hydrocarbons such as carbon tetrachloride, and cyclohexane.

The chain-transfer agent may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following formula:

$$R^{a}I_{x}Br_{y}$$

(wherein x and y are each an integer of 0 to 2 and satisfy $1 \leq x+y \leq 2$; and $R^{a}$ is a C1-C16 saturated or unsaturated fluorohydrocarbon or chlorofluorohydrocarbon group, or a C1-C3 hydrocarbon group, each of which optionally contains an oxygen atom). The presence of a bromine compound or an iodine compound enables introduction of iodine or bromine into the polymer, and such iodine or bromine introduced can serve as a crosslinking point.

Examples of the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

In order to achieve good polymerization reactivity, crosslinkability, and easy availability, for example, 1,4-diiodoperfluorobutane, 1,6-diiodoperfluorohexane, or 2-iodoperfluoropropane is preferably used.

The chain transfer agent is usually used in an amount of 1 to 50000 ppm, preferably 1 to 20000 ppm, relative to the whole amount of the fluoromonomer fed.

The chain transfer agent may be added to the reaction container at once before initiation of the polymerization, may be added at once after initiation of the polymerization, may be added in multiple portions during the polymerization, or may be added continually during the polymerization.

The method for producing a fluoropolymer may be a method for producing a fluoropolymer including: a step (I) of polymerizing the fluoromonomer in an aqueous medium in the presence of the surfactant to provide an aqueous dispersion of particles of a fluorine-containing polymer (A); and a step (II) of seed-polymerizing the fluoromonomer to the particles of the fluorine-containing polymer (A) in the aqueous dispersion of the particles of the fluorine-containing polymer (A).

Examples of the fluoropolymer suitably produced by the production method of the invention include a TFE polymer in which TFE is the monomer having the highest mole fraction (hereinafter, "most numerous monomer") among the monomers in the polymer, a VDF polymer in which VDF is the most numerous monomer, and a CTFE polymer in which CTFE is the most numerous monomer.

The TFE polymer may suitably be a TFE homopolymer, or may be a copolymer containing (1) TFE, (2) one or two or more fluorine-containing monomers each of which is different from TFE and contains 2 to 8 carbon atoms, in particular VDF, HFP, or CTFE, and (3) a different monomer. Examples of the different monomer (3) include fluoro(alkyl vinyl ethers) containing a C1-C5, particularly C1-C3 alkyl group; fluorodioxoles; perfluoroalkyl ethylenes; and ω-hydroperfluoroolefins.

The TFE polymer may be a copolymer of TFE and one or two or more fluorine-free monomers. Examples of the fluorine-free monomers include alkenes such as ethylene and propylene; vinyl esters; and vinyl ethers. The TFE polymer may be a copolymer of TFE, one or two or more fluorine-containing monomers containing 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and contains 2 to 8 carbon atoms, in particular TFE, HFP, or CTFE, and (3) a perfluoro(alkyl vinyl ether) containing a C1-C5, particularly C1-C3 alkyl group.

The CTFE polymer may suitably be a CTFE homopolymer, or may be a copolymer containing (1) CTFE, (2) one or two or more fluoroolefins each of which is different from CTFE and contains 2 to 8 carbon atoms, in particular TFE or HFP, and (3) a perfluoro(alkyl vinyl ether) containing a C1-C5, particularly C1-C3 alkyl group.

The CTFE polymer may be a copolymer of CTFE and one or two or more fluorine-free monomers. Examples of the fluorine-free monomers include alkenes such as ethylene and propylene; vinyl esters; and vinyl ethers.

The fluoropolymer produced by the production method of the invention may be vitreous, plastic, or elastomeric. Such a fluoropolymer is amorphous or partially crystallized, and can be subjected to compression firing, melt fabrication, or non-melt fabrication.

The production method of the invention can suitably provide (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro (alkyl vinyl ether) copolymers (e.g., PFA, MFA), TFE/VDF copolymers, and electrolyte polymer precursors; and (III) fluoroelastomers, including TFE/propylene copolymers, TFE/propylene/third monomer copolymers (the third monomer may be VDF, HFP, CTFE, fluoroalkyl vinyl ether, or the like), TFE/fluoroalkyl vinyl ether copolymers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers (THV); and fluorine-containing segmented polymers disclosed in JP S61-49327 B.

The fluoropolymer is preferably a fluororesin, more preferably a fluororesin having a fluorine substitution percentage, calculated by the following formula, of 50% or higher, still more preferably a fluororesin having a fluorine substitution percentage of higher than 50%, further more preferably a fluororesin having a fluorine substitution percentage of 55% or higher, still further more preferably a fluororesin having a fluorine substitution percentage of 60% or higher, much further more preferably a fluororesin having a fluorine substitution percentage of 75% or higher, particularly preferably a fluororesin having a fluorine substitution percentage of 80% or higher, most preferably a fluororesin having a fluorine substitution percentage of 90 to 100%, i.e., a perfluororesin.

Fluorine substitution percentage (%)=(number of fluorine atoms binding to any of carbon atoms constituting fluoropolymer)/[(number of hydrogen atoms binding to any of carbon atoms constituting fluoropolymer)+(number of fluorine atoms and chlorine atoms binding to any of carbon atoms constituting fluoropolymer)]×100   (Formula)

The perfluororesin is more preferably a fluororesin having a fluorine substitution percentage of 95 to 100%, still more preferably PTFE, FEP, or PFA, particularly preferably PTFE.

The fluoropolymer may have a core-shell structure. An example of the fluoropolymer having a core-shell structure is a modified PTFE including a core of high-molecular-weight PTFE and a shell of a lower-molecular-weight PTFE or a modified PTFE in the molecule. An example of such a modified PTFE is a PTFE disclosed in JP 2005-527652 T.

The core-shell structure may have any of the following structures.

| | |
|---|---|
| Core: TFE homopolymer | Shell: TFE homopolymer |
| Core: modified PTFE | Shell: TFE homopolymer |
| Core: modified PTFE | Shell: modified PTFE |
| Core: TFE homopolymer | Shell: modified PTFE |
| Core: low-molecular-weight PTFE | Shell: high-molecular-weight PTFE |
| Core: high-molecular-weight PTFE | Shell: low-molecular-weight PTFE |

In the fluoropolymer having a core-shell structure, the lower limit of the proportion of the core is preferably 0.5% by mass, more preferably 1.0% by mass, still more preferably 3.0% by mass, particularly preferably 5.0% by mass, most preferably 10.0% by mass. The upper limit of the proportion of the core is preferably 99.5% by mass, more preferably 99.0% by mass, still more preferably 97.0% by mass, particularly preferably 95.0% by mass, most preferably 90.0% by mass.

In the fluoropolymer having a core-shell structure, the lower limit of the proportion of the shell is preferably 0.5% by mass, more preferably 1.0% by mass, still more preferably 3.0% by mass, particularly preferably 5.0% by mass, most preferably 10.0% by mass. The upper limit of the proportion of the shell is preferably 99.5% by mass, more preferably 99.0% by mass, still more preferably 97.0% by mass, particularly preferably 95.0% by mass, most preferably 90.0% by mass.

In the fluoropolymer having a core-shell structure, the core or the shell may have a structure of two or more layers. For example, the fluoropolymer may have a trilayer structure including a core center portion of a modified PTFE, a core outer layer portion of a TFE homopolymer, and a shell of a modified PTFE. An example of a fluoropolymer having such a trilayer structure is a PTFE disclosed in WO 2006/054612.

The non melt-processible fluororesins (I), the melt-fabricable fluororesins (II), and the fluoroelastomers (III) suitably produced by the production method of the invention are preferably produced in the following manner.

(I) Non Melt-Processible Fluororesins

In the production method of the invention, polymerization of TFE is usually performed at a polymerization temperature of 10° C. to 150° C. and a polymerization pressure of 0.05 to 5 MPaG.

In an embodiment, the polymerization reaction is initiated by feeding pure water into a pressure-resistant reaction container equipped with a stirrer, deoxidizing the system, feeding TFE, increasing the temperature to a predetermined level, and adding a polymerization initiator. If the pressure decreases as the reaction progresses, additional TFE is fed continually or intermittently to maintain the initial pressure. When the amount of TFE fed reaches a predetermined level, feeding is stopped. TFE in the reaction container is purged and the temperature is reduced to room temperature, whereby the reaction is completed. Additional TFE may be added continually or intermittently to prevent a pressure decrease.

In production of the TFE polymer (PTFE), any of known modifying monomers may be used together. The TFE polymer as used herein is a concept that encompasses not only a TFE homopolymer but also a non melt-processible copolymer of TFE and a modifying monomer (hereinafter, referred to as a "modified PTFE").

Examples of the modifying monomer include perhaloolefins such as HFP and CTFE; fluoro(alkyl vinyl ethers) containing a C1-C5, particularly C1-3 alkyl group; cyclic fluorinated monomers such as fluorodioxole; perhaloalkyl ethylenes; and ω-hydroperhaloolefins. The modifying monomer may be fed at once in an initial stage, or may be fed in portions continually or intermittently in accordance with the purpose and the manner of TFE feeding.

The modified PTFE usually has a modifying monomer content within the range of 0.001 to 2.0% by mass. The lower limit of the modifying monomer content is more preferably 0.01% by mass, still more preferably 0.05% by mass. The upper limit of the modifying monomer content is more preferably 1.0% by mass, still more preferably 0.5% by mass, particularly preferably 0.3% by mass.

In production of the TFE polymer, the surfactant can be used within the use range described for the production method of the invention. The surfactant may be added in any concentration within the above range, and is usually added at a critical micelle concentration (CMC) or lower in initiating the polymerization. Too large an amount of the surfactant added may cause generation of needle-shaped particles having a large aspect ratio and gelling of the aqueous dispersion, impairing the stability. The lower limit of the amount of the surfactant used is preferably 0.0001% by mass, more preferably 0.001% by mass, still more preferably 0.01% by mass, particularly preferably 0.1% by mass, relative to the aqueous medium. The upper limit of the surfactant is preferably 10% by mass, more preferably 5% by mass, still more preferably 3% by mass, particularly preferably 2% by mass, relative to the aqueous medium.

The surfactant may be added to a reaction container at once before initiation of the polymerization, may be added at once after initiation of the polymerization, may be added in multiple portions during the polymerization, or may be added continually during the polymerization.

In production of the TFE polymer, the polymerization initiator used may be an organic peroxide such as a persulfate (e.g., ammonium persulfate), disuccinic acid peroxide, or diglutaric acid peroxide alone or in the form of an mixture thereof. An organic peroxide may be used together with a reducing agent such as sodium sulfite to form a redox system. During the polymerization, a radical scavenger such as hydroquinone or catechol may be added or a decomposer for peroxides such as ammonium sulfite may be added to control the radical concentration in the system.

The redox polymerization initiator is preferably a redox initiator that is a combination of an oxidizing agent and a reducing agent. Examples of the oxidizing agent include persulfates, organic peroxides, potassium permanganate, manganese triacetate, ammonium cerium nitrate, and bromic acid salts. Examples of the reducing agent include sulfites, bisulfites, bromic acid salts, diimines, and oxalic acid. Examples of the persulfates include ammonium persulfate and potassium persulfate. Examples of the sulfites include sodium sulfite and ammonium sulfite. In order to increase the decomposition rate of the initiator, the combination of a redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron(II) sulfate, ammonium persulfate/sulfite/iron(II) sulfate, ammonium persulfate/sulfite, ammonium persulfate/iron(II) sulfate, manganese triacetate/oxalic acid, ammonium cerium nitrate/oxalic acid, bromic acid salt/sulfite, and bromic acid salt/bisulfite. Preferred are potassium permanganate/oxalic acid and ammonium persulfate/sulfite/iron(II) sulfate. In the case of using a redox initiator, either an oxidizing agent or a reducing agent is put into a polymerization tank in advance and the other is continually or intermittently added thereto to initiate the polymerization. For example, in the case of potassium permanganate/oxalic acid, preferably, oxalic acid is put into a polymerization tank and potassium permanganate is continually added thereto.

In production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol and ethanol, and hydrogen. The chain transfer agent is preferably one in a gas state at normal temperature and normal pressure.

The chain transfer agent is usually used in an amount of 1 to 10000 ppm, preferably 1 to 5000 ppm, relative to the whole amount of TFE fed.

In production of the TFE polymer, a saturated hydrocarbon that is substantially inert to the reaction, that is in a liquid state under the above reaction conditions, and that contains 12 or more carbon atoms may be used as a dispersion stabilizer for the reaction system in an amount of 2 to 10 parts by mass relative to 100 parts by mass of the aqueous medium. A buffer such as ammonium carbonate or ammonium phosphate may be added to control the pH during the reaction.

At completion of the polymerization for the TFE polymer, an aqueous dispersion having a solid content of 1.0 to 70% by mass and an average primary particle size of 50 to 500 nm can be obtained. The aqueous dispersion contains the surfactant and the fluoropolymer. The presence of the surfactant enables production of an aqueous dispersion containing particles of the TFE polymer having a particle size as small as 0.5 μm or smaller.

The lower limit of the solid content is preferably 5% by mass, more preferably 8% by mass. The upper limit thereof may be, but is not limited to, 40% by mass or 35% by mass.

The lower limit of the average primary particle size is preferably 100 nm, more preferably 150 nm. The upper limit thereof is preferably 400 nm, more preferably 350 nm.

Agglomerating the aqueous dispersion can lead to fine powder. The aqueous dispersion of the TFE polymer can be formed into fine powder through agglomeration, washing, and drying. The resulting fine powder may be used in a variety of applications. Agglomeration of the aqueous dispersion of the TFE polymer is usually performed by diluting the aqueous dispersion obtained by polymerization for polymer latex, for example, with water to a polymer concentration of 5 to 20% by mass, optionally adjusting the pH to a neutral or alkaline level, and stirring the polymer more vigorously than during the reaction in a container equipped with a stirrer. The agglomeration may be performed under stirring while a water-soluble organic compound such as methanol or acetone, an inorganic salt such as potassium nitrate or ammonium carbonate, or an inorganic acid such as hydrochloric acid, sulfuric acid, or nitric acid is added as a coagulating agent. The agglomeration may be continually performed using a device such as an inline mixer.

In wastewater generated by the agglomeration, the TFE polymer in the non-agglomerated form is preferably present at a low concentration so as to achieve high productivity, more preferably at a concentration of less than 0.4% by mass, particularly preferably less than 0.3% by mass.

Before or during the agglomeration, a pigment for coloring or filler for improvement of mechanical properties may be added. Thereby, pigment- or filler-containing fine powder of a TFE polymer in which the pigment or the filler is uniformly blended therein.

Wet powder obtained by the agglomeration of the TFE polymer in the aqueous dispersion is usually dried by vacuum, high-frequency waves, hot air, or the like while the wet powder is less fluidized, preferably left to stand. Friction between the particles especially at high temperature will usually adversely affect the TFE polymer in the form of fine powder. This is because the particles of such a TFE polymer are easily formed into fibrils even with a small shearing force and lose the original, stable particulate structure.

The drying is performed at a drying temperature of 10° C. to 250° C., preferably 100° C. to 200° C.

The resulting fine powder of the TFE polymer is preferred for molding. Examples of preferred applications thereof include tubes for hydraulic systems or fuel systems of aircraft or automobiles, flexible hoses for chemicals or vapors, and electric wire coating.

The aqueous dispersion of the TFE polymer obtained by the polymerization may be mixed with a nonionic surfactant so that the aqueous dispersion is stabilized and more concentrated. In accordance with the purpose, preferably, such an aqueous dispersion may be mixed with organic or inorganic filler to form a composition and used in a variety of applications. The composition, when applied to a metal or ceramic substrate, can provide a film having non-stickiness, a low coefficient of friction, and excellent gloss, smoothness, abrasion resistance, weather resistance, and heat resistance. Thus, the composition is suitable for coating of rolls and cooking utensils and impregnation of glass cloth.

The aqueous dispersion may be formed into an organosol of the TFE polymer. The organosol can contain the TFE polymer and an organic solvent. Examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethyl acetamide. The organosol may be prepared by the method disclosed in WO 2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binding agent for batteries or used for dustproof applications.

The aqueous dispersion of the TFE polymer or the fine powder of the TFE polymer is also preferably combined with a resin other than the TFE polymer to form a processing aid before use. The aqueous dispersion or the fine powder is suitable as a material of the PTFEs disclosed in JP H11-49912 A, U.S. Pat. No. 5,804,654 B, JP H11-29679 A, and JP 2003-2980 A. The processing aid containing the aqueous dispersion or the fine powder is nothing inferior to the processing aids disclosed in the above documents.

The aqueous dispersion of the TFE polymer is also preferably mixed with an aqueous dispersion of a melt-fabricable fluororesin so that the components agglomerate to form co-agglomerated powder. The co-agglomerated powder is suitable as a processing aid.

Examples of the melt-fabricable fluororesin include FEP, PFA, ETFE, and ethylene/TFE/HFP copolymers (EFEPs). Preferred is FEP.

The aqueous dispersion also preferably contains a melt-fabricable fluororesin. Examples of the melt-fabricable fluororesin include FEP, PFA, ETFE, and EFEP. The aqueous dispersion containing the melt-fabricable fluororesin may be used as a coating material. The melt-fabricable fluororesin enables sufficient fusion of the TFE polymer particles, improving the film-formability and giving gloss to the resulting film.

The co-agglomerated powder may be added to a fluorine-free resin in the form of powder, pellets, or emulsion. In order to achieve sufficient mixing of the resins, the addition is preferably performed by a known method such as extrusion kneading or roll kneading under a shearing force.

The aqueous dispersion of the TFE polymer is also preferably used as a dust control agent. The dust control agent may be used in a method in which the dust control agent is mixed with a dust-generating substance and the mixture is affected by a compression-shear effect at a temperature of 20° C. to 200° C. to form fibrils of the TFE polymer, thereby reducing dust of dust-generating substances, such as the methods disclosed in JP 2827152 B and JP 2538783 B.

The aqueous dispersion of the TFE polymer can suitably be used for the dust control agent composition disclosed in WO 2007/004250, and can also suitably be used for a method of dust control treatment disclosed in WO 2007/000812.

The dust control agent can suitably be used for dust control treatment in the field of construction materials, for powdery quicklime, Portland cement, anhydrous gypsum, and granulated blast furnace slag powder used in the field of soil stabilizers and the field of solidification materials, in the field of fertilizers, in the field of reclamation of ash and hazardous materials, in the field of explosion protection, in the field of cosmetics, for pet toilet sand typified by cat litter, and solid particulate substances generating heat by hydration reactions, typified by alkaline earth metal oxides, alkaline earth metal peroxides, calcium carbide, calcium phosphide water, calcium aluminate, and calcium silicate.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The surfactant may be used to produce a high-molecular-weight PTFE. In other words, even without a conventional fluorinated surfactant, the production method of the invention using the surfactant can surprisingly produce a PTFE having a molecular weight equivalent to that of a PTFE obtained by a production method using such a conventional fluorinated surfactant.

The high-molecular-weight PTFE powder obtainable by the polymerization is also useful as a material of a PTFE stretched article (PTFE porous article). For example, a stretched article is obtainable by paste-extruding the high-molecular-weight PTFE powder mixed with an extrusion aid, optionally rolling the workpiece, drying the workpiece to remove the extrusion aid, and stretching the workpiece in at least one direction. Stretching enables easy formation of fibrils of PTFE, resulting in a PTFE stretched article including nodes and fibers. This PTFE stretched article is also a porous article having a high porosity.

This stretched article is also preferably in the form of a film, a tube, fibers, or rods.

The stretched article in the form of a film (PTFE stretched film or PTFE porous film) can be formed by stretching by a known PTFE stretching method.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched article is a porous article having a high porosity, and can suitably be used as a filter material for a variety of microfiltration membranes such as air filters and chemical filters and a support member for polymer electrolyte membranes.

The PTFE stretched article is also useful as a material of products used in the textile field, the medical treatment field, the electrochemical field, the sealant field, the air filter field, the ventilation/internal pressure adjustment field, the liquid filter field, and the consumer goods field.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), absorbent-attached filters (for HDD embedment), absorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as containers for freeze drying, ventilation materials for automobiles for electronic circuits and lamps, applications relating to containers such as container caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial drainage).

Consumer Goods Field

Examples of the applications in this field include clothes, cable guides (movable wires for motor bikes), clothes for motor cyclists, cast liners (medical supporters), filters for cleaners, bagpipes (musical instrument), cables (signal cables for guitars), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (extending articles), artificial blood vessels, catheters, general surgical operations (tissue reinforcing materials), products for head and neck (dura mater alternatives), oral health (tissue regenerative medicine), and orthopedics (bandages).

The surfactant may also be used to produce a low-molecular-weight PTFE.

The low-molecular-weight PTFE may be produced by polymerization, or may be produced by a known method (e.g., thermolysis, radiolysis) of reducing the molecular weight of a high-molecular-weight PTFE obtained by polymerization.

A low-molecular-weight PTFE having a molecular weight of 600000 or less (also referred to as PTFE micropowder) has excellent chemical stability and a very low surface energy, and is less likely to generate fibrils. Thus, such a low-molecular-weight PTFE can suitably be used as an additive for improving the lubricity and the texture of the film surface in production of plastics, inks, cosmetics, coating materials, greases, parts of office automation equipment, and toners (e.g., see JP H10-147617 A).

A low-molecular-weight PTFE may be obtained by dispersing a polymerization initiator and the surfactant in an aqueous medium in the presence of a chain transfer agent, and then polymerizing TFE alone or TFE and a monomer copolymerizable with TFE.

In the case of using as powder a low-molecular-weight PTFE obtained by the polymerization, the aqueous dispersion may be subjected to agglomeration to provide powder particles.

The high-molecular-weight PTFE as used herein means a PTFE having non melt-processability and a fibrillation ability. The low-molecular-weight PTFE as used herein means a PTFE having melt-fabricability and no fibrillation ability.

The non melt-processability means a feature of a polymer that the melt flow rate thereof cannot be measured at a temperature higher than the crystal melting point in conformity with ASTM D1238 and D2116.

The presence or absence of the fibrillation ability can be determined by "paste extrusion", a representative method of molding a "high-molecular-weight PTFE powder" which is a powder (fine powder) of a TFE emulsion polymer. The ability of a high-molecular-weight PTFE powder to be paste-extruded is owing to the fibrillation ability thereof. If a non-sintered molded article obtained by paste extrusion shows substantially no strength or elongation (for example, if it shows an elongation of 0% and is broken when stretched), it can be considered as non-fibrillatable.

The high-molecular-weight PTFE preferably has a standard specific gravity (SSG) of 2.130 to 2.280. The standard specific gravity is determined by the water replacement method in conformity with ASTM D792 using a sample prepared in conformity with ASTM D4895-89. The "high molecular weight" as used herein means that the standard specific gravity is within the above range.

The low-molecular-weight PTFE has a melt viscosity of $1\times10^2$ to $7\times10^5$ Pa·s at 380° C. The "low molecular weight" as used herein means that the melt viscosity is within the above range.

The high-molecular-weight PTFE has a melt viscosity significantly higher than that of the low-molecular-weight PTFE, and the melt viscosity thereof is difficult to measure accurately. The melt viscosity of the low-molecular-weight PTFE is measurable, but the low-molecular-weight PTFE has difficulty in providing a molded article to be used in measurement of the standard specific gravity. Thus, the standard specific gravity thereof is difficult to measure accurately. Accordingly, in the invention, the standard specific gravity is used as an index of the molecular weight of the high-molecular-weight PTFE, while the melt viscosity is used as an index of the molecular weight of the low-molecular-weight PTFE. For both the high-molecular-weight PTFE and the low-molecular-weight PTFE, no measurement methods for directly specifying the molecular weight have been known so far.

The high-molecular-weight PTFE preferably has a peak temperature of 333° C. to 347° C., more preferably 335° C. to 345° C. The low-molecular-weight PTFE preferably has a peak temperature of 322° C. to 333° C., more preferably 324° C. to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher.

Preferably, the high-molecular-weight PTFE has at least one endothermic peak in a temperature range of 333° C. to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290° C. to 350° C. calculated from the heat-of-fusion curve.

The PTFE fine powder obtained by the use of the surfactant may be used to produce unsintered tape (green tape).

The surfactant, decomposition products and by-products of the surfactant, and residual monomers may be collected from wastewater generated in the agglomeration or the washing and/or off gas generated in the drying, and then may be purified, whereby the surfactant, the decomposition products and by-products of the surfactant, and the residual monomers may be reused. The collection and the purification may be performed by known methods, although not limited thereto. For example, they may be performed by the methods disclosed in JP 2011-520020 T.

(II) Melt-Fabricable Fluororesins (1) In the production method of the invention, the polymerization for FEP is preferably performed at a polymerization temperature of 10° C. to 150° C. and a polymerization pressure of 0.3 to 6.0 MPaG.

The FEP preferably has a monomer composition ratio (% by mass) of TFE:HFP=(60 to 95):(5 to 40), more preferably (85 to 92):(8 to 15). The FEP may be modified with a perfluoro(alkyl vinyl ether) as a third component within a range of 0.1 to 2% by mass of all monomers.

In the polymerization for FEP, the surfactant may be used within the use range of the production method of the invention, and is usually added in an amount of 0.0001 to 10% by mass relative to 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of FEP obtained by the production method of the invention may optionally be subjected to post-treatment such as concentration, and then the concentrate may be dried and powdered, and the powder may be melt-extruded into pellets. The aqueous medium in the FEP aqueous dispersion may contain an additive such as a nonionic surfactant, if necessary, and may contain a water-soluble organic solvent such as a water-soluble alcohol or may be free from a water-soluble organic solvent.

The melt extrusion may be performed under any appropriately selected extrusion conditions usually capable of providing pellets.

The FEP obtained by the production method of the invention may contain an end group such as —$CF_3$ or —$CF_2H$ on at least one of the polymer main chain or a polymer side chain. Still, the FEP preferably contains a small amount of a thermally unstable group (hereinafter, referred to as an "unstable end group") such as —COOH, —$CH_2OH$, —COF, —CF=CF—, —$CONH_2$, or —$COOCH_3$, or contains no such a group.

The unstable end group is chemically unstable, and thus not only reduces the heat resistance of the resin but also increases the attenuation of the resulting electric wire.

The production method of the invention preferably provides a polymer such that the polymer at completion of the polymerization contains 50 or less unstable end groups and —$CF_2H$ end groups in total per $1\times10^6$ carbon atoms. The number of such groups is more preferably less than 20, still more preferably 5 or less, per $1\times10^6$ carbon atoms. Neither unstable end groups nor —$CF_2H$ end groups are present and every end group may be a —$CF_3$ end group.

Unstable end groups and —$CF_2H$ end groups may be fluorinated into —$CF_3$ end groups and thereby stabilized. An example of the fluorination method is, but not limited to, a method of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Preferred is a method of bringing a fluorination gas and FEP obtained in the invention into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100° C. to 250° C. The treatment temperature is not limited to this range and may be appropriately adjusted in accordance with the situation. The fluorine gas treatment is preferably performed by feeding a diluted fluorine gas into the reactor continually or intermittently. This fluorination treatment may be performed on dry powder after the polymerization or on melt-extruded pellets.

The FEP obtained by the production method of the invention has good moldability and is less likely to cause molding failure, as well as having good properties such as heat resistance, chemical resistance, solvent resistance, insulation, and electric properties.

The FEP powder may be produced by a method of drying the FEP obtained by the production method of the invention to powder the FEP.

The powder may be fluorinated. The fluorinated powder may be produced by a method of feeding a fluorine gas to the powder obtained by the method of producing the powder to fluorinate the powder.

The FEP pellets may be produced by a method of pelletizing the FEP obtained by the production method of the invention.

The pellets may be fluorinated. The fluorinated pellets may be produced by a method of feeding a fluorine gas to the pellets obtained by the method of producing the pellets to fluorinate the pellets.

Thus, this FEP may be used in production of a variety of molded articles such as coating materials for electric wires, foamed electric wires, cables, and wires, tubes, films, sheets, and filaments.

(2) In the production method of the invention, the polymerization for a TFE/perfluoro(alkyl vinyl ether) copolymer such as PFA or MFA is usually preferably performed at a polymerization temperature of 10° C. to 100° C. and a polymerization pressure of 0.3 to 6.0 MPaG.

The TFE/perfluoro(alkyl vinyl ether) copolymer preferably has a monomer composition ratio (mol %) of TFE: perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2=CFORf^4$, wherein $Rf^4$ is a C1-C6 perfluoroalkyl group.

In the polymerization for the TFE/perfluoro(alkyl vinyl ether) copolymer, the surfactant may be used within the use range of the production method of the invention, and is usually preferably added in an amount of 0.0001 to 10% by mass relative to 100% by mass of the aqueous medium.

In the polymerization for the TFE/perfluoro(alkyl vinyl ether) copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer such as PFA or MFA obtained by the production method of the invention may optionally be subjected to post-treatment such as concentration, and then the concentrate may be dried and powdered, and the powder may be melt-extruded into pellets. The aqueous medium in the aqueous dispersion may contain an additive such as a nonionic surfactant, if necessary, and may contain a water-soluble organic solvent such as a water-soluble alcohol or may be free from a water-soluble organic solvent.

The melt extrusion may be performed under any appropriately selected extrusion conditions usually capable of providing pellets.

In order to improve the heat resistance of the copolymer and to reinforce a chemical permeation reducing effect of a molded article, the copolymer is preferably subjected to a fluorine gas treatment.

The fluorine gas treatment is performed by bringing fluorine gas into contact with a chemical permeation reducing agent. Still, a reaction with fluorine generates a large amount of heat, so that fluorine is preferably diluted with an inert gas such as nitrogen. Such a fluorine gas/inert gas mixture has a fluorine content of 1 to 100% by weight, preferably 10 to 25% by weight. The treatment is performed at a treatment temperature of 150° C. to 250° C., preferably 200° C. to 250° C. and the fluorine gas treatment duration is 3 to 16 hours, preferably 4 to 12 hours. The fluorine gas treatment is performed at a gas pressure of 1 to 10 atm, preferably atmospheric pressure. In the case of using a reactor at atmospheric pressure, the fluorine gas/inert gas mixture is continually passed through the reactor. This causes conversion of unstable ends of the copolymer into —$CF_3$ ends, making the copolymer thermally stable.

The copolymer and the composition thereof may be molded by compression molding, transfer molding, extrusion molding, injection molding, blow molding, or the like similar to conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of a TFE/perfluoro(alkyl vinyl ether) copolymer such as PFA or MFA may be appropriately mixed with a nonionic surfactant, and optionally polyethersulfone, polyamide-imide, and/or polyimide and metal powder are dissolved or dispersed in an organic solvent. Thereby, a primer composition can be obtained. This primer composition can be used in a method of applying a fluororesin to a metal surface. This method includes applying the primer composition to a metal surface, applying a melt-fabricable fluororesin composition to the resulting primer layer, and firing the melt-fabricable fluororesin composition layer together with the primer layer.

(3) In the production method of the invention, the polymerization for ETFE is preferably performed at a polymerization temperature of 10° C. to 100° C. and a polymerization pressure of 0.3 to 2.0 MPaG.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer preferably includes any of perfluorobutyl ethylene, perfluorobutyl ethylene, 3,3,4,4,5,5,6,6,7,7,8,8,8-tridecafluorooct-1-ene, 2,3,3,4,4,5,5-heptafluoro-1-pentene ($CH_2$=$CFCF_2CF_2CF_2H$), and 2-trifluoromethyl-3,3,3-trifluoropropene (($CF_3$)$_2C$=$CH_2$)

In the polymerization for ETFE, the surfactant may be used within the use range of the production method of the invention, and is usually added in an amount of 0.0001 to 10% by mass relative to 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of ETFE obtained by the production method of the invention may optionally be subjected to post-treatment such as concentration, and then the concentrate may be dried and powdered, and the powder may be melt-extruded into pellets. The aqueous medium in the aqueous dispersion may contain an additive such as a nonionic surfactant, if necessary, and may contain a water-soluble organic solvent such as a water-soluble alcohol or may be free from a water-soluble organic solvent.

The melt extrusion may be performed under any appropriately selected extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

The additive used as appropriate may be a known one. Specific examples thereof include ultraviolet absorbers, photostabilizers, antioxidants, infrared absorbers, flame retarders, flame-retardant filler, organic pigments, inorganic pigments, and dyes. In order to achieve excellent weather resistance, an inorganic additive is preferred.

The additive in the ETFE sheet is preferably present in an amount of 20% by mass or less, particularly preferably 10% by mass or less, relative to the whole mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, container inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

The ETFE pellets have excellent heat resistance, and thus are suitable as a material of coating materials for electric wires.

Examples of the electric wires include cables and wires. Examples of the electric wire in the invention include coaxial cables, high-frequency cables, flat cables, and heat-resistant cables.

(4) The production method of the invention may be used to produce an electrolyte polymer precursor. In the production method of the invention, the polymerization for the electrolyte polymer precursor is preferably performed at a polymerization temperature of 10° C. to 100° C. and a polymerization pressure of 0.1 to 2.0 MPaG. The electrolyte polymer precursor contains a vinyl ether monomer as described below and can be converted into an ion-exchangeable polymer through a hydrolysis treatment.

An example of the vinyl ether monomer to be used for the electrolyte polymer precursor is a fluoromonomer represented by the formula (150):

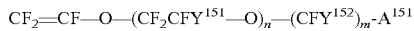

(wherein $Y^{151}$ is a fluorine atom, a chlorine atom, a —$SO_2F$ group, or a perfluoroalkyl group, the perfluoroalkyl group optionally containing ether oxygen and a —$SO_2F$ group; n is an integer of 0 to 3; n $Y^{151}$s are the same as or different from each other; $Y^{152}$ is a fluorine atom, a chlorine atom, or a —$SO_2F$ group; m is an integer of 1 to 5; m $Y^{152}$s are the same as or different from each other; $A^{151}$ is —$SO_2X^{151}$, —$COZ^{151}$, or —$POZ^{152}Z^{153}$; $X^{151}$ is F, Cl, Br, I, —$OR^{151}$, or —$NR^{152}R^{153}$; $Z^{151}$, $Z^{152}$, and $Z^{153}$ are the same as or different from each other, and are each —$NR^{154}R^{155}$ or —$OR^{156}$; $R^{151}$, $R^{152}$, $R^{153}$, $R^{154}$, $R^{155}$, and $R^{156}$ are the same as or different from each other, and are each H, ammonium, an alkali metal, or an alkyl group, aryl group, or sulfonyl-containing group optionally containing a fluorine atom). The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multi-functional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte membrane for fuel cells, electrolysis devices, and redox flow batteries.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized container and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and this film may be used for antifouling films and organic actuators.

(5) TFE/VDF Copolymer

In the production method of the invention, the polymerization for the TFE/VDF copolymer may be performed at any polymerization temperature, such as 0° C. to 100° C. The polymerization pressure is selected as appropriate in accordance with the other polymerization conditions such as the polymerization temperature, and is usually 0 to 9.8 MPaG.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene: third monomer=(30 to 85):(10 to 69.9):(0.1 to 10).

The third monomer is preferably a monomer represented by the following formula:

$$CX^{11}X^{12}=CX^{13}(CX^{14}X^{15})_{n11}X^{16}$$

(wherein $X^{11}$ to $X^{16}$ are the same as or different from each other, and are each H, F, or Cl; and n11 is an integer of 0 to 8) other than TFE and VDF, or a monomer represented by the following formula:

$$CX^{21}X^{22}=CX^{23}-O(CX^{24}X^{25})_{n21}X^{26}$$

(wherein $X^{21}$ to $X^{26}$ are the same as or different from each other, and are each H, F, or Cl; and n21 is an integer of 0 to 8).

The third monomer may be a fluorine-free ethylenic monomer. In order to maintain the heat resistance and the chemical resistance, the fluorine-free ethylenic monomer is preferably selected from ethylenic monomers containing 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the surfactant may be used within the use range of the production method of the invention, and is usually added in an amount of 0.0001 to 5% by mass relative to 100% by mass of the aqueous medium.

The TFE/VDF copolymer obtained by the polymerization may be brought into contact with a nitrogen compound that can generate ammonia water, ammonia gas, or ammonia, and thereby may be amidated.

The TFE/VDF copolymer obtained by the above method may also preferably be used as a material for providing TFE/VDF copolymer fibers by a spinning-drawing method. The spinning-drawing method is a method in which the TFE/VDF copolymer is melt-spun and then cool-solidified to provide undrawn yarn, and the undrawn yarn is passed through a heating cylinder and thereby drawn, so that TFE/VDF copolymer fibers are obtained.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and low-boiling-point general-purpose organic solvents such as solvent mixtures of any of these. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries.

The powder of the melt-fabricable fluororesin is suitably used as a powdery coating material. When applied to a substrate, the powdery coating material containing the melt-fabricable fluororesin powder can provide a film having a smooth surface. The melt-fabricable fluororesin powder having an average particle size of not smaller than 1 μm but smaller than 100 μm is particularly suitable as a powdery coating material used for electrostatic coating. The melt-fabricable fluororesin powder having an average particle size of 100 μm or greater and 1000 μm or smaller is particularly suitable as a powdery coating material used for rotational coating or rotational molding.

The melt-fabricable fluororesin powder can be produced by a method in which the melt-fabricable fluororesin obtained by the production method of the invention is dried and powdered. The method for producing the melt-fabricable fluororesin powder is also one aspect of the invention.

(III) Fluoroelastomers

In the production method of the invention, the polymerization reaction for the fluoroelastomer is initiated by feeding pure water and the surfactant into a pressure-resistant reaction container equipped with a stirrer, deoxidizing the system, feeding the monomers, increasing the temperature to a predetermined level, and adding a polymerization initiator. The pressure decreases as the reaction progresses, additional monomers are fed continually or intermittently to maintain the initial pressure. When the amount of the monomers reaches a predetermined level, feeding is stopped. The monomers in the reaction container are purged and the temperature is reduced to room temperature, whereby the reaction is completed. In this case, polymer latex can be continually taken out of the reaction container.

In particular, in the case of producing a thermoplastic elastomer as the fluoroelastomer, fluoropolymer fine particles may be synthesized at a high concentration as described above and then diluted for further polymerization, as disclosed in WO 00/01741. This method can lead to a more rapid final polymerization rate than typical polymerization.

The polymerization for the fluoroelastomer may be performed under conditions appropriately selected in accordance with the physical properties of the target polymer and control of the polymerization rate, and is performed at a polymerization temperature of usually −20° C. to 200° C., preferably 5° C. to 150° C., and a polymerization pressure of usually 0.5 to 10 MPaG, preferably 1 to 7 MPaG. The polymerization medium preferably has a pH usually maintained at 2.5 to 13 using a pH adjuster to be described later by a known method, for example.

Examples of the monomer used in the polymerization for the fluoroelastomer include vinylidene fluoride, as well as fluorine-containing ethylenically unsaturated monomers that contain fluorine atoms at least as much as the carbon atoms therein and that are copolymerizable with vinylidene fluoride. Examples of the fluorine-containing ethylenically unsaturated monomers include trifluoropropene, pentafluoropropene, hexafluorobutene, and octafluorobutene. Hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Alternatively, one or two or more fluorine-containing monomers containing a chlorine and/or bromine substituent(s) may also be used. Perfluoro(alkyl vinyl ethers) such as perfluoro (methyl vinyl ether) may also be used. TFE and HFP are preferred to produce a fluoroelastomer.

The fluoroelastomer preferably has a monomer composition ratio (% by mass) of vinylidene fluoride:HFP:TFE=(20 to 70):(30 to 48):(0 to 32). The fluoroelastomer having this composition ratio exhibits good elastomeric characteristics, chemical resistance, and thermal stability.

In the polymerization for the fluoroelastomer, the surfactant may be used within the use range of the production method of the invention, and is usually added in an amount of 0.0001 to 20% by mass, preferably 10% by mass or less, more preferably 2% by mass or less, relative to 100% by mass of the aqueous medium.

In the polymerization for the fluoroelastomer, the polymerization initiator used may be a known inorganic radical polymerization initiator. Examples of particularly useful inorganic radical polymerization initiators include conventionally known water-soluble inorganic peroxides, such as a persulfates, superphosphates, perborates, percarbonates, and permanganates of sodium, potassium, or ammonium. The radical polymerization initiator may be further activated with a reducing agent such as a sulfite, a bisulfite, a metabisulfite, a hyposulfite, a thiosulfate, a phosphite, or a hypophosphite of sodium, potassium, or ammonium or an easily oxidizable metal compound such as an iron(II) salt, a copper(I) salt, or a silver salt. A preferred inorganic radical polymerization initiator is ammonium persulfate. More preferred is combination use of ammonium persulfate and sodium bisulfite in a redox system.

The polymerization initiator is added at a concentration appropriately selected in accordance with the molecular weight of the target fluoropolymer and the polymerization reaction rate. The concentration is set to 0.0001 to 10% by mass, preferably 0.01 to 5% by mass, relative to 100% by mass in total of all monomers.

In the polymerization for the fluoroelastomer, a known chain transfer agent may be used. Examples thereof include hydrocarbons, esters, ethers, alcohols, ketones, chlorine compounds, and carbonates. For thermoplastic elastomers, any of hydrocarbons, esters, ethers, alcohols, chlorine compounds, iodine compounds, and the like may be used. Preferred among these are acetone and isopropyl alcohol. In order to reduce a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize an end of the polymer and allow the resulting polymer to serve as a reactive polymer.

The chain transfer agent is usually used in an amount of $0.5 \times 10^{-3}$ to $5 \times 10^{-3}$ mol %, preferably $1.0 \times 10^{-3}$ to $3.5 \times 10^{-3}$ mol %, relative to the whole amount of the monomers fed.

In the polymerization for the fluoroelastomer, paraffin wax may preferably be used as an emulsification stabilizer, for example. In the polymerization for a thermoplastic elastomer, a phosphate, sodium hydroxide, potassium hydroxide, or the like may preferably be used as a pH adjuster.

At completion of the polymerization, the fluoroelastomer obtained by the production method of the invention has a solid content of 1.0 to 40% by mass, an average particle size of 0.03 to 1 μm, preferably 0.05 to 0.5 μm, and a number average molecular weight of 1000 to 2000000.

The fluoroelastomer obtained by the production method of the invention may optionally be mixed with a dispersion stabilizer such as a hydrocarbon-based surfactant or be concentrated. Thereby, the fluoroelastomer is formed into a dispersion suitable for rubber molding. The dispersion is subjected to treatments such as pH control, solidification, and heating. The treatments are performed as follows.

The pH control is performed such that a mineral acid such as nitric acid, sulfuric acid, hydrochloric acid, or phosphoric acid and/or a carboxylic acid containing 5 or less carbon atoms and having pK=4.2 or lower is added to control the pH to 2 or lower.

The solidification is performed by adding an alkaline earth metal salt. Examples of the alkaline earth metal salt include a nitrate, chlorate, and acetate of calcium or magnesium.

The pH control and the solidification may be performed in any order, and the pH control is preferably performed before.

These operations are followed by washing with water in an amount equal to the fluoroelastomer to remove a small amount of impurities such as buffers and salts present in the fluoroelastomer and drying of the fluoroelastomer. The drying is usually performed at about 70° C. to 200° C. while the air is circulated in a drying furnace at high temperature.

The fluoroelastomer may be either a partially fluorinated elastomer or a perfluoroelastomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/tetrafluoroethylene (TFE)-based fluoroelastomers. The partially fluorinated elastomer preferably includes at least one selected from the group consisting of a vinylidene fluoride-based fluoroelastomer and a tetrafluoroethylene/propylene-based fluoroelastomer.

The vinylidene fluoride-based fluoroelastomer is preferably a copolymer containing 45 to 85 mol % of vinylidene fluoride and 55 to 15 mol % of at least one different monomer copolymerizable with vinylidene fluoride. The vinylidene fluoride-based fluoroelastomer is more preferably a copolymer containing 50 to 80 mol % of vinylidene fluoride and 50 to 20 mol % of at least one different monomer copolymerizable with vinylidene fluoride.

Examples of the at least one different monomer copolymerizable with vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by the formula (100): $CH_2=CFRf^{101}$ (wherein $Rf^{101}$ is a C1-C12 linear or branched fluoroalkyl group), a fluoromonomer represented by the formula (170): $CH_2=CH-(CF_2)_n-X^{171}$ (wherein $X^{171}$ is H or F; and n is an integer of 3 to 10), and a monomer giving a crosslinking site; and non-fluorinated monomers such as ethylene, propylene, and alkyl vinyl ethers. These may be used alone or in any combination thereof. At least one selected from the group consisting of TFE, HFP, fluoroalkyl vinyl ethers, and CTFE is preferably used. The fluoroalkyl vinyl ethers are preferably fluoromonomers represented by the formula (110).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the formula (100), rubber based on VDF, a fluoromonomer represented by the formula (100), and TFE, rubber based on VDF and perfluoro(methyl vinyl ether) (PMVE), VDF/PMVE/TFE-based rubber, and VDF/PMVE/TFE/HFP-based rubber. The rubber based on VDF and a fluoromonomer represented by the formula (100) is preferably VDF/$CH_2$=$CFCF_3$-based rubber. The rubber based on VDF, a fluoromonomer represented by the formula (100), and TFE is preferably VDF/TFE/$CH_2$=$CFCF_3$-based rubber.

The VDF/$CH_2$=$CFCF_3$-based rubber is preferably a copolymer containing 40 to 99.5 mol % of VDF and 0.5 to 60 mol % of $CH_2$=$CFCF_3$, more preferably a copolymer containing 50 to 85 mol % of VDF and 20 to 50 mol % of $CH_2$=$CFCF_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer giving a crosslinking site.

The fluoroelastomer may be a perfluoroelastomer. The perfluoroelastomer preferably includes at least one selected from the group consisting of perfluoroelastomers containing TFE, such as a copolymer containing TFE and a fluoromonomer represented by the formula (110), (130), or (140) and a copolymer containing TFE, a fluoromonomer represented by the formula (110), (130), or (140), and a monomer giving a crosslinking site.

For the TFE/PMVE copolymer, the composition ratio thereof is preferably (45 to 90)/(10 to 55) (mol %), more preferably (55 to 80)/(20 to 45), still more preferably (55 to 70)/(30 to 45).

For the copolymer of TFE, PMVE, and a monomer giving a crosslinking site, the composition ratio thereof is preferably (45 to 89.9)/(10 to 54.9)/(0.01 to 4) (mol %), more preferably (55 to 77.9)/(20 to 49.9)/(0.1 to 3.5), still more preferably (55 to 69.8)/(30 to 44.8)/(0.2 to 3).

For the copolymer of TFE and a C4-C12 fluoromonomer represented by the formula (110), (130), or (140), the composition ratio thereof is preferably (50 to 90)/(10 to 50) (mol %), more preferably (60 to 88)/(12 to 40), still more preferably (65 to 85)/(15 to 35).

For the copolymer of TFE, a C4-C12 fluoromonomer represented by the formula (110), (130), or (140), and a monomer giving a crosslinking site, the composition ratio thereof is preferably (50 to 89.9)/(10 to 49.9)/(0.01 to 4) (mol %), more preferably (60 to 87.9)/(12 to 39.9)/(0.1 to 3.5), still more preferably (65 to 84.8)/(15 to 34.8)/(0.2 to 3).

Each of the above copolymers having a composition ratio outside the above corresponding range tends to lose the properties as a rubber elastic article and to have properties close to those of a resin.

The perfluoroelastomer is preferably at least one selected from the group consisting of copolymers of TFE, a fluoromonomer represented by the formula (140), and a fluoromonomer giving a crosslinking site, copolymers of TFE and a perfluorovinyl ether represented by the formula (140), copolymers of TFE and a fluoromonomer represented by the formula (110), and copolymers of TFE, a fluoromonomer represented by the formula (110), and a monomer giving a crosslinking site.

The perfluoroelastomer may also be any of the perfluoroelastomers disclosed in documents such as WO 97/24381, JP 561-57324 B, JP H04-81608 B, and JP H05-13961 B.

In order to achieve an excellent compression set at high temperature, the fluoroelastomer preferably has a glass transition temperature of −70° C. or higher, more preferably −60° C. or higher, still more preferably −50° C. or higher. In order to achieve good cold resistance, the glass transition temperature is preferably 5° C. or lower, more preferably 0° C. or lower, still more preferably −3° C. or lower.

The glass transition temperature can be determined as follows. Specifically, using a differential scanning calorimeter (DSC822e, available from Mettler-Toledo International Inc.), 10 mg of a sample is heated at a rate of 10° C./min to give a DSC curve, and the temperature is read at the intermediate point of two intersections between each of the extension lines of the base lines before and after the secondary transition of the DSC curve and the tangent line at the inflection point of the DSC curve.

In order to achieve good heat resistance, the fluoroelastomer preferably has a Mooney viscosity ML(1+20) of 30 or higher, more preferably 40 or higher, still more preferably 50 or higher, at 170° C. In order to achieve good processability, this Mooney viscosity is preferably 150 or lower, more preferably 120 or lower, still more preferably 110 or lower.

In order to achieve good heat resistance, the fluoroelastomer preferably has a Mooney viscosity ML(1+20) of 30 or higher, more preferably 40 or higher, still more preferably 50 or higher, at 140° C. In order to achieve good processability, this Mooney viscosity is preferably 180 or lower, more preferably 150 or lower, still more preferably 110 or lower.

In order to achieve good heat resistance, the fluoroelastomer preferably has a Mooney viscosity ML(1+10) of 10 or higher, more preferably 20 or higher, still more preferably 30 or higher, at 100° C. In order to achieve good processability, this Mooney viscosity is preferably 120 or lower, more preferably 100 or lower, still more preferably 80 or lower.

The Mooney viscosity can be determined using a Mooney viscometer MV2000E available from Alpha Technologies Inc. at 170° C., 140° C., or 100° C. in conformity with JIS K 6300.

The fluoroelastomer obtained by the production method of the invention may be in any form as long as it is obtainable by the polymerization. The fluoroelastomer may be an aqueous dispersion as it is obtained by the polymerization, or may be used in the form of a gum or a crumb obtained by conventional agglomeration, drying, and any other treatment on the aqueous dispersion as it is obtained by the polymerization. An emulsifier used in the production method of the invention can improve the stability of an emulsion, and is more preferably used in a polymerization method in which substances insoluble in water such as an initiator, including an organic peroxide, and a chain transfer agent, including an iodine or bromine compound, are added during the polymerization as described above.

The gum is a small particulate mass of the fluoroelastomer. The crumb is an unshaped mass of the fluoroelastomer resulting from fusion of particles that cannot maintain the form of small particles as gum at room temperature.

The fluoroelastomer may be mixed with any additive such as a curing agent and filler to be processed into a fluoroelastomer composition.

Examples of the curing agent include polyols, polyamines, organic peroxides, organotins, bis(aminophenol)tetraamine, and bis(thioaminophenol).

The fluoroelastomer composition contains the fluoroelastomer, and thus is substantially free from an emulsifier and is excellent in that it is easily crosslinked during molding.

The fluoroelastomer may be molded to form a fluoroelastomer molded article. The molding may be performed by any method such as a known method using the aforementioned curing agent.

The fluoroelastomer molded article is suitable for seals, gaskets, electric wire coatings, hoses, tubes, laminates, and accessories, particularly parts for semiconductor manufacturing devices and automobile parts.

The polymerization can usually provide an aqueous dispersion containing the fluoropolymer. The fluoropolymer is usually at a concentration of 8 to 50% by mass of the aqueous dispersion obtained by the polymerization. In the aqueous dispersion, the lower limit of the concentration of the fluoropolymer is preferably 10% by mass, more preferably 15% by mass, while the upper limit thereof is preferably 40% by mass, more preferably 35% by mass.

The aqueous dispersion obtained by the polymerization may be concentrated or subjected to dispersion stabilization treatment into a dispersion, or may be precipitated or agglomerated, collected, and dried into powder or other solid (e.g., pellets). The production method of the invention is less likely to allow the surfactant to remain in the powder or pellets.

The surfactant is also suitably used as a dispersant for dispersing the fluoropolymer obtained by the polymerization in an aqueous medium.

The polymerization usually provides an aqueous dispersion containing particles of the fluoropolymer, the surfactant, and the aqueous medium. The aqueous dispersion contains particles of the fluoropolymer in an aqueous medium in the presence of the surfactant.

The surfactant is preferably present in an amount of 0.0001 to 9.5 parts by weight relative to 100 parts by weight of the aqueous dispersion. Less than 0.0001 parts by weight of the surfactant may cause poor dispersion stability. More than 9.5 parts by weight of the surfactant may fail to give a dispersing effect corresponding to the amount thereof, and thus is impractical. The lower limit of the amount of the surfactant is more preferably 0.001 parts by weight, while the upper limit thereof is more preferably 2 parts by weight.

The aqueous dispersion may be any of an aqueous dispersion obtained by the polymerization, a dispersion obtained by concentrating this aqueous dispersion or subjecting the aqueous dispersion to dispersion stabilization treatment or extracting the aqueous dispersion, and an aqueous dispersion obtained by dispersing powder of the fluoropolymer into an aqueous medium in the presence of the surfactant.

The aqueous dispersion may also be produced as a purified aqueous dispersion by a method including bringing the aqueous dispersion obtained by the polymerization into contact with an anion exchange resin or a mixed bed containing an anion exchange resin and a cation exchange resin in the presence of a nonionic surfactant, and concentrating the aqueous dispersion obtained by this step such that the solid content is 30 to 70% by mass relative to 100% by mass of the aqueous dispersion. The nonionic surfactant may be, but is not limited to, any of those to be described later. The anion exchange resin may be, but is not limited to, a known one. The contact with the anion exchange resin may be achieved by a known method.

Examples of the anion exchange resin include known ones such as a strongly basic anion exchange resin containing as a functional group a $-N^+X^-(CH_3)_3$ group (wherein X is Cl or OH) and a strongly basic anion exchange resin containing a $-N^+X^-(CH_3)_3(C_2H_4OH)$ group (wherein X is defined as described above).

Examples of the cation exchange resin include, but are not limited to, known ones such as a strongly acidic cation exchange resin containing as a functional group a $-SO_3^-$ group and a weakly acidic cation exchange resin containing as a functional group a $-COO^-$ group. In order to achieve good removal efficiency, a strongly acidic cation exchange resin is preferred, a $H^+$ form strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in a coarse fluorine-containing polymer aqueous dispersion.

The concentration may be performed by a known method, such as phase separation, electroconcentration, or ultrafiltration. The concentration enables the fluoropolymer concentration to be 30 to 70% by mass in accordance with the use thereof. The concentration may impair the stability of the dispersion. In such a case, a dispersion stabilizer may be further added. The dispersion stabilizer added may be the aforementioned surfactant or any variety of surfactants. Examples of a variety of dispersion stabilizers include, but are not limited to, nonionic surfactants such as polyoxyalkyl ethers, particularly polyoxyethylene alkyl phenyl ethers (e.g., Triton X-100 (trade name) available from Rohm and Haas Co.), polyoxyethylene isotridecyl ethers (e.g., Noigen TDS80C (trade name) available from DKS Co., Ltd., Leocol TD90D (trade name) available from Lion Corp., and Genapol X080 (trade name) available from Clariant), and polyoxyethylene ethers.

The whole amount of the dispersion stabilizer corresponds to a concentration of 0.5 to 20% by mass relative to the solid content of the dispersion. Less than 0.5% by mass of the dispersion stabilizer may cause poor dispersion stability. More than 20% by mass thereof may fail to give a dispersing effect corresponding to the amount thereof, and thus is impractical. The lower limit of the amount of the dispersion stabilizer is more preferably 2% by mass, while the upper limit thereof is more preferably 12% by mass.

The surfactant may be removed by the concentration operation.

The aqueous dispersion obtained by the polymerization may also be subjected to a dispersion stabilization treatment without concentration for some applications. This can provide an aqueous dispersion having a long pot life. Examples of the dispersion stabilizer used include the same as those described above.

Examples of the applications of the aqueous dispersion include, but are not limited to, those in which the aqueous dispersion is directly used, such as coating achieved by applying the aqueous dispersion to a substrate, drying the dispersion, and optionally firing the workpiece; impregnation achieved by impregnating the aqueous dispersion into a porous support such as nonwoven fabric or a resin molded article, drying the dispersion, and preferably firing the workpiece; and casting achieved by applying the aqueous dispersion to a substrate such as glass, drying the dispersion, optionally immersing the workpiece into water, and removing the substrate to provide a film. Examples of such applications include aqueous dispersion-type coating materials, binders for electrodes, and water repellents for electrodes.

The aqueous dispersion may be mixed with any of compounding agents such as known pigments, thickening agents, viscosity controlling agents, leveling agents, dispersion stabilizers (stabilizing agents) for improving the mechanical stability or storage stability, pH adjusters such as ammonia water, antifoam, preservatives, antibacterial agents, fillers, antifreezing agents, film-forming aids, film-forming agents, and organic solvents, or may be combined with another polymer compound. Thereby, the aqueous dispersion may be used in the form of an aqueous coating material for coating.

In order to control the viscosity of the aqueous dispersion or to improve the miscibility with a pigment or filler, the aqueous dispersion may preferably contain an anionic surfactant. The anionic surfactant is added appropriately to the extent that causes no problems from the economic and environmental viewpoints.

Examples of the anionic surfactant include non-fluorinated anionic surfactants and fluorinated anionic surfactants. Preferred are fluorine-free, non-fluorinated anionic surfactants, i.e., hydrocarbon anion surfactants.

In order to control the viscosity, any known anionic surfactants may be used, such as anionic surfactants disclosed in WO 2013/146950 and WO 2013/146947. Examples thereof include those containing a C6-C40, preferably C8-C20, more preferably C9-C13 saturated or unsaturated aliphatic chain. The saturated or unsaturated aliphatic chain may be either linear or branched, or may have a cyclic structure. The hydrocarbon may have aromaticity, or may contain an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Preferred among these are alkyl sulfonates, alkyl sulfates, and aliphatic carboxylic acids, and salts thereof.

Preferred examples of the alkyl sulfates and salts thereof include ammonium lauryl sulfate and sodium lauryl sulfate.

Preferred examples of the aliphatic carboxylic acids and salts thereof include succinic acid, decanoic acid, undecanoic acid, undecenoic acid, lauric acid, hydrododecanoic acid, and salts thereof.

The anionic surfactant is preferably added in an amount of 10 to 5000 ppm of the solid mass of the fluoropolymer, although the amount is in accordance with the types of the anion surfactant and other compounding agents.

The lower limit of the amount of the anionic surfactant is more preferably 50 ppm or more, still more preferably 100 ppm or more. Too small an amount of the anionic surfactant may have a poor viscosity controlling effect.

The upper limit of the amount of the anionic surfactant is more preferably 3000 ppm or less, still more preferably 2000 ppm or less. Too large an amount of the anionic surfactant may cause poor mechanical stability and storage stability of the aqueous dispersion.

In order to control the viscosity of the aqueous dispersion, components other than the anionic surfactants, such as methyl cellulose, alumina sol, polyvinyl alcohol, and carboxylated vinyl polymers may also be added.

The aqueous dispersion may optionally contain a different polymer compound to the extent that does not impair the characteristics of the aqueous dispersion.

Examples of the different polymer compound include, but are not limited to, polyethylene oxide (dispersion stabilizers), polyethylene glycol (dispersion stabilizers), phenol resin, urea resin, epoxy resin, melamine resin, polyester resin, polyether resin, silicone acrylic resin, silicone resin, silicone polyester resin, and polyurethane resin.

The surfactant, decomposition products and by-products of the surfactant, and residual monomers may be collected from wastewater generated in the agglomeration or the washing and/or off gas generated in the drying and then may be purified, whereby the surfactant, the decomposition products and by-products of the surfactant, and the residual monomers may be reused. The collection and the purification may be performed by known methods, although not limited thereto. For example, they may be performed by the methods disclosed in JP 2011-520020 T.

The collection of the surfactant, the decomposition products and by-products of the surfactant, and the residual monomers from wastewater generated in the agglomeration, wastewater generated in the washing, and off gas generated in the drying and the purification thereof may be performed by any known methods, although not limited thereto, such as the methods disclosed in US 2007/15937 A, US 2007/25902 A, and US 2007/27251 A. Specific examples of the methods are as follows.

An example of the method of collecting the surfactant, the decomposition products and by-products of the surfactant, and the residual monomers from wastewater is a method in which the wastewater is brought into contact with adsorption particles of ion exchange resin, activated carbon, silica gel, clay, zeolite, or the like, so that the particles are allowed to adsorb the surfactant and the others, and then the wastewater and the adsorption particles are separated. Incinerating the adsorption particles that adsorb the surfactant and the others can prevent emission of the surfactant and the others into the environment.

Alternatively, the surfactant and the others may also be collected by desorbing and eluting the surfactant and the others by a known method from the ion exchange resin particles having adsorbed the surfactant and the others. For example, in the case of using anion exchange resin particles as the ion exchange resin particles, the surfactant and the others can be eluted by bringing a mineral acid into contact with an anion exchange resin. When the resulting eluate is mixed with a water-soluble organic solvent, the mixture is usually separated into two phases and the lower layer contains the surfactant and the others. Collecting and neutralizing the lower layer enables collection of the surfactant and the others. Examples of the water-soluble organic solvent include polar solvents such as alcohols, ketones, and ethers.

Other methods of collecting the surfactant and the others from ion exchange resin particles include a method of using an ammonium salt and a water-soluble organic solvent and a method of using an alcohol and, if necessary, an acid. In the latter method, ester derivatives of the surfactant and the others are generated. They can easily be separated from the alcohol by distillation.

If the wastewater contains fluoropolymer particles and other solid components, they are preferably removed before the wastewater and the adsorption particles are brought into contact with each other. Examples of methods of removing the fluoropolymer particles and other solid components include a method of adding an aluminum salt, for example, to deposit the target components, and then separating the wastewater and the deposits, and electrocoagulation. The components may also be removed by a mechanical method, such as crossflow filtration, depth filtration, or precoat filtration.

In order to achieve good productivity, the wastewater preferably contains the fluoropolymer in a non-agglomerated form in a low concentration, more preferably less than 0.4% by mass, particularly preferably less than 0.3% by mass.

An example of the method of collecting the surfactant and the others from the off gas is a method in which a scrubber is brought into contact with deionized water, an alkaline aqueous solution, an organic solvent such as a glycol ether solvent, or the like to provide a scrubber solution containing the surfactant and the others. The use of a concentrated alkaline solution as an alkaline aqueous solution enables collection of the scrubber solution with the surfactant and the others being phase-separated. This results in easy collection and reuse of the surfactant and the others. Examples of the alkali compound include alkali metal hydroxides and quaternary ammonium salts.

The scrubber solution containing the surfactant and the others may be concentrated using a reverse osmosis membrane, for example. The concentrated scrubber solution usually contains fluoride ions. Still, the fluoride ions may be removed by adding alumina after the concentration so that the surfactant and the others can easily be reused. Alternatively, the scrubber solution may be brought into contact with adsorption particles so that the adsorption particles can adsorb the surfactant and the others, and thereby the surfactant and the others may be collected by the aforementioned method.

The surfactant and the others collected by any of the above methods may be reused in production of a fluoropolymer.

The invention also relates to a surfactant for polymerization that includes at least one selected from the group consisting of:

a surfactant (a) represented by the following formula (a):

[Chem. 71]

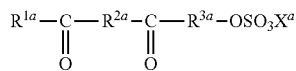

(wherein
R$^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
R$^{2a}$ and R$^{3a}$ are each individually a single bond or a divalent linking group;
R$^{1a}$, R$^{2a}$, and R$^{3a}$ contain six or more carbon atoms in total;
X$^a$ is H, a metal atom, NR$^{4a}_4$, imidazolium optionally containing a substituent, pyridinium optionally containing a substituent, or phosphonium optionally containing a substituent, where R$^{4a}$s are each H or an organic group and are the same as or different from each other; and
any two of R$^{1a}$, R$^{2a}$, and R$^{3a}$ optionally bind to each other to form a ring); and a surfactant (b) represented by the following formula (b):

[Chem. 72]

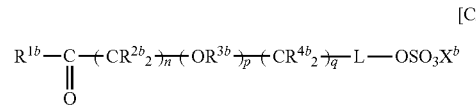

(wherein
R$^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;
R$^{2b}$ and R$^{4b}$ are each individually H or a substituent;
R$^{3b}$ is a C1-C10 alkylene group optionally containing a substituent;
n is an integer of 1 or greater;
p and q are each individually an integer of 0 or greater;
X$^b$ is H, a metal atom, NR$^{5b}_4$, imidazolium optionally containing a substituent, pyridinium optionally containing a substituent, or phosphonium optionally containing a substituent, where R$^{5b}$s are each H or an organic group and are the same as or different from each other;
any two of R$^{1b}$, R$^{2b}$, R$^{3b}$, and R$^{4b}$ optionally bind to each other to form a ring; and
L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^6$CO—B—, where B is a single bond or a C1-C10 alkylene group optionally containing a substituent, R$^{6b}$ is H or a C1-C4 alkyl group optionally containing a substituent, and * indicates the bond to —OSO$_3$X$^b$ in the formula).

The surfactant for polymerization can suitably be used as the surfactant used in the production method of the invention. A preferred structure of the surfactant for polymerization is the same as that of the surfactant used in the production method of the invention.

The invention also relates to use of a surfactant for production of a fluoropolymer by polymerization of a fluoromonomer in an aqueous medium, the surfactant including at least one selected from the group consisting of:

a surfactant (a) represented by the following formula (a):

[Chem. 73]

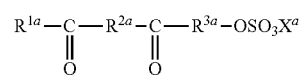

(wherein
R$^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
R$^{2a}$ and R$^{3a}$ are each individually a single bond or a divalent linking group;

$R^{1a}$, $R^{2a}$, and $R^{3a}$ contain six or more carbon atoms in total;

$X^a$ is H, a metal atom, $NR^{4a}{}_4$, imidazolium optionally containing a substituent, pyridinium optionally containing a substituent, or phosphonium optionally containing a substituent, where $R^{4a}$s are each H or an organic group and are the same as or different from each other; and any two of $R^{1a}$, $R^{2a}$, and $R^{3a}$ optionally bind to each other to form a ring); and a surfactant (b) represented by the following formula (b):

[Chem. 74]

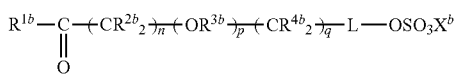

(wherein $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;

$R^{2b}$ and $R^{4b}$ are each individually H or a substituent;

$R^{3b}$ is a C1-C10 alkylene group optionally containing a substituent;

n is an integer of 1 or greater;

p and q are each individually an integer of 0 or greater;

$X^b$ is H, a metal atom, $NR^{5b}{}_4$, imidazolium optionally containing a substituent, pyridinium optionally containing a substituent, or phosphonium optionally containing a substituent, where $R^{5b}$s are each H or an organic group and are the same as or different from each other;

any two of $R^{1b}$, $R^{2b}$, $R^{3b}$, and $R^{4b}$ optionally bind to each other to form a ring; and L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a C1-C10 alkylene group optionally containing a substituent, $R^{6b}$ is H or a C1-C4 alkyl group optionally containing a substituent, and * indicates the bond to —$OSO_3X^b$ in the formula).

The aqueous medium, the fluoromonomer, and the fluoropolymer are preferably the same as those to be used in the production method of the invention. A preferred structure of the surfactant is the same as that of the surfactant used in the production method of the invention.

The invention also relates to a composition containing a fluoropolymer and at least one surfactant selected from the group consisting of:

a surfactant (a) represented by the following formula (a):

[Chem. 75]

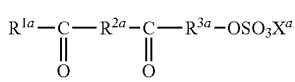

(wherein $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;

$R^{2a}$ and $R^{3a}$ are each individually a single bond or a divalent linking group;

$R^{1a}$, $R^{2a}$, and $R^{3a}$ contain six or more carbon atoms in total;

$X^a$ is H, a metal atom, $NR^{4a}{}_4$, imidazolium optionally containing a substituent, pyridinium optionally containing a substituent, or phosphonium optionally containing a substituent, where $R^{4a}$s are each H or an organic group and are the same as or different from each other; and any two of $R^{1a}$, $R^{2a}$, and $R^{3a}$ optionally bind to each other to form a ring); and a surfactant (b) represented by the following formula (b):

[Chem. 76]

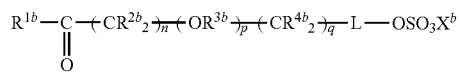

(wherein $R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;

$R^{2b}$ and $R^{4b}$ are each individually H or a substituent;

$R^{3b}$ is a C1-C10 alkylene group optionally containing a substituent;

n is an integer of 1 or greater;

p and q are each individually an integer of 0 or greater;

$X^b$ is H, a metal atom, $NR^{5b}{}_4$, imidazolium optionally containing a substituent, pyridinium optionally containing a substituent, or phosphonium optionally containing a substituent, where $R^{5b}$s are each H or an organic group and are the same as or different from each other;

any two of $R^{1b}$, $R^{2b}$, $R^{3b}$, and $R^{4b}$ optionally bind to each other to form a ring; and L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^6$—B—, and —$NR^6CO$—B—, where B is a single bond or a C1-C10 alkylene group optionally containing a substituent, $R^{6b}$ is H or a C1-C4 alkyl group optionally containing a substituent, and * indicates the bond to —$OSO_3X^b$ in the formula).

The composition of the invention is a composition containing a fluoropolymer and the surfactant (a), a composition containing a fluoropolymer and the surfactant (b), or a composition containing a fluoropolymer, the surfactant (a), and the surfactant (b).

The fluoropolymer is preferably the same as that to be used in the production method of the invention, more preferably a fluororesin, still more preferably a fluororesin having a fluorine substitution percentage of 50% or higher, further more preferably a fluororesin having a fluorine substitution percentage of higher than 50%, still further more preferably a fluororesin having a fluorine substitution percentage of 55% or higher, much more preferably a fluororesin having a fluorine substitution percentage of 60% or higher, still much more preferably a fluororesin having a fluorine substitution percentage of 75% or higher, particularly preferably a fluororesin having a fluorine substitution percentage of 80% or higher, most preferably a fluororesin having a fluorine substitution percentage of 90 to 100%, i.e., a perfluororesin.

The perfluororesin is more preferably a fluororesin having a fluorine substitution percentage of 95 to 100%, still more preferably PTFE, FEP, or PFA, particularly preferably PTFE.

A preferred structure of the surfactant is the same as that of the surfactant used in the production method of the invention.

The composition of the invention may be in the form of an aqueous dispersion, powder, or pellets. The aqueous dispersion may be a dispersion immediately after the polymerization, or may be one obtained by processing the dispersion immediately after the polymerization. For example, the aqueous dispersion may be mixed with a nonionic surfactant for improved mechanical stability and storage stability. The nonionic surfactant, when added, is preferably in an amount of 0.5 to 25% by mass relative to the fluoropolymer. The lower limit thereof is more preferably 1% by mass, still more preferably 3% by mass, while the upper limit thereof is more preferably 20% by mass, still more preferably 15% by mass, further more preferably 10% by mass.

The aqueous dispersion is a dispersion system in which an aqueous medium serves as a dispersion medium and the fluoropolymer serves as a dispersoid. The aqueous medium may be any liquid containing water, and may contain, in addition to water, an organic solvent such as an alcohol, an ether, a ketone, or paraffin wax.

The lower limit of the amount of the surfactant in the composition is preferably 1 ppb, more preferably 10 ppb, still more preferably 100 ppb, further more preferably 1 ppm, still further more preferably 10 ppm, most preferably 50 ppm, relative to the fluoropolymer. The upper limit thereof is preferably 100000 ppm, more preferably 50000 ppm, still more preferably 10000 ppm, further more preferably 5000 ppm, relative to the fluoropolymer.

A composition containing a fluoropolymer and a compound represented by the following formula (3) in an amount of 50 ppb or more is also one aspect of the invention.

The formula (3) is $(H-(CF_2)_8-SO_3)_qM^2$, wherein, $M^2$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and q is 1 or 2.

The amount of the compound represented by the formula (3) may be 100 ppb or more, or may be 500 ppb or more.

The invention also relates to a composition containing a fluoropolymer and a compound represented by the following formula (3) in an amount of 500 ppb or more relative to the fluoropolymer.

The formula (3) is $(H-(CF_2)_8-SO_3)_qM^2$, wherein $M^2$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and q is 1 or 2.

The fluoropolymer is preferably the same as that to be used in the production method of the invention, more preferably a fluororesin, still more preferably a fluororesin having a fluorine substitution percentage of 50% or higher, further more preferably a fluororesin having a fluorine substitution percentage of higher than 50%, still further more preferably a fluororesin having a fluorine substitution percentage of 55% or higher, much more preferably a fluororesin having a fluorine substitution percentage of 60% or higher, still much more preferably a fluororesin having a fluorine substitution percentage of 75% or higher, particularly preferably a fluororesin having a fluorine substitution percentage of 80% or higher, most preferably a fluororesin having a fluorine substitution percentage of 90 to 100%, i.e., a perfluororesin.

The perfluororesin is more preferably a fluororesin having a fluorine substitution percentage of 95 to 100%, still more preferably PTFE, FEP, or PFA, particularly preferably PTFE.

The composition of the invention contains 500 ppb or more of the compound represented by the formula (3).

The amount of the compound represented by the formula (3) may be 500 to 20000 ppb relative to the fluoropolymer. The upper limit of the amount of the compound represented by the formula (3) may be 10000 ppb. The lower limit of the amount of the compound represented by the formula (3) may be higher than 1000 ppb, or may be 1100 ppb, or may be 2000 ppb, or may be 3000 ppb. The amount of the compound represented by the formula (3) may be higher than 1000 ppb and not higher than 20000 ppb relative to the fluoropolymer.

In an embodiment of the invention, the composition may be in the form of an aqueous dispersion or may be in the form of powder. The aqueous dispersion may be a dispersion immediately after the polymerization, or may be one obtained by processing the dispersion immediately after the polymerization. For example, the aqueous dispersion may be mixed with a nonionic surfactant for improved mechanical stability and storage stability.

The aqueous dispersion is a dispersion system in which an aqueous medium serves as a dispersion medium and the fluoropolymer serves as a dispersoid. The aqueous medium may be any liquid containing water, and may contain, in addition to water, an organic solvent such as an alcohol, an ether, a ketone, or paraffin wax.

In production of the fluoropolymer using a hydrocarbon-based surfactant, the resulting aqueous dispersion may contain a compound represented by the following formula (4). In an embodiment of the invention, the composition contains such a compound in an amount within the following range.

In an embodiment of the invention, the composition contains a compound represented by the following formula (4) in an amount of 100 ppb or more relative to the fluoropolymer. The upper limit of the amount of the compound represented by the formula (4) may be, but is not limited to, 1000000 ppb, or may be 100000 ppb, or may be 20000 ppb, or may be 10000 ppb, or may be 5000 ppb. The lower limit of the amount of the compound represented by the formula (4) may be 500 ppb, or may be 1000 ppb.

The formula (4) is $(H-(CF_2)_7-COO)_pM^1$, wherein $M^1$ is H, a metal atom, $NR^{54}$, imidazolium optionally containing a substituent, pyridinium optionally containing a substituent, or phosphonium optionally containing a substituent; $R^5$s are each H or an organic group and are the same as or different from each other; and p is 1 or 2.

In the formula (3) or (4), four $R^5$s are the same as or different from each other. Each $R^5$ is preferably H or a C1-C10 organic group, more preferably H or a C1-C4 organic group.

In an embodiment of the invention, the composition may be in the form of powder. For the composition of the invention in the form of powder, the powder preferably has an average particle size of 0.5 to 2000 µm. The lower limit of the average particle size is more preferably 1 µm, more preferably 1000 µm, still more preferably 800 µm.

The average particle size as used herein for low-molecular-weight PTFE is determined as follows. That is, the particle size distribution is determined using a laser diffraction particle size distribution analyzer (available from Japan Laser Corp.) at a pressure of 0.1 MPa and a measurement time of 3 seconds without cascade impaction. The value corresponding to 50% of the cumulative volume in the resulting particle size distribution is taken as the average particle size.

For high-molecular-weight PTFE, the average particle size is determined in conformity with JIS K 6891.

The powder preferably has a tone L* of 50 or lower after the firing. The tone L* is more preferably 45 or lower, still more preferably 40 or lower, particularly preferably 35 or lower, further more preferably 30 or lower.

A sample for measurement of tone L* is prepared by molding 4.0 g of PTFE powder into a discoidal PTFE molded article having an inner diameter of 28.6 mm and a thickness of about 4 mm.

The tone L* of the powder is determined using a color difference meter (CIELAB color scale) in conformity with JIS Z 8781-4.

The firing is performed by heat treatment for 10 minutes in an electric furnace heated up to 385° C.

The composition of the invention preferably exhibits a tone change ΔL* of 70% or higher before and after the fluorination treatment. The tone change ΔL* is more preferably 80 or higher, still more preferably 90 or higher.

The tone change ΔL* is defined by the following formula:

$$\Delta L^*(\%)=(L^*_t-L^*_i)/(L^*_{Std}-L^*_i)\times 100$$

$L^*_i$ is the initial tone, and is a measured value L* in the CIELAB scale of PTFE before the fluorination treatment.

$L^*_t$ is the tone after the treatment, and is a measured value L* in the CIELAB scale of PTFE after the fluorination treatment.

$$L^*_{Std}=87.3$$

The fluorination treatment is performed such that a gas mixture (fluorine/nitrogen (ratio by volume)=20/80) obtained by diluting fluorine gas ($F_2$) as a fluorine radical source with nitrogen gas is continuously introduced into a reactor heated up to 150° C. or higher under the atmospheric pressure at a flow rate of about 50 cc/min for 480 minutes (8 hours).

In the composition of the invention, the amount of the compound represented by the formula (3) or (4) is a value determined by liquid chromatography-mass spectrometry as in the examples to be described later.

In the composition of the invention, the fluoropolymer is preferably one obtained by polymerization using a hydrocarbon-based surfactant.

The composition of the invention may contain a hydrocarbon-based surfactant. Examples of the hydrocarbon-based surfactant include the aforementioned surfactants (a) and (b).

The composition may further contain any of conventionally known additives such as pigments and fillers in addition to the fluoropolymer and the hydrocarbon-based surfactant. The additives may be used to the extent that does not inhibit the effects of the invention.

The invention also relates to a molded article containing the composition. The molded article is preferably a stretched article. Examples of the stretched article include, but are not limited to, yarns, tubes, tapes, and films (e.g., uniaxially stretched films and biaxially stretched films).

The molded article of the invention can be produced by molding the composition by a known method. Examples of the molding method include extrusion molding, injection molding, compression molding, and blow molding.

EXAMPLES

The invention is described with reference to examples, but the invention is not intended to be limited by these examples.

The parameters in the examples were determined by the following methods.

Average Primary Particle Size

A sample was diluted to a solid content of about 0.02% by mass. A calibration curve was drawn based on the transmittance of incident light at 550 nm against the unit length and the average primary particle size determined with an electron micrograph. Using this calibration curve, the average primary particle size of the sample was indirectly determined from the transmittance.

The transmittance was determined using a dynamic light scattering measurement device Microtrac 9340-UPA (available from Honeywell Inc.).

Volume Average Particle Size

The volume average particle size was determined by dynamic light scattering. A fluoropolymer aqueous dispersion with the fluoropolymer solid content being adjusted to 1.0% by mass was prepared. The volume average particle size was determined from 70 measurement processes using ELSZ-1000S (available from Otsuka Electronics Co., Ltd.) at 25° C. The refractive index of the solvent (water) was 1.3328 and the viscosity of the solvent (water) was 0.8878 mPa·s.

Number Average Particle Size

The fluoropolymer aqueous dispersion was diluted with water to a solid content of 0.15% by mass. The transmittance of incident light at 550 nm relative to the unit length of the resulting diluted latex was determined and the number-based length average particle size was determined by measuring the Feret diameter in a transmission electron microscope (TEM). Based on these values, a calibration curve was drawn. Using this calibration curve, the number average particle size of each sample was determined from the measured transmittance of incident light at 550 nm.

Melt Flow Rate (MFR)

The MFR used was the mass (g/10 min) of a polymer that flowed out of a nozzle having an inner diameter of 2 mm and a length of 8 mm per 10 minutes at 297° C. and a load of 5 kg in conformity with ASTM D3307-01 using a melt indexer (available from Toyo Seiki Seisaku-sho, Ltd.).

Solid Content

A 1-g portion of the fluoropolymer aqueous dispersion was dried at 150° C. for 60 minutes in an air dryer. The percentage of the mass of the non-volatile matter to the mass (1 g) of the aqueous dispersion was expressed by percentage, and this percentage value was used as the solid content.

Peak Temperature

For a PTFE resin that was obtained by polymerization and that had never been heated up to 300° C. or higher, a heat-of-fusion curve of the first heating at a temperature-increasing rate of 10° C./min using a differential scanning calorimeter (DSC) was drawn. The temperature corresponding to the endothermic peak in the heat-of-fusion curve is defined as the peak temperature of the PTFE resin. The temperature corresponding to the maximum value among the peak temperatures in the first temperature increase is defined as the first melting point of the PTFE resin.

Amount of Heat of Fusion

For a PTFE resin that was obtained by polymerization and that had never been heated up to 300° C. or higher, a heat-of-fusion curve was drawn at a temperature-increasing rate of 10° C./min using a differential scanning calorimeter (DSC). The amount of the heat of fusion was calculated from the area of the region defined by the straight line extending from 290° C. to 350° C. of the heat-of-fusion curve and the heat-of-fusion curve.

Standard Specific Gravity (SSG)

Using a sample molded in conformity with ASTM D4895-89, the SSG was determined by the water replacement method in conformity with ASTM D792.

Amount (N) of Nonionic Surfactant

About 1 g (X g) of a sample was put into an aluminum cup having a diameter of 5 cm and heated at 100° C. for one hour. The amount of the resulting non-volatile matter was defined as Y g. The non-volatile matter (Y g) was further heated at 300° C. for one hour. The amount of the resulting non-volatile matter was defined as Z g. The amount (N) of the nonionic surfactant was calculated from the formula: $N=((Y-Z)/Z)\times 100(\%)$.

Viscosity

The viscosity at 25° C. or 35° C. was determined using a B-type rotational viscometer (available from Tokyo Keiki Inc.) in conformity with JIS K 6893.

Amount of specific surfactant containing fluorine

The following describes the method of quantifying compounds represented by the following formulae (1) and (2).

The formula (1) is $(H-(CF_2)_m-COO)_p M^1$, wherein m is 3 to 19; $M^1$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and p is 1 or 2.

The formula (2) is $(H-(CF_2)_n-SO_3)_q M^2$, wherein n is 4 to 20; $M^2$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and q is 1 or 2.

(Method of Quantifying Compound Represented by Formula (1)) Extraction from Powder A 1-g portion of powder was mixed with 10 g (12.6 mL) of methanol and the mixture was ultrasonicated for 60 minutes. The supernatant fluid containing the compound represented by the formula (1) was extracted.

Extraction from Aqueous Dispersion

The solid content of the aqueous dispersion was measured, and the aqueous dispersion in an amount corresponding to 0.5 g of the solid PTFE was put into a 100-mL screw tube. Water and methanol was added thereto such that the extraction solvent was to be 40 g (43.14 mL) having a water/methanol ratio by vol % of 50/50 including the water originally contained in the aqueous dispersion. The system was well shaken for agglomeration. The solid was removed and the liquid phase was centrifuged at 4000 rpm for one hour. The supernatant fluid containing the compound represented by the formula (1) was extracted.

Quantification of Compound Represented by Formula (1) Contained in Extract

The amount of the compound represented by the formula (1) contained in the extract was determined in perfluorooctanoic acid equivalent.

Calibration Curve of Perfluorooctanoic Acid

Five methanol standard solutions of perfluorooctanoic acid having the respective known concentrations within 1 ng/mL to 100 ng/mL were prepared, and subjected to analysis using a liquid chromatograph-mass spectrometer (LC-MS ACQUITY UPLC/TQD, available from Waters). Using the first order approximation from the respective sample concentrations and the peak integral values, the values a and b were determined by the following equation (1):

$$A = a \times X + b \qquad (1)$$

A: peak area of perfluorooctanoic acid

X: concentration (ng/mL) of perfluorooctanoic acid.

Structure of Measurement Device and LC-MS Measurement Conditions

TABLE 1

| | LC section | |
|---|---|---|
| Device | | Acquity UPLC, Waters |
| Column | | Acquity UPLC BEH C18 1.7 mm |
| | | (2.1 × 50 min), Waters |
| Mobile phase | A | $CH_3CN$ |
| | B | 20 mM $CH_3COONH_4/H_2O$ |
| | | 0 to 1.5 min    A:B = 10:90 |
| | | 1.5 to 8.5 min    A:B = 10:90 to |
| | | A:B = 90:10 Linear gradient |
| | | 8.5 to 10 min    A:B = 90:10 |
| Flow rate | | 0.4 mL/min |
| Column temperature | | 40° C. |
| Amount of sample fed | | 5 μ |
| | MS section | |
| Device | | TQ Detector |
| Measurement mode | | MRM (Multiple Reaction Monitoring) |
| | | Electrospray ionization |
| Ionization method | | Negative mode |

MRM Measurement Parameters

TABLE 2

| Compound | Precursor | Product |
|---|---|---|
| Perfluorooctanoic acid | 413 | 369 |

Amount of C4-C20 compound represented by formula (1) Contained in Extract

Using a liquid chromatograph-mass spectrometer, a C4-C20 compound represented by the formula (1) was quantified. For the extracted liquid phase, the peak areas of the compounds represented by the formula (1) having the respective carbon numbers were determined by MRM.

MRM Measurement Parameters

TABLE 3

| Compound number | Carbon name | Precursor | Product |
|---|---|---|---|
| (H—(CF$_2$)$_3$—COO)M | 4 | 195 | 131 |
| (H—(CF$_2$)$_4$—COO)M | 5 | 245 | 181 |
| (H—(CF$_2$)$_5$—COO)M | 6 | 295 | 231 |
| (H—(CF$_2$)$_6$—COO)M | 7 | 345 | 281 |
| (H—(CF$_2$)$_7$—COO)M | 8 | 395 | 331 |
| (H—(CF$_2$)$_8$—COO)M | 9 | 445 | 381 |
| (H—(CF$_2$)$_9$—COO)M | 10 | 495 | 431 |
| (H—(CF$_2$)$_{10}$—COO)M | 11 | 545 | 481 |
| (H—(CF$_2$)$_{11}$—COO)M | 12 | 595 | 531 |
| (H—(CF$_2$)$_{12}$—COO)M | 13 | 645 | 581 |
| (H—(CF$_2$)$_{13}$—COO)M | 14 | 695 | 631 |
| (H—(CF$_2$)$_{14}$—COO)M | 15 | 745 | 681 |
| (H—(CF$_2$)$_{15}$—COO)M | 16 | 795 | 731 |
| (H—(CF$_2$)$_{16}$—COO)M | 17 | 845 | 781 |
| (H—(CF$_2$)$_{17}$—COO)M | 18 | 895 | 831 |
| (H—(CF$_2$)$_{18}$—COO)M | 19 | 945 | 881 |
| (H—(CF$_2$)$_{19}$—COO)M | 20 | 995 | 931 |

The amount of the compound represented by the formula (1) containing (m+1) carbon atoms in the extract was calculated by the following formula (3). The values a and b in the formula (3) were calculated by the formula (1).

$$XCm=((ACm-b)/a)\times((50\times m+45)/413) \tag{3}$$

XCm: amount (ng/mL) of compound represented by formula (1) containing (m+1) carbon atoms in extract solution ACm: peak area of compound represented by formula (1) containing (m+1) carbon atoms in extract solution The quantification limit in this measurement is 1 ng/mL.

Amount of Compound Represented by Formula (1) Containing (m+1) Carbon Atoms Contained in Powder The amount of the compound represented by the formula (1) containing (m+1) carbon atoms contained in the powder was determined by the following formula (4).

$$YCm=XCm\times12.6 \tag{4}$$

YCm: amount (relative to fluoropolymer) of compound represented by formula (1) containing (m+1) carbon atoms contained in powder Amount of compound represented by formula (1) containing (m+1) carbon atoms contained in aqueous dispersion The amount of the compound represented by the formula (1) containing (m+1) carbon atoms contained in the aqueous dispersion was determined by the following formula (5).

$$ZCm=XCm\times86.3 \tag{5}$$

ZCm: amount (relative to fluoropolymer) of compound represented by formula (1) containing (m+1) carbon atoms contained in aqueous dispersion (Method of Quantifying Compound Represented by Formula (2)) Extraction from Powder A 1-g portion of powder was mixed with 10 g (12.6 mL) of methanol and the mixture was ultrasonicated for 60 minutes. The supernatant fluid containing the compound represented by the formula (2) was extracted.

Extraction from Aqueous Dispersion

The solid content of the aqueous dispersion was measured, and the aqueous dispersion in an amount corresponding to 0.5 g of the solid PTFE was put into a 100-mL screw tube. Water and methanol was added thereto such that the extraction solvent was to be 40 g (43.14 mL) having a water/methanol ratio by vol % of 50/50 including the water originally contained in the aqueous dispersion. The system was well shaken for agglomeration. The solid was removed and the liquid phase was centrifuged at 4000 rpm for one hour. The supernatant fluid containing the compound represented by the formula (2) was extracted.

Quantification of Compound Represented by Formula (2) Contained in Extract

The amount of the compound represented by the formula (2) contained in the extract was determined in perfluorooctanesulfonic acid equivalent.

Calibration Curve of Perfluorooctanesulfonic Acid

Five methanol standard solutions of perfluorooctanesulfonic acid having the respective known concentrations within 1 ng/mL to 100 ng/mL were prepared, and subjected to analysis using a liquid chromatograph-mass spectrometer (LC-MS ACQUITY UPLC/TQD, available from Waters). Using the first order approximation from the respective sample concentrations and the peak integral values, the values a and b were determined by the following equation (1):

$$A=a\times X+b \tag{1}$$

A: peak area of perfluorooctanesulfonic acid

X: concentration (ng/mL) of perfluorooctanesulfonic acid.

Structure of Measurement Device and LC-MS Measurement Conditions

TABLE 4

| LC section | | |
|---|---|---|
| Device | | Acquity UPLC, Waters |
| Column | | Acquity UPLC BEH C18 1.7 mm |
| | | (2.1 × 50 min), Waters |
| Mobile phase | A | CH$_3$CN |
| | B | 20 mM CH$_3$COONH$_4$/H$_2$O |
| | | 0 to 1.5 min  A:B = 10:90 |
| | | 1.5 to 8.5 min A:B = 10:90 to A:B = 90:10 |
| | | Linear gradient |
| | | 8.5 to 10 min  A:B = 90:10 |
| Flow rate | | 0.4 mL/min |
| Column temperature | | 40° |
| Amount of sample fed | | 5 µL |
| MS section | | |
| Device | | TQ Detecter |
| Measurement mode | | MRM (Multiple Reaction Monitoring) |
| | | Electrospray ionization |
| Ionization method | | Negative mode |

MRM Measurement Parameters

TABLE 5

| Compound | Precursor | Product |
|---|---|---|
| Perfluorooctanesulfonic acid | 499 | 99 |

Amount of C4-C20 Compound Represented by Formula 2 Contained in Extract

Using a liquid chromatograph-mass spectrometer, a C4-C20 compound represented by the formula (2) was quantified. For the extracted liquid phase, the peak areas of the compounds represented by the formula (2) having the respective carbon numbers were determined by MRM.

MRM measurement parameters

TABLE 6

| Compound | Carbon number | Precursor | Product |
|---|---|---|---|
| (H—(CF$_2$)$_4$—SO$_3$)M | 4 | 281 | 99 |
| (H—(CF$_2$)$_5$—SO$_3$)M | 5 | 331 | 99 |
| (H—(CF$_2$)$_6$—SO$_3$)M | 6 | 381 | 99 |
| (H—(CF$_2$)$_7$—SO$_3$)M | 7 | 431 | 99 |
| (H—(CF$_2$)$_8$—SO$_3$)M | 8 | 481 | 99 |
| (H—(CF$_2$)$_9$—SO$_3$)M | 9 | 531 | 99 |
| (H—(CF$_2$)$_{10}$—SO$_3$)M | 10 | 581 | 99 |
| (H—(CF$_2$)$_{11}$—SO$_3$)M | 11 | 631 | 99 |
| (H—(CF$_2$)$_{12}$—SO$_3$)M | 12 | 681 | 99 |
| (H—(CF$_2$)$_{13}$—SO$_3$)M | 13 | 731 | 99 |
| (H—(CF$_2$)$_{14}$—SO$_3$)M | 14 | 781 | 99 |
| (H—(CF$_2$)$_{15}$—SO$_3$)M | 15 | 831 | 99 |
| (H—(CF$_2$)$_{16}$—SO$_3$)M | 16 | 881 | 99 |
| (H—(CF$_2$)$_{17}$—SO$_3$)M | 17 | 931 | 99 |
| (H—(CF$_2$)$_{18}$—SO$_3$)M | 18 | 981 | 99 |
| (H—(CF$_2$)$_{19}$—SO$_3$)M | 19 | 1031 | 99 |
| (H—(CF$_2$)$_{20}$—SO$_3$)M | 20 | 1081 | 99 |

The amount of the compound represented by the formula (2) containing n carbon atoms in the extract was calculated by the following formula (3). The values a and b in the formula (3) were calculated by the formula (1).

$$XSn = ((ASn-b)/a) \times ((50 \times n + 81)/499) \quad (3)$$

XSn: amount (ng/mL) of compound represented by formula (2) containing n carbon atoms in extract solution ASn: peak area of compound represented by formula (2) containing n carbon atoms in extract solution The quantification limit in this measurement is 1 ng/mL.
Amount of Compound Represented by Formula (2) Containing n Carbon Atoms Contained in Powder The amount of the compound represented by the formula (2) containing n carbon atoms contained in the powder was determined by the following formula (4).

$$YSn = XSn \times 12.6 \quad (4)$$

YSn: amount (relative to fluoropolymer) of compound represented by formula (2) containing n carbon atoms contained in powder Amount of Compound Represented by the Formula (2) Containing n Carbon Atoms Contained in Aqueous Dispersion The amount of the compound represented by the formula (2) containing n carbon atoms contained in the aqueous dispersion was determined by the following formula (5).

$$ZSn = XSn \times 86.3 \quad (5)$$

ZSn: amount (relative to fluoropolymer) of compound represented by formula (2) containing n carbon atoms contained in aqueous dispersion Synthesis Example 1

A mixture of lithium (2.0 g), chlorodimethylphenylsilane (8.4 g), and tetrahydrofuran (120 mL) was stirred at room temperature for six hours. The reaction solution was mixed with 4-(tert-butyldimethylsiloxy)-1-morpholinobutan-1-one (10 g), and the mixture was stirred at −78° C. for two hours. The reaction solution was mixed with a saturated ammonium chloride aqueous solution (300 mL), and the mixture was extracted with ethyl acetate. The extract was dried over sodium sulfate and the solvent was evaporated under reduced pressure. The residue was purified by silica gel column chromatography, whereby 4-(tert-butyldimethylsiloxy)-1-(dimethyl(phenyl)silyl)butan-1-one (6.4 g) was obtained.

$^1$H-NMR (CDCl$_3$) δ ppm: −0.01 (s, 6H), 0.49 (s, 6H), 0.85 (s, 9H), 1.61-1.71 (m, 2H), 2.66 (J=7.0, t, 2H), 3.51 (J=6.2, t, 2H), 7.38-7.40 (m, 3H), 7.53-7.57 (m, 2H)

A mixture of 4-(tert-butyldimethylsiloxy)-1-(dimethyl (phenyl)silyl)butan-1-one (6.4 g), 1-octene-3-one (2.41 g), 3-ethyl-5-(2-hydroxyethyl)-4-methylthiazolium bromide (1.42 g), 1,8-diazabicyclo(5.4.0)-7-undecene (0.86 g), isopropanol (3.17 g), and tetrahydrofuran (11.5 mL) was stirred at 75° C. for eight hours. The solvent in the reaction solution was evaporated under reduced pressure and the residue was purified by silica gel column chromatography, whereby 1-tert-butyldimethylsiloxydodecane-4,7-dione (4.0 g) was obtained.

$^1$H-NMR (CDCl$_3$) δ ppm: 0.02 (s, 6H), 0.88 (s, 12H), 1.22-1.31 (m, 4H), 1.51-1.59 (m, 2H), 1.72-1.83 (m, 2H), 2.43 (J=7.6, t, 2H), 2.55 (J=7.6, t, 2H), 2.67 (s, 4H), 3.59 (J=5.9, t, 2H)

A mixture of 1-tert-butyldimethylsiloxydodecane-4,7-dione (1.9 g), a 1 M solution (15 mL) of tetrabutyl ammonium fluoride in tetrahydrofuran, and tetrahydrofuran (17.5 mL) was stirred at 0° C. for two hours. The reaction solution was mixed with a saturated ammonium chloride solution (100 mL) and the mixture was extracted with ethyl acetate. The extract was dried over sodium sulfate, and the solvent was evaporated under reduced pressure. The residue was purified by silica gel column chromatography, whereby 1-hydroxy dodecane-4,7-dione (2.0 g) was obtained.

$^1$H-NMR (CDCl$_3$) δ ppm: 0.89 (s, 3H), 1.24-1.33 (m, 4H), 1.52-1.58 (m, 2H), 1.81-1.90 (m, 2H), 2.45 (J=7.6, t, 2H), 2.63 (J=7.0, t, 2H), 2.76 (s, 4H), 3.65 (J=5.9, t, 2H)

A mixture of 1-hydroxydodecane-4,7-dione (1.9 g), chlorosulfonic acid (1.3 g), triethylamine (1.79 g), and diethyl ether (30 mL) was stirred at room temperature for two hours. The reaction solution was mixed with 10 mL of a 10% sodium hydrogen carbonate aqueous solution. The aqueous phase was washed with ethyl acetate and the solvent was evaporated under reduced pressure. The resulting residue was dissolved in 20 mL of deionized water. The solution was mixed with 100 mL of acetone and the precipitate was removed. The solvent in the filtrate was evaporated under reduced pressure and the residue was extracted with methanol. The solvent in the extract solution was evaporated under reduced pressure, whereby sodium 4,7-dioxododecyl sulfate (2.4 g) was obtained.

$^1$H-NMR (D$_2$O) δ ppm: 0.67 (J=6.8, t, 3H), 1.04-1.14 (m, 4H), 1.31-1.42 (m, 2H), 1.72-1.79 (m, 2H), 2.36 (J=7.3, t, 2H), 2.54 (J=7.3, t, 2H), 2.62 (s, 4H), 3.86 (J=6.2, t, 2H)

Then, 2.04 g of sodium 4,7-dioxododecyl sulfate (hereinafter, referred to as a surfactant A) was dissolved in 240 mL of pure water, whereby a solution of the surfactant A having a concentration of 26.9 mmol/L was obtained.

Example 1

A 6.0-L-capacity stainless steel autoclave was charged with 3200 g of deionized water and 0.1 g of Pluronic 31R[1] (available from BASF Corp.). The system was sufficiently purged with nitrogen gas and the pressure therein was reduced. Under reduced pressure, 88 g of a TFE/VdF monomer mixture having a ratio of 60/40 (mol %) was put into the system and the temperature was increased up to 80° C. under stirring. An aqueous solution of ammonium persulfate (APS) dissolved in pure water at a concentration of 27.1×10$^{-3}$ mol/L was fed through a plunger pump at a flow rate of 7.5 g/min for two minutes, whereby polymerization was initiated. Thereafter, the flow rate through the plunger pump was maintained at 0.25 g/min. In order to control the polymerization pressure to 0.90 MPa and compensate for a pressure drop during the polymerization, the TFE/VdF monomer mixture having a ratio of 60/40 (mol %) was continually fed, and the polymerization was performed under stirring. When the amount of the monomers fed reached 175 g, a solution of the surfactant A dissolved in pure water at a concentration of 26.9 mmol/L was fed through the plunger pump at a flow rate of 0.58 g/min. This feeding was continued until the polymerization completion. At the same time, the concentration of the ammonium persulfate (APS) aqueous solution was changed to $13.6 \times 10^{-2}$ mol/L, and the feeding thereof through the plunger pump was continued at a flow rate of 7.5 g/min until the polymerization completion.

Before the polymerization completion, 600 g of the monomers were fed into the container. The stirring was stopped, the air was fed into the autoclave up to the atmospheric pressure, and the fluoropolymer dispersion was collected. Thereby, 4.28 kg of a fluoropolymer dispersion containing particles having an average primary particle size of 129 nm was obtained. The polymerization duration was 8 hours and 49 minutes, and the solid content was 14.4% by mass. The dispersoid in the dispersion was agglomerated in an aluminum sulfate solution and the agglomerates were dried at 130° C. for 12 hours, whereby a dried fluoropolymer was obtained. The MFR (297° C., 5 kgf) was measured to be 11.2 g/10 min.

The composition of the resulting fluoropolymer was determined by NMR, and the TFE/VdF ratio by mole was 60/40. The composition was determined by $^{19}$F-NMR using a nuclear magnetic resonance device at a measurement temperature of (melting point of polymer+20) ° C.

Comparative Example 1

A 6.0-L-capacity stainless steel autoclave was charged with 3200 g of deionized water and 0.1 g of Pluronic 31R[1] (available from BASF Corp.). The system was sufficiently purged with nitrogen gas and the pressure therein was reduced. Under reduced pressure, 89 g of a TFE/VdF monomer mixture having a ratio of 60/40 (mol %) was put into the system and the temperature was increased up to 80° C. under stirring. An aqueous solution of ammonium persulfate (APS) dissolved in pure water at a concentration of $27.1 \times 10^{-3}$ mol/L was fed through a plunger pump at a flow rate of 7.5 g/min for two minutes, whereby polymerization was initiated. Thereafter, the flow rate through the plunger pump was maintained at 0.25 g/min. In order to control the polymerization pressure to 0.90 MPa and compensate for a pressure drop during the polymerization, the TFE/VdF monomer mixture having a ratio of 60/40 (mol %) was continually fed, and the polymerization was performed under stirring. When the amount of the monomers fed reached 175 g, a solution of sodium dodecylsulfate dissolved in pure water at a concentration of 26.9 mmol/L was fed through the plunger pump at a flow rate of 0.58 g/min. This feeding was continued until the polymerization completion. At the same time, the concentration of the ammonium persulfate (APS) aqueous solution was changed to $13.6 \times 10^{-2}$ mol/L, and the feeding thereof through the plunger pump was continued at a flow rate of 7.5 g/min until the polymerization completion.

Before the polymerization completion, 600 g of the monomers were fed into the container. The stirring was stopped, the air was fed into the autoclave up to the atmospheric pressure, and the fluoropolymer dispersion was collected. Whereby, 4.26 kg of a fluoropolymer dispersion containing particles having an average primary particle size of 130 nm was obtained. The polymerization duration was 8 hours and 38 minutes, and the solid content was 13.1% by mass. The solid content attached to a stirring blade in the polymerization tank was 1.3% by mass. The dispersoid in the dispersion was agglomerated in an aluminum sulfate solution and the agglomerates were dried at 130° C. for 12 hours, whereby a dried fluoropolymer was obtained. The MFR (297° C., 5 kgf) was measured to be 52.8 g/10 min.

Example 2

A 2-mL portion of the fluoropolymer dispersion obtained in Example 1 was mixed with 30 mL of methanol, and the mixture was extracted for three hours under ultrasonic vibrations. The surfactant A was dissolved in methanol to prepare standard solutions having a concentration of 0.1, 1, 10, 100, or 1000 ppm. A calibration curve was drawn by HPLC, and then the surfactant contained in the extract was quantified. The amount of the surfactant was 205.8 ppm relative to water and 1400 ppm relative to the fluoropolymer.

Synthesis Example 2

A mixture of 10-undecen-1-ol (16 g), 1,4-benzoquinone (10.2 g), DMF (160 mL), water (16 mL), and $PdCl_2$ (0.34 g) was heated and stirred at 90° C. for 12 hours.

The solvent was then evaporated under reduced pressure. The resulting residue was subjected to liquid separation and purified by column chromatography, whereby 11-hydroxyundecan-2-one (15.4 g) was obtained.

The spectrum data of the resulting 11-hydroxyundecan-2-one are the following.

$^1$H-NMR (CDCl$_3$) δ ppm: 1.29-1.49 (m, 14H), 2.08 (s, 3H), 2.45 (J=7.6, t, 2H), 3.51 (J=6.5, t, 2H)

A mixture of 11-hydroxyundecan-2-one (13 g), sulfur trioxide triethylamine complex (13.9 g), and tetrahydrofuran (140 mL) was stirred at 50° C. for 12 hours. A solution of sodium methoxide (3.8 g) in methanol (12 mL) was dropwise added to the reaction solution.

The solid precipitate was filtered under reduced pressure and the residue was washed with ethyl acetate, whereby sodium 10-oxounedecyl sulfate (15.5 g) (hereinafter, referred to as a surfactant B) was obtained. The spectrum data of the resulting sodium 10-oxounedecyl sulfate are the following.

$^1$H-NMR (CDCl$_3$) δ ppm: 1.08 (J=6.8, m, 10H), 1.32 (m, 2H), 1.45 (m, 2H), 1.98 (s, 3H), 2.33 (J=7.6, t, 2H), 3.83 (J=6.5, t, 2H)

Synthesis Example 3

Divinyl ketone (7.4 g), 2-methylfuran (8.0 g), acetic acid (6 mL), and water (60 mL) were stirred at 40° C. for four hours. The reaction solution was added to a saturated sodium hydrogen carbonate solution and the mixture was extracted with ethyl acetate. The extract was dried over sodium sulfate, and the solvent was evaporated under reduced pressure. The residue was purified by silica gel column chromatography, whereby 1-(5-methyl-2-furanyl)-3-buten-2-one (7.4 g) was obtained.

$^1$H-NMR (CDCl$_3$) δ ppm: 5.88 (dd, J=17.4, 10.6, 2H), 6.32 (dd, J=17.4, 1.3, 2H), 5.88 (dd, J=10.6, 1.3, 2H)

A mixture of 1-(5-methyl-2-furanyl)-3-buten-2-one (1.7 g), 4-(tert-butyldimethylsiloxy)-1-(dimethyl(phenyl)silyl) butan-1-one (4.8 g), 3-ethyl-5-(2-hydroxyethyl)-4-methyl-thiazolium bromide (1.42 g), 1,8-diazabicyclo(5.4.0)-7-undecene (0.66 g), isopropanol (3.4 g), and tetrahydrofuran (11.5 mL) was stirred at 75° C. for eight hours. The solvent in the reaction solution was evaporated under reduced pressure and the residue was purified by silica gel column chromatography, whereby 8-((tert-butyldimethylsilyl)oxy)-1-(5-methylfuran-2-yl)octane-2,5-dione (1.9 g) was obtained.

A mixture of 8-((tert-butyldimethylsilyl)oxy)-1-(5-methylfuran-2-yl)octane-2,5-dione (1.9 g), a 1 M solution (7 mL) of tetrabutyl ammonium fluoride in tetrahydrofuran, and tetrahydrofuran (5 mL) was stirred at 0° C. for two hours. The reaction solution was mixed with a saturated ammonium chloride solution (100 mL) and the mixture was extracted with ethyl acetate. The extract was dried over sodium sulfate and the solvent was evaporated under reduced pressure. The residue was purified by silica gel column chromatography, whereby 8-hydroxy-1-(5-methylfuran-2-yl)octane-2,5-dione (1.0 g) was obtained.

A mixture of 8-hydroxy-1-(5-methylfuran-2-yl)octane-2,5-dione (1.0 g), chlorosulfonic acid (0.5 g), triethylamine (0.8 g), and diethyl ether (10 mL) was stirred at room temperature for two hours. The reaction solution was mixed with 10 mL of a 10% sodium hydrogen carbonate aqueous solution. The aqueous phase was washed with ethyl acetate and the solvent was evaporated under reduced pressure. The resulting residue was dissolved in 20 mL of deionized water. The solution was mixed with 100 mL of acetone and the precipitate was removed. The solvent in the filtrate was evaporated under reduced pressure and the residue was extracted with methanol. The solvent in the extract solution was evaporated under reduced pressure, whereby sodium 9-(5-methylfuran-2-yl)-4,7-dioxononyl sulfate (0.8 g) was obtained.

A mixture of sodium 9-(5-methylfuran-2-yl)-4,7-dioxononyl sulfate (0.8 g) and 1 M hydrochloric acid (3 mL) was stirred at 100° C. for one hour. The reaction solution was mixed and neutralized with a NaOH aqueous solution (0.2 M), and the mixture was concentrated. The concentrate was purified by reprecipitation with acetone/water, whereby sodium 4,7,10,13-tetraoxotetradecyl sulfate (0.75 g) (hereinafter, referred to as a surfactant C) was obtained.

Example 3

A 1-L-capacity glass autoclave was charged with 550 g of deionized degassed water, 30 g of paraffin wax, and 0.0192 g of the surfactant B. The reactor was sealed and the system was purged with nitrogen, so that oxygen was removed. The reactor was heated up to 70° C. and TFE was filled into the reactor such that the reactor was adjusted to 0.78 MPa. Then, 0.011 g of ammonium persulfate (APS) serving as a polymerization initiator was put thereinto. TFE was fed so as to standardize the reaction pressure to 0.78 MPa. When 50 g in total of TFE was fed, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had a volume average particle size of 177 nm. The solid content in the resulting PTFE aqueous dispersion was 8.2% by mass.

The resulting PTFE aqueous dispersion was dried at 150° C. for 18 hours.

The resulting PTFE resin was subjected to DSC analysis. The peak temperature at the first temperature increase was observed at 344° C. The amount of the heat of fusion at this time was 75 J/g. The SSG was 2.177. This demonstrates that the resulting PTFE was a high-molecular-weight PTFE.

A 2-mL portion of the resulting PTFE aqueous dispersion was mixed with 30 mL (23.8 g) of methanol, and the mixture was extracted for three hours under ultrasonic vibrations. The surfactant B was dissolved in methanol to prepare standard solutions having a concentration of 0.1, 1, 10, 100, or 1000 ppm. A calibration curve was drawn by HPLC, and then the surfactant contained in the extract was quantified. The amount of the surfactant was 32 ppm relative to the PTFE aqueous dispersion.

The resulting PTFE aqueous dispersion was vigorously stirred and agglomerated until solidification. The resulting agglomerate was washed with deionized water and the agglomerate after the washing was dried at 150° C. for 18 hours, whereby PTFE powder was obtained.

A 1-g portion of the resulting PTFE powder was mixed with 10 mL (7.9 g) of methanol, and the mixture was extracted for one hour under ultrasonic vibrations. The surfactant B was dissolved in methanol to prepare standard solutions having a concentration of 0.1, 1, 10, 100, or 1000 ppm. A calibration curve was drawn by HPLC, and then the surfactant contained in the extract was quantified. The amount of the surfactant was 15 ppb relative to PTFE.

Example 4

A 1-L-capacity glass autoclave was charged with 550 g of deionized degassed water, 30 g of paraffin wax, and 0.0192 g of the surfactant B. The reactor was sealed and the system was purged with nitrogen, so that oxygen was removed. The reactor was heated up to 85° C. and TFE was filled into the reactor such that the reactor was adjusted to 0.78 MPa. Then, 0.0022 g of ammonium persulfate (APS) and 0.110 g of disuccinic acid peroxide (DSP) serving as polymerization initiators were put thereinto. TFE was fed so as to standardize the reaction pressure to 0.78 MPa. When 50 g in total of TFE was fed, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had a volume average particle size of 189 nm. The solid content in the resulting PTFE aqueous dispersion was 8.2% by mass.

The resulting PTFE aqueous dispersion was dried at 150° C. for 18 hours.

The resulting PTFE resin was subjected to DSC analysis. The peak temperatures at the first temperature increase were observed at 339° C. and 343° C. The amount of the heat of fusion at this time was 76 J/g. SSG was 2.173. This demonstrates that the resulting PTFE was a high-molecular-weight PTFE.

A 2-mL portion of the resulting PTFE aqueous dispersion was mixed with 30 mL (23.8 g) of methanol, and the mixture was extracted for three hours under ultrasonic vibrations. The surfactant B was dissolved in methanol to prepare standard solutions having a concentration of 0.1, 1, 10, 100, or 1000 ppm. A calibration curve was drawn by HPLC, and then the surfactant contained in the extract was quantified. The amount of the surfactant was 31 ppm relative to the PTFE aqueous dispersion.

Example 5

A 6-L-capacity stainless steel autoclave was charged with 3500 g of deionized degassed water, 100 g of paraffin wax, and 0.122 g of the surfactant B. The reactor was sealed and the system was purged with nitrogen, so that oxygen was removed. The reactor was heated up to 70° C. and TFE was filled into the reactor such that the reactor was adjusted to 0.78 MPa. Then, 0.070 g of ammonium persulfate (APS) serving as a polymerization initiator was put thereinto. TFE was fed so as to standardize the reaction pressure to 0.78 MPa. The surfactant B was fed 9 times, in a total amount of 1.10 g, during the reaction. When 425 g in total of TFE was fed, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had a volume average particle size of 178 nm. The solid content in the resulting PTFE aqueous dispersion was 10.7% by mass.

The resulting PTFE aqueous dispersion was dried at 150° C. for 18 hours.

The resulting PTFE resin had a SSG of 2.175. This demonstrates that the resulting PTFE was a high-molecular-weight PTFE.

The resulting PTFE aqueous dispersion was mixed with polyoxyethylene tridecyl ether (HLB=13.3) serving as a nonionic surfactant such that the nonionic surfactant had a concentration of 100 parts by mass relative to 100 parts by mass of the PTFE. Ammonia water was used to control the pH to 10, and the mixture was left to stand at 64° C. for 14 hours, whereby cloud point concentration was performed. The supernatant fluid was removed, whereby a concentrated liquid was obtained.

The resulting concentrated liquid was mixed with a nonionic surfactant and water such that the solid content was 60.0% by mass and the nonionic surfactant had a concentration (N) of 6.5% by mass.

The resulting PTFE concentrated liquid had a viscosity of 46 mPa·s at 25° C.

The resulting PTFE aqueous dispersion was mixed with polyoxyethylene tridecyl ether (HLB=13.3) serving as a nonionic surfactant such that the nonionic surfactant had a concentration of 100 parts by mass relative to 100 parts by mass of the solid PTFE. Ammonia water was used to control the pH to 10, and the mixture was left to stand at 64° C. for 14 hours, whereby cloud point concentration was performed. The supernatant fluid was removed, whereby a PTFE concentrated liquid A was obtained.

The resulting PTFE concentrated liquid A was mixed with the nonionic surfactant and water such that the solid content was 60.0% by mass and the nonionic surfactant had a concentration (N) of 6.5% by mass. Thereby, a PTFE concentrated liquid B was obtained.

The resulting PTFE concentrated liquid B had a viscosity of 46 mPa-s at 25° C.

Example 6

The concentrated liquid A obtained in Example 5 was mixed with the nonionic surfactant, water, and ammonium lauryl sulfate (1000 ppm relative to solid PTFE) serving as a viscosity modifier such that the solid content was 60.0% by mass and the nonionic surfactant had a concentration (N) of 6.5% by mass. Thereby, a PTFE concentrated liquid C was obtained. The resulting PTFE concentrated liquid C had a viscosity of 25 mPa-s at 25° C. and a viscosity of 25 mPa-s at 35° C.

Example 7

The PTFE aqueous dispersion obtained in Example 5 was mixed with deionized water such that the specific gravity (25° C.) was adjusted to 1.080. A coagulation tank equipped with a stirring blade and a baffle was charged with the PTFE aqueous dispersion with the controlled specific gravity, and the temperature was controlled such that the internal temperature was 34° C. The control was immediately followed by addition of nitric acid, simultaneously with initiation of stirring. After the stirring was initiated, the aqueous dispersion was confirmed to turn into the slurry form and formation of wet PTFE powder therein was confirmed. Then, stirring was continued.

The wet PTFE powder was filtered out. The wet PTFE powder and 2.5 L of deionized water were put into the coagulation tank, and the polymer powder was washed. The washing was followed by filtration of the wet PTFE powder. The wet PTFE powder was left to stand in a 150° C. hot-air circulation dryer for 18 hours, whereby PTFE powder was obtained.

The compounds represented by the formula (1) or (2) contained in the PTFE aqueous dispersion obtained by the polymerization in Example 5 were quantified. The results are shown in Table 7.

TABLE 7

| Compound represented by formula (1) $(H—(CF_2)_m—COO)_pM^1$ | |
|---|---|
| m | ppb (relative to polymer) |
| m = 3 | 9.6E+03 |
| m = 5 | 1.7E+04 |
| m = 7 | 4.7E+04 |
| m = 9 | 2.6E+04 |
| m = 11 | 6.2E+03 |
| m = 13 | 5.7E+03 |
| m = 15 | 7.4E+03 |
| m = 17 | 6.6E+03 |
| m = 19 | 5.3E+03 |
| Sum | 1.3E+05 |
| Compound represented by formula (2) $(H—(CF_2)_n—SO_3)_qM^2$ | |
| n | ppb (relative to polymer) |
| n = 4 | Quantification limit or less |
| n = 6 | 5.5E+02 |
| n = 8 | 6.5E+02 |
| n = 10 | 5.2E+02 |
| n = 12 | 2.5E+02 |
| n = 14 | 1.0E+02 |
| n = 16 | Quantification limit or less |
| n = 18 | Quantification limit or less |
| n = 20 | Quantification limit or less |
| Sum | 2.1E+03 |

* Aqueous dispersion obtained by polymerization was analyzed.

The peaks at which n is 5, 7, 9, 11, 13, 15, 17, or 19 and m is 4, 6, 8, 10, 12, 14, 16, or 18 were equal to or below the quantification limit.

The quantification limit is 86 ppb for aqueous dispersion.

The compounds represented by the formula (1) or (2) contained in the PTFE powder obtained in Example 7 were quantified. The results are shown in Table 8.

TABLE 8

| Compound represented by formula (1) $(H—(CF_2)_m—COO)_pM^1$ | |
|---|---|
| m | ppb (relative to polymer) |
| m = 3 | Quantification limit or less |
| m = 5 | Quantification limit or less |
| m = 7 | Quantification limit or less |
| m = 9 | 3.6E+02 |
| m = 11 | 1.6E+03 |

TABLE 8-continued

| m | |
|---|---|
| m = 13 | 2.0E+03 |
| m = 15 | 3.5E+03 |
| m = 17 | 5.0E+03 |
| m = 19 | 1.3E+03 |
| Sum | 1.4E+04 |
| Compound represented by formula (2) $(H-(CF_2)_n-SO_3)_qM^2$ | |
| n | ppb (relative to polymer) |
| n = 4 | 3.8E+01 |
| n = 6 | 5.3E+02 |
| n = 8 | 6.5E+02 |
| n = 10 | 4.9E+02 |
| n = 12 | 2.2E+02 |
| n = 14 | 9.5E+01 |
| n = 16 | Quantification limit or less |
| n = 18 | Quantification limit or less |
| n = 20 | Quantification limit or less |
| Sum | 2.0E+03 |

* Powder obtained by agglomeration after polymerization was analyzed.

The peaks at which n is 5, 7, 9, 11, 13, 15, 17, or 19 and m is 4, 6, 8, 10, 12, 14, 16, or 18 were equal to or below the quantification limit.

The quantification limit is 13 ppb for powder.

Example 8

A 6-L-capacity stainless steel autoclave was charged with 3600 g of deionized degassed water, 180 g of paraffin wax, and 0.540 g of the surfactant B. The reactor was sealed and the system was purged with nitrogen, so that oxygen was removed. The reactor was heated up to 70° C. and TFE was filled into the reactor such that the reactor was adjusted to 2.76 MPa. Then, 0.620 g of ammonium persulfate (APS) and 1.488 g of disuccinic acid peroxide (DSP) serving as polymerization initiators were put thereinto. TFE was fed so as to standardize the reaction pressure to 2.76 MPa. When 330 g in total of TFE was fed, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had a volume average particle size of 136 nm. The solid content in the resulting PTFE aqueous dispersion was 8.4% by mass.

The resulting PTFE aqueous dispersion was vigorously stirred and agglomerated until solidification. The resulting agglomerate was dried at 150° C. for 18 hours, whereby PTFE powder was obtained.

The resulting PTFE powder was subjected to DSC analysis. The peak temperature at the first temperature increase was observed at 336° C.

The resulting PTFE powder had a SSG of 2.211.

The compounds represented by the formula (1) or (2) contained in the PTFE powder obtained in Example 8 were quantified. The results are shown in Table 9.

TABLE 9

| Compound represented by formula (1) $(H-(CF_2)_m-COO)_pM^1$ | |
|---|---|
| m | ppb (relative to polymer) |
| m = 3 | Quantification limit or less |
| m = 5 | 1.6E+02 |
| m = 7 | 8.0E+01 |
| m = 9 | 1.0E+03 |
| m = 11 | 2.6E+03 |
| m = 13 | 3.8E+03 |

TABLE 9-continued

| m | |
|---|---|
| m = 15 | 7.9E+03 |
| m = 17 | 5.8E+03 |
| m = 19 | Quantification limit or less |
| Sum | 2.1E+04 |
| Compound represented by formula (2) $(H-(CF_2)_n-SO_3)_qM^2$ | |
| n | ppb (relative to polymer) |
| n = 4 | Quantification limit or less |
| n = 6 | 5.7E+02 |
| n = 8 | 1.1E+03 |
| n = 10 | 6.3E+02 |
| n = 12 | 2.6E+02 |
| n = 14 | 8.6E+01 |
| n = 16 | Quantification limit or less |
| n = 18 | Quantification limit or less |
| n = 20 | Quantification limit or less |
| Sum | 2.7E+03 |

* Powder obtained by agglomeration after polymerization was analyzed.

The peaks at which n is 5, 7, 9, 11, 13, 15, 17, or 19 and m is 4, 6, 8, 10, 12, 14, 16, or 18 were equal to or below the quantification limit.

The quantification limit is 13 ppb.

Example 9

A 6-L-capacity stainless steel autoclave was charged with 3600 g of deionized degassed water, 180 g of paraffin wax, and 0.540 g of the surfactant B. The reactor was sealed and the system was purged with nitrogen, so that oxygen was removed. The reactor was heated up to 70° C. and TFE was filled into the reactor such that the reactor was adjusted to 2.76 MPa. Then, 0.50 g of oxalic acid serving as a polymerization initiator was put thereinto, and continual feeding of an aqueous solution of potassium permanganate was initiated. TFE was fed so as to standardize the reaction pressure to 2.76 MPa. The aqueous solution of permanganic acid was continually fed until the solid content of potassium permanganate reached 0.23 g. When 330 g in total of TFE was fed, the stirring was stopped and the pressure was released until the reactor was adjusted to the atmospheric pressure. The aqueous dispersion was collected from the reactor and cooled so that the paraffin wax was separated. The particles contained in the resulting PTFE aqueous dispersion had a volume average particle size of 114 nm. The solid content in the resulting PTFE aqueous dispersion was 8.4% by mass.

The resulting PTFE aqueous dispersion was vigorously stirred and agglomerated until solidification. The resulting agglomerate was dried at 150° C. for 18 hours, whereby PTFE powder was obtained.

The resulting PTFE powder was subjected to DSC analysis. The peak temperature at the first temperature increase was observed at 335° C.

The resulting PTFE powder had a SSG of 2.233.

The compounds represented by the formula (1) or (2) contained in the PTFE powder obtained in Example 9 were quantified. The results are shown in Table 10.

TABLE 10

| Compound represented by formula (1) $(H-(CF_2)_m-COO)_pM^1$ | |
|---|---|
| m | ppb (relative to polymer) |
| m = 4 | Quantification limit or less |
| m = 6 | 2.7E+02 |
| m = 8 | 8.5E+02 |
| m = 10 | 2.1E+03 |

TABLE 10-continued

| m | ppb (relative to polymer) |
|---|---|
| m = 12 | 3.2E+03 |
| m = 14 | 1.4E+03 |
| m = 16 | 4.2E+02 |
| m = 18 | 1.9E+03 |
| Sum | 1.0E+04 |

Compound represented by formula (2)
$(H-(CF_2)_n-SO_3)_qM^2$

| n | ppb (relative to polymer) |
|---|---|
| n = 4 | 3.5E+01 |
| n = 6 | 1.9E+03 |
| n = 8 | 3.3E+03 |
| n = 10 | 2.5E+03 |
| n = 12 | 7.6E+02 |
| n = 14 | 1.2E+02 |
| n = 16 | Quantification limit or less |
| n = 18 | Quantification limit or less |
| n = 20 | Quantification limit or less |
| Sum | 8.7E+03 |

* Powder obtained by agglomeration after polymerization was analyzed.

The peaks at which n is 5, 7, 9, 11, 13, 15, 17, or 19 and m is 3, 5, 7, 9, 11, 13, 15, 17, or 19 were equal to or below the quantification limit.

The quantification limit is 13 ppb.

Example 10

The solid content of the PTFE aqueous dispersion obtained in Example 5 was measured, and the aqueous dispersion in an amount corresponding to 2.5 g of the solid PTFE was put into a 100-mL screw tube. Water and methanol was added thereto such that the extraction solvent was to be 40 g (43.14 mL) having a water/methanol ratio by vol % of 50/50 including the water originally contained in the aqueous dispersion. The system was well shaken for agglomeration. The solid was removed and the liquid phase was centrifuged at 4000 rpm for one hour. The supernatant fluid B containing the compound represented by the formula (2) was extracted.

The supernatant fluid B was quantified by the method for quantifying the compound represented by the formula (2) as described above. The results are shown in Table 11. The quantification limit is 17.2 ppb.

Example 11

A 10-g portion of the PTFE powder obtained in Example 8 was mixed with 10 g (12.6 mL) of methanol, and the mixture was ultrasonicated for 60 minutes. The supernatant fluid C containing the compound represented by the formula (2) was extracted.

The supernatant fluid C was quantified by the method for quantifying the compound represented by the formula (2) as described above. The results are shown in Table 11. The quantification limit is 1.3 ppb.

TABLE 11

| | Example 10 | Example 11 |
|---|---|---|
| | PTFE aqueous dispersion obtained in Example 5 | PTFE powder obtained in Example 8 |
| n | ppb (relative to polymer) | ppb (relative to polymer) |
| n = 4 | 4.5E+01 | 8.0E+00 |

The invention claimed is:

1. A surfactant for polymerization, comprising at least one selected from the group consisting of:

a surfactant (a) represented by the following formula (a):

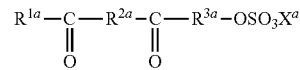

wherein $R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;

$R^{2a}$ and $R^{3a}$ are each individually a single bond or a divalent linking group;

$R^{1a}$, $R^{2a}$, and $R^{3a}$ contain six or more carbon atoms in total;

$X^a$ is H, a metal atom, $NR^{4a}_4$, imidazolium optionally containing a substituent, pyridinium optionally containing a substituent, or phosphonium optionally containing a substituent, where $R^{4a}$s are each H or an organic group and are the same as or different from each other; and any two of $R^{1a}$, $R^{2a}$, and $R^{3a}$ optionally bind to each other to form a ring; and a surfactant (b) represented by the following formula (b):

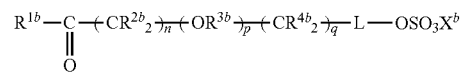

wherein $R^{1b}$ is a C1-C10 linear alkyl group free from a substituent;

$R^{2b}$ and $R^{4b}$ are each individually H or a substituent;

$R^{3b}$ is a $C_1$-$C_{10}$ alkylene group optionally containing a substituent;

n is an integer of 1 or greater;

p and q are each individually an integer of 0 or greater;

$X^b$ is H, a metal atom, $NR^{5b}_4$, imidazolium optionally containing a substituent, pyridinium optionally containing a substituent, or phosphonium optionally containing a substituent, where $R^{5b}$s are each H or an organic group and are the same as or different from each other;

any two of $R^{1b}$, $R^{2b}$, $R^{3b}$, and $R^{4b}$ optionally bind to each other to form a ring; and L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^{6b}$—B—, and —$NR^6CO$—B—, where B is a single bond or a $C_1$-$C_{10}$ alkylene group optionally containing a substituent, $R^{6b}$ is H or a $C_1$-$C_4$ alkyl group optionally containing a substituent, and * indicates the bond to —$OSO_3X^b$ in the formula.

2. A composition comprising
a fluoropolymer, and
at least one surfactant selected from the group consisting of:
a surfactant (a) represented by the following formula (a):

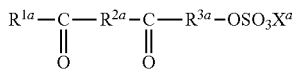

wherein
$R^{1a}$ is a linear or branched alkyl group containing one or more carbon atoms or a cyclic alkyl group containing three or more carbon atoms, with a hydrogen atom that binds to a carbon atom therein being optionally replaced by a hydroxy group or a monovalent organic group that contains an ester bond, optionally contains a carbonyl group when containing two or more carbon atoms, and optionally contains a monovalent or divalent heterocycle or optionally forms a ring when containing three or more carbon atoms;
$R^{2a}$ and $R^{3a}$ are each individually a single bond or a divalent linking group;
$R^{1a}$, $R^{2a}$, and $R^{3a}$ contain six or more carbon atoms in total;
$X^a$ is H, a metal atom, $NR^{4a}_4$, imidazolium optionally containing a substituent, pyridinium optionally containing a substituent, or phosphonium optionally containing a substituent, where $R^{4a}$s are each H or an organic group and are the same as or different from each other; and
any two of $R^{1a}$, $R^{2a}$, and $R^{3a}$ optionally bind to each other to form a ring; and
a surfactant (b) represented by the following formula (b):

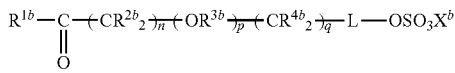

wherein
$R^{1b}$ is a linear or branched alkyl group containing one or more carbon atoms and optionally containing a substituent or a cyclic alkyl group containing three or more carbon atoms and optionally containing a substituent, and optionally contains a monovalent or divalent heterocycle or optionally forms a ring when containing three or more carbon atoms;
$R^{2b}$ and $R^{4b}$ are each individually H or a substituent;
$R^{3b}$ is a $C_1$-$C_{10}$ alkylene group optionally containing a substituent;
n is an integer of 1 or greater;
p and q are each individually an integer of 0 or greater;
$X^b$ is H, a metal atom, $NR^{5b}_4$, imidazolium optionally containing a substituent, pyridinium optionally containing a substituent, or phosphonium optionally containing a substituent, where $R^{5b}$s are each H or an organic group and are the same as or different from each other;
any two of $R^{1b}$, $R^{2b}$, $R^{3b}$, and $R^{4b}$ optionally bind to each other to form a ring; and
L is a single bond, $-CO_2-B-*$, $-OCO-B-*$, $-CONR^{6b}-B-*$, $-NR^{6b}CO-B-*$, or $-CO-$ other than the carbonyl groups in $-CO_2-B-$, $-OCO-B-$, $-CONR^{6b}-B-$, and $-NR^6CO-B-$, where B is a single bond or a $C_1$-$C_{10}$ alkylene group optionally containing a substituent, $R^{6b}$ is H or a $C_1$-$C_4$ alkyl group optionally containing a substituent, and * indicates the bond to $-OSO_3X^b$ in the formula.

3. A composition comprising:
a fluoropolymer; and
a compound represented by the following formula (3) in an amount of 500 ppb or more relative to the fluoropolymer,
the formula (3) being $(H-(CF_2)_8-SO_3)_qM^2$,
wherein $M^2$ is a metal atom, $NR^5_4$, imidazolium optionally containing a substituent, pyridinium optionally containing a substituent, or phosphonium optionally containing a substituent; $R^5$s are each H or an organic group and are the same as or different from each other; and q is 1 or 2.

4. The composition according to claim 3,
wherein the compound represented by the formula (3) is present in an amount of 500 to 20000 ppb relative to the fluoropolymer.

5. The composition according to claim 3,
wherein the compound represented by the formula (3) is present in an amount of more than 1000 ppb relative to the fluoropolymer.

6. The composition according to claim 3,
wherein the compound represented by the formula (3) is present in an amount of more than 1000 ppb and 20000 ppb or less relative to the fluoropolymer.

7. The composition according to claim 3, further comprising a compound represented by the following formula (4) in an amount of 500 ppb or more relative to the fluoropolymer,
the formula (4) being $(H-(CF_2)_7-COO)_pM^1$,
wherein $M^1$ is H, a metal atom, $NR^5_4$, imidazolium optionally containing a substituent, pyridinium optionally containing a substituent, or phosphonium optionally containing a substituent; $R^5$s are each H or an organic group and are the same as or different from each other; and p is 1 or 2.

8. The composition according to claim 3,
wherein the composition has a tone L* of 50 or lower after firing and before a fluorine treatment.

9. The composition according to claim 3,
wherein the composition exhibits a tone change ΔL* of 70% or higher before and after a fluorination treatment.

10. A molded article comprising the composition according to claim 3.

11. The molded article according to claim 10,
wherein the molded article is a stretched article.

* * * * *